US009944293B2

(12) United States Patent
Kasahara

(10) Patent No.: US 9,944,293 B2
(45) Date of Patent: Apr. 17, 2018

(54) OBJECT DETECTION APPARATUS, MOVING BODY DEVICE CONTROL SYSTEM AND PROGRAM THEREOF

(71) Applicant: Ryosuke Kasahara, Kanagawa (JP)

(72) Inventor: Ryosuke Kasahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 151 days.

(21) Appl. No.: 15/035,352

(22) PCT Filed: Dec. 11, 2014

(86) PCT No.: PCT/JP2014/083490
§ 371 (c)(1),
(2) Date: May 9, 2016

(87) PCT Pub. No.: WO2015/093552
PCT Pub. Date: Jun. 25, 2015

(65) Prior Publication Data
US 2016/0280229 A1    Sep. 29, 2016

(30) Foreign Application Priority Data

Dec. 19, 2013 (JP) ................................. 2013-262885
Oct. 14, 2014 (JP) ................................. 2014-209786

(51) Int. Cl.
*G06K 9/00* (2006.01)
*B60W 40/02* (2006.01)
(Continued)

(52) U.S. Cl.
CPC ........... *B60W 40/02* (2013.01); *B60Q 1/1423* (2013.01); *B60R 16/0231* (2013.01);
(Continued)

(58) Field of Classification Search
CPC ... B60W 40/02; B60W 30/09; B60R 16/0231; B60R 2300/108; B60S 1/0844;
(Continued)

(56) References Cited

U.S. PATENT DOCUMENTS 8,570,334 B2  10/2013  Sekiguchi et al.
8,605,153 B2  12/2013  Sasaki et al.
(Continued)

FOREIGN PATENT DOCUMENTS

JP    2005-195566    7/2005
JP    2010-272067    12/2010
(Continued)

OTHER PUBLICATIONS

International Search Report dated Mar. 24, 2015 in PCT/JP2014/083490 filed on Dec. 11, 2014.

*Primary Examiner* — Yon Couso
(74) *Attorney, Agent, or Firm* — Oblon, McClelland, Maier & Neustadt, L.L.P.

(57) ABSTRACT

An object detection apparatus includes a light illumination unit that emits illuminating light; an imaging unit that captures a first image of distant photographic subjects by detecting lights from the photographic subjects, captures a second image of foreign matter attached to a monitoring area by detecting the illuminating light reflected from the foreign matter, and generates an image frame; a target detection unit that detects a detection target among the distant photographic subjects based on the first image; a foreign matter detection unit that detects the foreign matter based on the second image; and an exposure amount change unit that changes an exposure amount of the imaging unit. The target detection unit detects the detection target using plural imaging frames with different exposure amounts. The foreign matter detection unit detects the foreign matter using the imaging frame other than the imaging frame with the greatest exposure amount.

13 Claims, 24 Drawing Sheets

(51) Int. Cl.

| | | |
|---|---|---|
| *B60S 1/08* | (2006.01) | |
| *G06K 9/20* | (2006.01) | |
| *B60R 16/023* | (2006.01) | |
| *B60W 30/09* | (2012.01) | |
| *H04N 5/235* | (2006.01) | |
| *G08G 1/16* | (2006.01) | |
| *B60Q 1/14* | (2006.01) | |

(52) U.S. Cl.
CPC ......... *B60S 1/0844* (2013.01); *B60W 30/09* (2013.01); *G06K 9/00791* (2013.01); *G06K 9/00825* (2013.01); *G06K 9/2027* (2013.01); *H04N 5/2354* (2013.01); *B60Q 1/143* (2013.01); *B60Q 2300/312* (2013.01); *B60Q 2300/41* (2013.01); *B60Q 2300/42* (2013.01); *B60R 2300/108* (2013.01); *G06K 2209/21* (2013.01); *G08G 1/166* (2013.01); *G08G 1/167* (2013.01)

(58) Field of Classification Search
CPC ......... G06K 9/00791; G06K 9/00825; G06K 9/2027; G06K 2209/21; H04N 5/2354; G08G 1/166; G08G 1/167; B60Q 1/143; B60Q 2300/312; B60Q 1/1423; B60Q 2300/41; B60Q 2300/42
See application file for complete search history.

(56) References Cited

U.S. PATENT DOCUMENTS

| | | |
|---|---|---|
| 8,842,211 B2 | 9/2014 | Kasahara et al. |
| 8,866,960 B2 | 10/2014 | Ishigaki et al. |
| 2005/0035926 A1 | 2/2005 | Takenaga et al. |
| 2012/0062746 A1 | 3/2012 | Otsuka et al. |
| 2012/0268602 A1 | 10/2012 | Hirai et al. |
| 2014/0300744 A1 | 10/2014 | Kasahara |
| 2014/0321709 A1 | 10/2014 | Kasahara et al. |
| 2015/0142263 A1 | 5/2015 | Hirai et al. |
| 2015/0186733 A1* | 7/2015 | Hayakawa ............ G08G 1/166 382/103 |
| 2015/0201120 A1* | 7/2015 | Irie .................... H04N 5/2171 348/148 |

FOREIGN PATENT DOCUMENTS

| | | |
|---|---|---|
| JP | 2013-115625 | 6/2013 |
| JP | 2014-032174 | 2/2014 |
| JP | 2014-170014 | 9/2014 |

\* cited by examiner

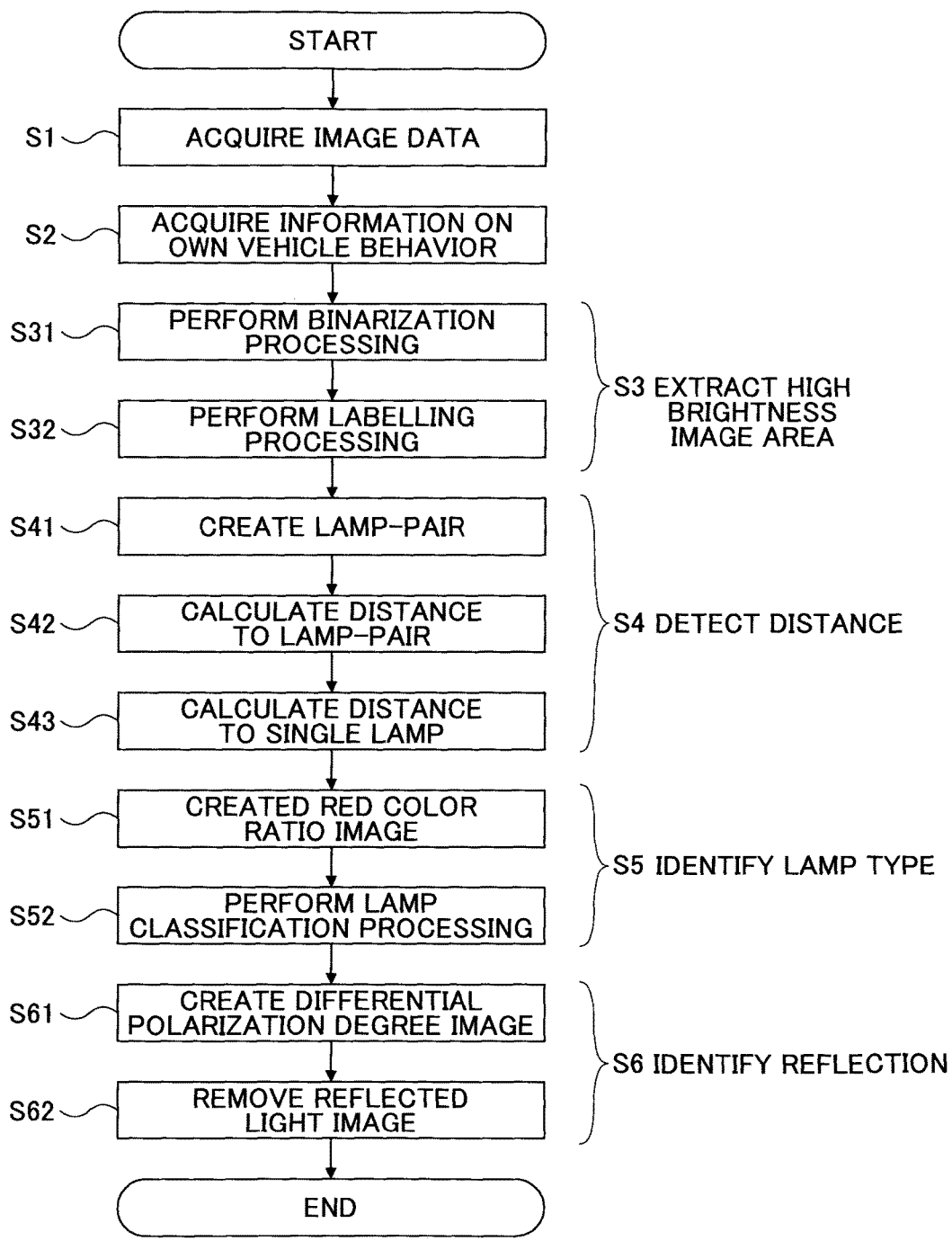

WHITE LINE    WHITE LINE

WHITE LINE    WHITE LINE

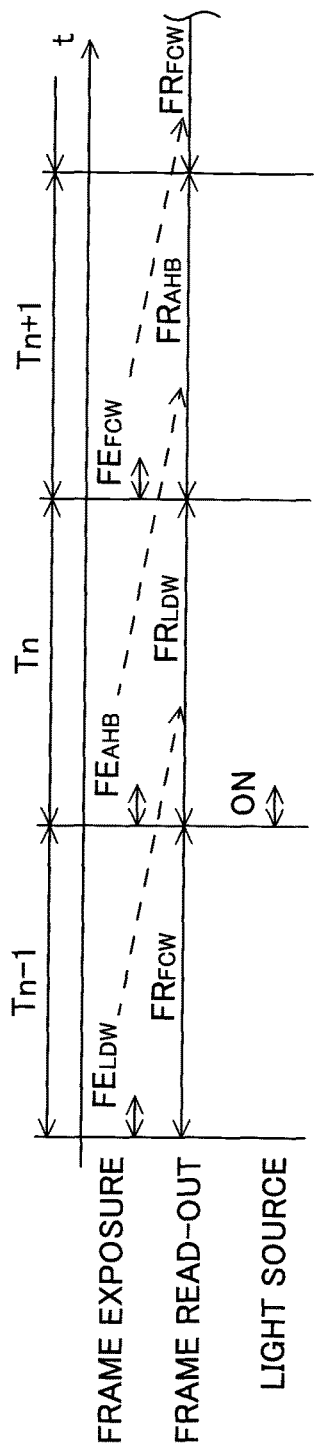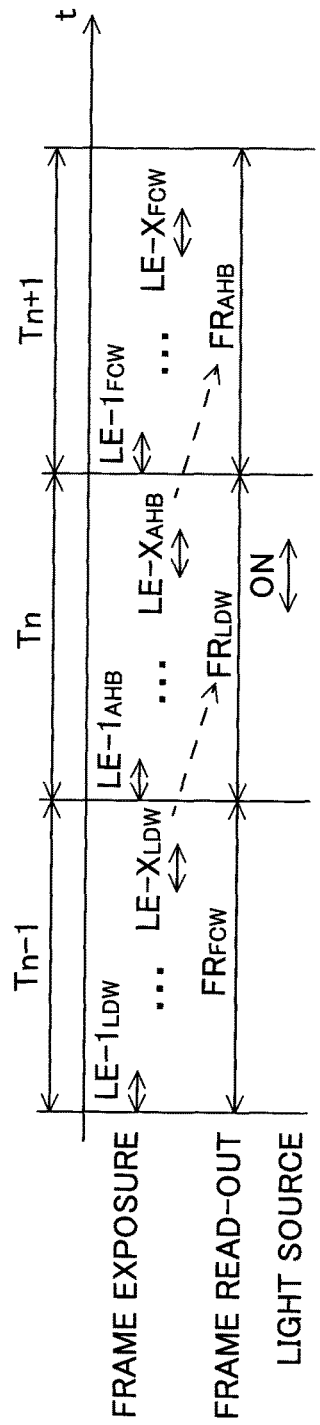
FIG.40
FIG.41

OBJECT DETECTION APPARATUS, MOVING BODY DEVICE CONTROL SYSTEM AND PROGRAM THEREOF

TECHNICAL FIELD

The present invention relates to an object detection apparatus, a moving body device control system provided therewith and an object detection program for detecting adhering matter such as raindrops adhering to a light transmissive member such as a front windscreen or a detection object existing in an image capturing area surrounding a moving body or the like.

BACKGROUND ART

Patent document 1 discloses an apparatus that detects raindrops adhering to a front windscreen of a vehicle by using a camera (capturing means) for detecting information surrounding the vehicle. In this apparatus, an area of a capturing frame is divided into an image area for detecting information surrounding the vehicle (capturing area image) and an image area for detecting raindrops (adhering matter observation image). For a process of detecting information surrounding a vehicle, captured image data of the image area for detecting the information surrounding the vehicle are used. For a process of detecting raindrops, captured image data of the image area for detecting raindrops are used. Furthermore, for the process of detecting raindrops, the captured image data are obtained by irradiating an adhering matter observation part in the front windscreen with an irradiation light from a dedicated light source.

In the apparatus disclosed in the Patent Document 1, for the captured image data used for the process of detecting information surrounding a vehicle, image data of a capturing frame captured with an exposure amount suitable for detecting information surrounding a vehicle are used, and for the captured image data used for the process of detecting raindrops, image data of a capturing frame captured with an exposure amount suitable for detecting raindrops are used. Specifically, following the rule that after capturing predetermined number of times consecutively the capturing frames for detecting information surrounding a vehicle with the exposure amount suitable for detecting the information surrounding the vehicle, the exposure amount is switched to the amount suitable for detecting raindrops and the capturing frame for detecting raindrops is captured only once; then the capturing processes are performed repeatedly. According to the above processes, high detection accuracies are ensured in both the process of detecting information surrounding a vehicle and the process of detecting raindrops.

Patent Document 1: Japanese Published Patent Application No. 2013-115625.

DISCLOSURE OF INVENTION

Problem to be Solved by the Invention

Conventionally, enhancing the detection accuracy in the process of detecting a detection object existing in the image capturing area (surrounding the vehicle) is given priority over enhancing the detection accuracy in the process of detecting adhering matter (raindrops or the like). Therefore, in the case of performing both the processes using the same capturing frame, the exposure amount for capturing the capturing frame is set to the amount suitable for the process of detecting a detection object. In general, the exposure amount suitable for the process of detecting adhering matter is preferably set to be the amount as small as possible so as to minimize an influence from flare or ghost of a lens or disturbance light other than the irradiation light from the light source. On the other hand, the exposure amount suitable for the process of detecting information surrounding the vehicle is preferably set to be the amount as great as possible since it is important to prevent a failure to detect a detection object by detecting relatively weak light from around the vehicle. Accordingly, in the capturing frame captured with the exposure amount suitable for the process of detecting information surrounding a vehicle, the exposure amount is too great for the process of detecting raindrops, and the light from the light source is significantly affected by the disturbance light and the accuracy for detecting raindrops cannot be enhanced.

The inventor of the present invention has found that using capturing frames captured with different exposure amounts, not only between the process of detecting information surrounding a vehicle and the process of detecting raindrops but also in the process of detecting information surrounding the vehicle itself, for plural detection objects which are detected by the process of detecting information surrounding the vehicle, is effective for enhancing the respective detection accuracies. According to the above, since each of the plural detection objects can be detected from each capturing frame captured with an exposure amount suitable for the detection object, detection accuracies of the respective detection objects can be enhanced. Moreover, among the detection objects there is a detection object for which higher detection accuracy is obtained when the exposure amount is small. For example, a tail lamp of a preceding vehicle or a head lamp of an oncoming vehicle is a high-intensity detection object. For such detection objects, when the exposure amount is small, higher detection accuracy can be obtained compared with a low-intensity detection object such as a white line on a road or a road edge.

In this way, in the configuration that detects each of plural detection objects from a capturing frame that captures the detection object with an exposure amount suitable for the detection object, there is a capturing frame in which an exposure amount is small. In such a capturing frame, sufficient detection accuracy can be ensured for detecting adhering matter in the process of detecting raindrops. Moreover, when the process of detecting adhering matter is performed for the same capturing frame as that used for the process of detecting detection objects in this way, a frame rate of capturing frames for detection objects is not reduced compared with the case of separately inserting a dedicated capturing frame for detecting adhering matter. Since reduction of the frame rate becomes a factor for reducing the detection accuracy for detection objects, it is important not to reduce the frame rate of the capturing frames for detection objects.

Above-described explanation is for the case where in a configuration of detecting plural detection objects using two or more capturing frames each of which captures the detection object with an exposure amount suitable for the detection object, a capturing frame in which an exposure amount is relatively smaller is selected from the two or more capturing frames and used for the process of detecting adhering matter.

On the other hand, also in a configuration where a single detection object is detected by using two or more capturing frames which are respectively captured with different exposure amounts from each other, high detection accuracy can be often obtained compared with the configuration for detection by using only a capturing frame captured with a single exposure amount. Also in such a configuration when a capturing frame of an exposure condition that an exposure amount is relatively smaller is selected from the two or more capturing frames and used for the process of detecting adhering matter, sufficient detection accuracy can be ensured in detecting adhering matter.

At any rate, in a configuration of using two or more capturing frames, in which exposure amounts are different from each other, for the process of detecting a detection object, sufficient detection accuracy can be ensured in detecting adhering matter when a capturing frame in which an exposure amount is relatively smaller is selected from the two or more capturing frames and used for the process of detecting adhering matter.

In view of the above subject matter, it is a general object of at least one embodiment of the present invention to provide an object detection apparatus, a moving body device control system provided therewith and an object detection program that substantially obviate one or more problems caused by the limitations and disadvantages of the related art.

Means to Solve the Problem

According to an aspect of the invention, an object detection apparatus includes a light illumination unit configured to emit illuminating light for illuminating a monitoring area defined on a light transmissive member; an imaging unit including an imaging sensor, the imaging sensor having a first light receiving area and a second light receiving area, the imaging unit being configured to capture a first image of distant photographic, subjects by detecting, in the first light receiving area, lights from the distant photographic subjects that pass through the light transmissive member, to capture a second image of foreign matter attached to the monitoring area on the light transmissive member by detecting, in the second light receiving area, the illuminating light reflected from the foreign matter and passing through the light transmissive member, and to generate an image frame including the first image and the second image; a target detection unit configured to detect a detection target among the distant photographic subjects based on the first image in the imaging frame; a foreign matter detection unit configured to detect the foreign matter attached to the monitoring area on the light transmissive member based on the second image in the imaging frame; and an exposure amount change unit configured to change an exposure amount of the imaging unit from imaging frame to imaging frame. The target detection unit detects the detection target using first images in two or more imaging frames, exposure amounts of which are different from each other. The foreign matter detection unit detects the foreign matter using a second image in an imaging frame of the two or more imaging frames other than an imaging frame, an exposure amount of which is the greatest among those of the two or more imaging frames.

According to another aspect of the invention, an object detection apparatus includes a light illumination unit configured to emit illuminating light for illuminating a monitoring area defined on a light transmissive member; an imaging unit including an imaging sensor, the imaging sensor having a first light receiving area and a second light receiving area, the imaging unit being configured to capture a first image of distant photographic subjects by detecting, in the first light receiving area, lights from the distant photographic subjects that pass through the light transmissive member, to capture a second image of foreign matter attached to the monitoring area on the light transmissive member by detecting, in the second light receiving area, the illuminating light reflecting from the foreign matter and passing through the light transmissive member, and to generate an image frame including the first image and the second image; a target detection unit configured to detect a detection target among the distant photographic subjects based on the first image in the imaging frame; a foreign matter detection unit configured to detect the foreign matter attached to the monitoring area on the light transmissive member based on the second image in the imaging frame; and an exposure condition change unit configured to change an exposure condition of the imaging unit from imaging frame to imaging frame. The target detection unit, based on first images in imaging frame groups, which are imaged in exposure conditions corresponding respectively to plural kinds of detection targets, detects detection targets of the kinds corresponding respectively to the imaging frame groups. The foreign matter detection unit detects the foreign matter using a second image in an imaging frame group of the imaging frame groups other than an imaging frame group corresponding to an exposure condition, an exposure amount of which is the greatest among those of the imaging frame groups.

According to yet another aspect of the invention, a moving body device control system includes an object detection unit configured to detect foreign matter attached to a monitoring area defined on a light transmissive member in a moving body and a detection target existing among distant photographic subjects around the moving body; and a moving body device control unit configured to control a predetermined device installed on the moving body based on a result of detection of the foreign matter and a result of detection of the detection target by the object detection unit. The object detection unit includes a light illumination unit configured to emit illuminating light for illuminating the monitoring area defined on the light transmissive member; an imaging unit including an imaging sensor, the imaging sensor having a first light receiving area and a second light receiving area, the imaging unit being configured to capture a first image of the distant photographic subjects by detecting, in the first light receiving area, lights from the distant photographic subjects that pass through the light transmissive member, to capture a second image of the foreign matter attached to the monitoring area on the light transmissive member by detecting, in the second light receiving area, the illuminating light reflected from the foreign matter and passing through the light transmissive member, and to generate an image frame including the first image and the second image; a target detection unit configured to detect a detection target among the distant photographic subjects based on the first image in the imaging frame; a foreign matter detection unit configured to detect the foreign matter attached to the monitoring area on the light transmissive member based on the second image in the imaging frame; and an exposure amount change unit configured to change an exposure amount of the imaging unit from imaging frame to imaging frame. The target detection unit detects a detection target using first images in two or more imaging frames, exposure amounts of which are different from each other. The foreign matter detection unit detects the foreign matter using a second image in an imaging frame of the two or more imaging frames other than an imaging frame, an exposure amount of which is the greatest among those of the two or more imaging frames.

According to yet another aspect of the invention, a non-transitory computer-readable storage medium stores a program for causing a computer of an object detection apparatus to perform an object detection process, which object detection apparatus includes a light illumination unit configured to emit illuminating light for illuminating a monitoring area defined on a light transmissive member; and an imaging unit including an imaging sensor, the imaging sensor having a first light receiving area and a second light receiving area, the imaging unit being configured to capture a first image of distant photographic subjects by detecting, in the first light receiving area, lights from the distant photographic subjects that pass through the light transmissive member, to capture a second image of foreign matter attached to the monitoring area on the light transmissive member by detecting, in the second light receiving area, the illuminating light reflected from the foreign matter and passing through the light transmissive member, and to generate an image frame including the first image and the second image. The object detection process includes a target detection step of detecting a detection target among the distant photographic subjects based on the first image in the imaging frame; a foreign matter detection step of detecting the foreign matter attached to the monitoring area on the light transmissive member based on the second image in the imaging frame; and an exposure amount change step of changing an exposure amount of the imaging unit from imaging frame to imaging frame. In the target detection step a detection target is detected using first images in two or more imaging frames, exposure amounts of which are different from each other. In the foreign matter detection step the foreign matter is detected using a second image in an imaging frame of the two or more imaging frames other than an imaging frame, an exposure amount of which is the greatest among those of the two or more imaging frames.

According to yet another aspect of the invention, a non-transitory computer-readable storage medium stores a program for causing a computer of an object detection apparatus to perform an object detection process, which object detection apparatus includes a light illumination unit configured to emit illuminating light for illuminating a monitoring area defined on a light transmissive member; and an imaging unit including an imaging sensor, the imaging sensor having a first light receiving area and a second light receiving area, the imaging unit being configured to capture a first image of distant photographic subjects by detecting, in the first light receiving area, lights from the distant photographic subjects that pass through the light transmissive member, to capture a second image of foreign matter attached to the monitoring area on the light transmissive member by detecting, in the second light receiving area, the illuminating light reflecting from the foreign matter and passing through the light transmissive member, and to generate an image frame including the first image and the second image. The object detection process includes a target detection step of detecting a detection target among the distant photographic subjects based on the first image in the imaging frame; a foreign matter detection step of detecting the foreign matter attached to the monitoring area on the light transmissive member, based on the second image in the imaging frame; and an exposure condition change step of changing an exposure condition of the imaging unit from imaging frame to imaging frame. In the target detection step, based on first images in imaging frame groups, which are imaged in exposure conditions corresponding respectively to plural kinds of detection targets, detection targets of the kinds corresponding respectively to the imaging frame groups are detected. In the foreign matter detection step the foreign matter is detected using a second image in an imaging frame group of the imaging frame groups other than an imaging frame group corresponding to an exposure condition, an exposure amount of which is the greatest among those of the imaging frame groups.

According to embodiments of the present invention, an adhering matter detection apparatus, a moving body device control system provided therewith and an adhering matter detection program that can realize high detection accuracies both in a process of detecting a detection object and in a process of detecting adhering matter without separately inserting a dedicated capturing frame for detecting adhering matter are provided.

BRIEF DESCRIPTION OF DRAWINGS

FIG. 36 is a flowchart illustrating an example of a flow of a vehicle detection process according to the present embodiment;

FIG. 40 is a timing chart simply illustrating an example of an imaging operation of an imaging apparatus according to a first example of an imaging operation; and FIG. 41 is a timing chart simply illustrating an example of an imaging operation of an imaging apparatus according to a second example of an imaging operation.

BEST MODE FOR CARRYING OUT THE INVENTION

In the following, an embodiment in which an object detection apparatus according to the present invention is used in an on-vehicle device control system which is a moving body device control system will be explained.

Meanwhile, the object detection apparatus according to the present invention is not limited to the object detection apparatus used in the moving body device control system, but may be used as an object detection apparatus in another system, as long as the object detection apparatus detects a detection object in a capturing area through a light transmissive member based on a captured image and also detects adhering matter adhering to the transmissive member.

Figure 1:
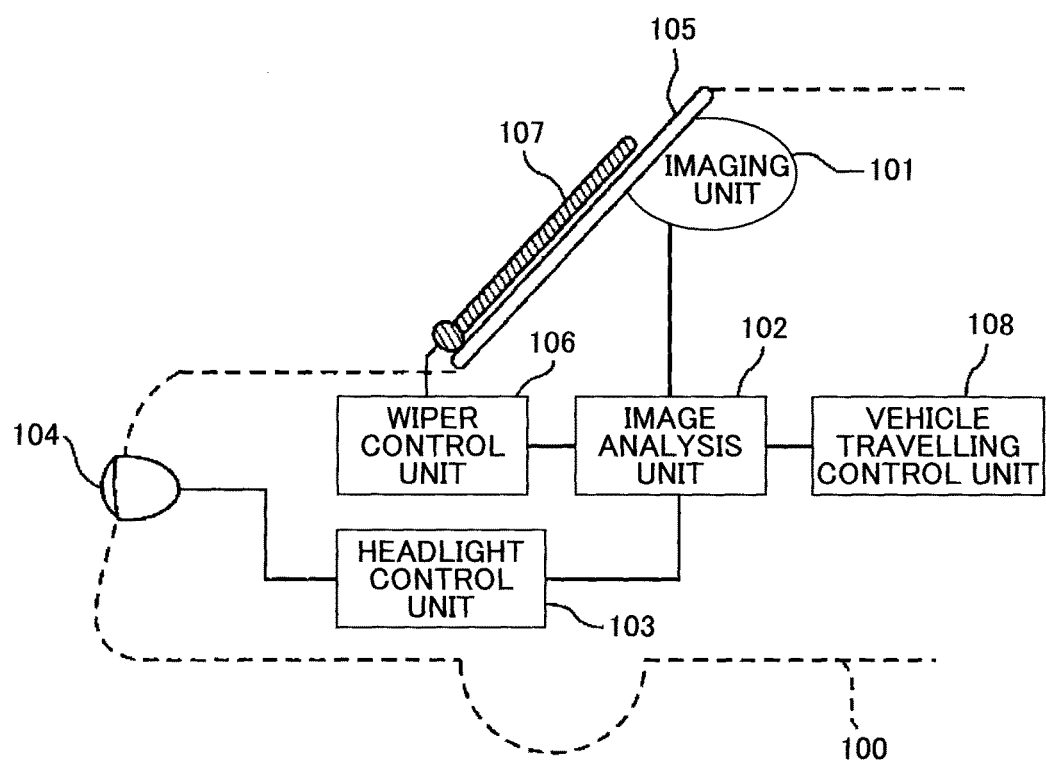
FIG. 1 is a schematic diagram illustrating schematically an example of a configuration of an on-vehicle device control system according to a present embodiment.

FIG. 1 is a schematic diagram illustrating schematically a configuration of an on-vehicle device control system according to the present embodiment.

The on-vehicle device control system performs light distribution control of a headlight, drive control of a wiper and control of other on-vehicle devices by using captured image data captured around the own vehicle as a capturing area (especially, ahead in the travelling direction) by using an imaging apparatus installed on the own vehicle 100, such as a car which is a moving body.

The imaging apparatus provided in the on-vehicle device control system according to the present embodiment is provided in the imaging unit 101, and images a front area in the traveling direction of the travelling own vehicle 100 as a capturing area. The imaging apparatus is provided, for example, at around a rear-view mirror (not shown) of the front windscreen 105 of the own vehicle 100. Captured image data captured by the imaging apparatus of the imaging unit 101 are input to an image analysis unit 102. The image analysis unit 102 analyzes captured image data transmitted from the imaging apparatus, calculates a position (direction and distance) of another vehicle present ahead of the own vehicle 100, detects adhering matter such as raindrops or foreign material adhering to the front windscreen 105, or detects a detection object such as a white line (marking line) on a road surface present in the capturing area. In the detection of the other vehicle, by recognizing a taillight of the other vehicle, a preceding vehicle travelling in the same travelling direction as the own vehicle 100 is detected, and by recognizing a headlight of the other vehicle, an oncoming vehicle travelling in an opposite direction to own vehicle 100 is detected.

A result of calculation by the image analysis unit 102 is transmitted to a headlight control unit 103. The headlight control unit 103 generates a control signal for controlling a headlight 104 which is an on-vehicle device of the own vehicle 100, for example, from position data of the other vehicle calculated by the image analysis unit 102. Specifically, for example, switching between a low beam and a high beam for the headlight 104 is controlled or the headlight 104 is partially shielded so that a view of the driver of the own vehicle 100 is ensured, while preventing glare of a headlight of the own vehicle 100 toward the driver of the preceding vehicle or the oncoming vehicle.

The result of calculation by the image analysis unit 102 is also transmitted to a wiper control unit 106. The wiper control unit 106 controls a wiper 107 that removes the adhering matter such as raindrops or foreign material adhering to the front windscreen 105 of the own vehicle 100. The wiper control unit 106 receives the result of detection for adhering matter detected by the image analysis unit 102 and generates a control signal for controlling the wiper 107. When the control signal generated by the wiper control unit 106 is transmitted to the wiper 107, the wiper 107 operates so as to ensure the view of the driver of the own vehicle 100.

Moreover, the result of calculation by the image analysis unit 102 is also transmitted to a vehicle travelling control unit 108. The vehicle travelling control unit 108, based on the white line detection result detected by the image analysis unit 102, in the case where the own vehicle 100 deviates from a traffic lane area zoned by white lines or the like, gives an alarm to the driver of the own vehicle 100, or performs drive assist control such as control of a steering wheel or a brake. Moreover, the vehicle travelling control unit 108, based on the position data of the other vehicle detected by the image analysis unit 102, in the case where the distance to the preceding vehicle decreases or the like, gives an alarm to the driver of the own vehicle 100 or performs the drive assist control such as the control of the steering wheel or the brake.

Figure 2:
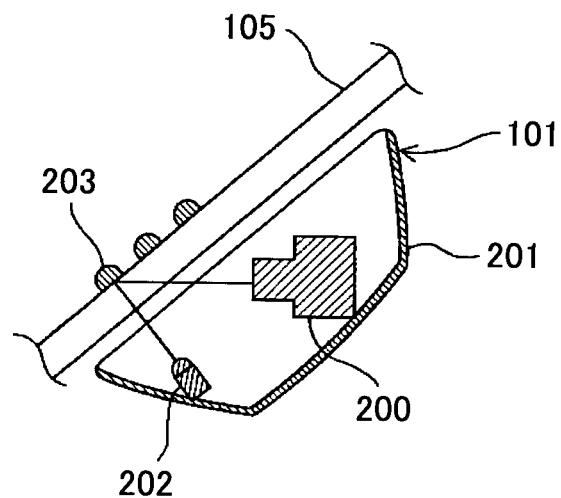
FIG. 2 is a schematic diagram illustrating schematically an example of a configuration of an imaging unit in the on-vehicle device control system according to the present embodiment.

FIG. 2 is a schematic diagram illustrating schematically a configuration of the imaging unit 101.

Figure 3:
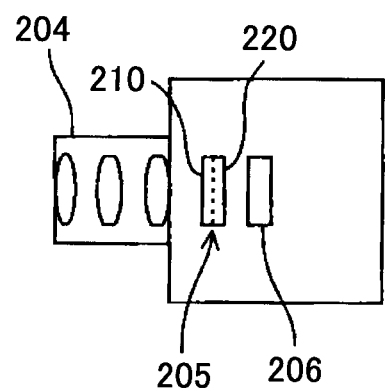
FIG. 3 is an explanatory diagram illustrating an example of a schematic configuration of an imaging apparatus provided in the imaging unit according to the present embodiment.

FIG. 3 is an explanatory diagram illustrating a schematic configuration of the imaging apparatus 200 provided in the imaging unit 101.

The imaging unit 101 includes the imaging apparatus 200 as an imaging means, a light source 202 as a light emitting means and an imaging case 201 for accommodating the imaging apparatus 200 and the light source 202. The imaging unit 101 is installed on the side of the inner wall surface of the front windscreen 105 of the own vehicle 100. The imaging apparatus 200, as shown in FIG. 3, includes an imaging lens 204, an optical filter 205 and an image sensor 206. The light source 202 is arranged so that when the light source 202 emits light including infrared light toward the front windscreen 105 and the light is reflected at an interface between the raindrops adhering to the outer wall surface of the front windscreen 105 and air, the reflected light enters into the imaging apparatus 200. Moreover, in the case where the adhering matter adhering to the outer wall surface of the front windscreen 105 is a light-impermeable foreign material, when the light from the light source 202 is reflected at an interface between the foreign material and the outer wall surface of the front windscreen 105, the reflected light enters into the imaging apparatus 200.

In the present embodiment, the light source 202 is for detecting the adhering matter adhering to the outer wall surface of the front windscreen 105 (in the following, an example where the adhering matter is raindrops will be exemplified). When any raindrops 203 do not adhere to the outer wall surface of the front windscreen 105, since most of the light emitted from the light source 202 passes through the outer wall surface of the front windscreen 105, the light hardly enters into the imaging apparatus 200. On the other hand, as shown in FIG. 2, in the case where raindrops 203 adhere to the outer wall surface of the front windscreen 105, the emitted light, after passing through the outer wall surface of the front windscreen 105, is reflected at an interface between the raindrops 203 and air, and the reflected light passes through the outer wall surface of the front windscreen 105 again, thereby the reflected light enters into the imaging apparatus 200. According to the above-described difference, a contrast (difference in brightness) occurs in the captured image data in the imaging apparatus 200, and the raindrops 203 adhering to the front windscreen 105 can be detected.

Moreover, in the present embodiment, the imaging unit 101, as shown in FIG. 2, covers the imaging apparatus 200 and the light source 202 with the imaging case 201 along with the front windscreen 105. In this way, by covering with the imaging case 201, even in a condition where the inner wall surface of the front windscreen 105 has mist, the mist on a part of the front windscreen 105 covered with the imaging unit 101 can be prevented. Accordingly, an erroneous analysis of the image analysis unit 102 due to the mist on the front windscreen 105 is suppressed, and various control operations can be performed properly based on the result of analysis by the image analysis unit 102.

However, in the case of detecting the mist of the front windscreen 105 from the captured image data of the imaging apparatus 200 and controlling air-conditioning equipment of the own vehicle 100, for example, a flow path through which air flows may be provided in a part of the imaging case 201 so that the condition in the part of the front windscreen 105 opposed to the imaging apparatus 200 is the same as that in the other part.

Here, in the present embodiment, a focal position of the imaging lens 204 is set at infinity or between infinity and the front windscreen 105. Accordingly, not only in the case of detecting raindrops 203 adhering to the surface of the front windscreen 105, but also in the case of detecting a preceding, vehicle or an oncoming vehicle or detecting a white line, proper information can be acquired from the captured image data by the imaging apparatus 200.

For example, in the case of detecting raindrops 203 adhering to the front windscreen 105, since an image of a raindrop in the captured image data often has a circular shape, a shape recognition process is performed that determines whether a raindrop candidate image in the captured image data has a circular shape, and recognizes the raindrop candidate image to be a raindrop image. In the case of performing the above-described shape recognition process, rather than the imaging lens 204 focusing the raindrops 203 on the outer wall surface of the front windscreen 105, when the focal position of the imaging lens 204 is set at infinity or between infinity and the front windscreen 105, the image is out of focus, and a shape recognition rate of raindrop (circular shape) is enhanced, thereby the raindrop detection performance becomes higher.

Figure 4:
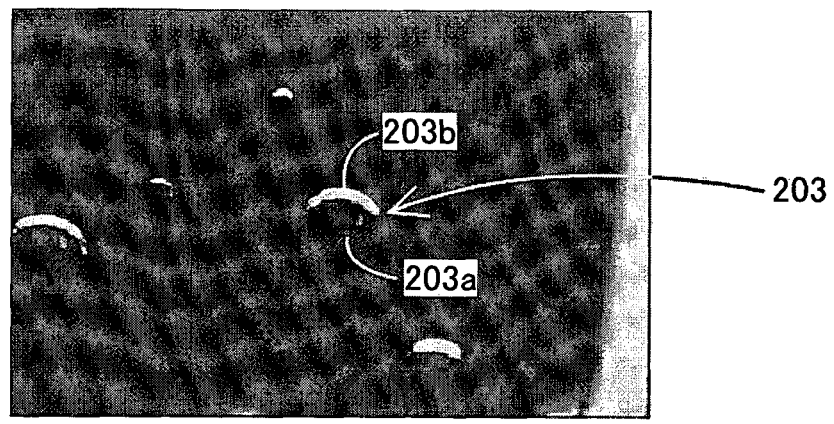
FIG. 4 is an explanatory diagram illustrating an example of infrared light image data which are captured image data for detecting raindrops in the case where an imaging lens focuses on a raindrop on an outer wall surface of a front windscreen of an own vehicle according to the present embodiment.

FIG. 4 is an explanatory diagram illustrating infrared light image data which are captured image data for detecting raindrops in the case where the imaging lens 204 focuses on the raindrops 203 on the outer wall surface of the front windscreen 105.

Figure 5:
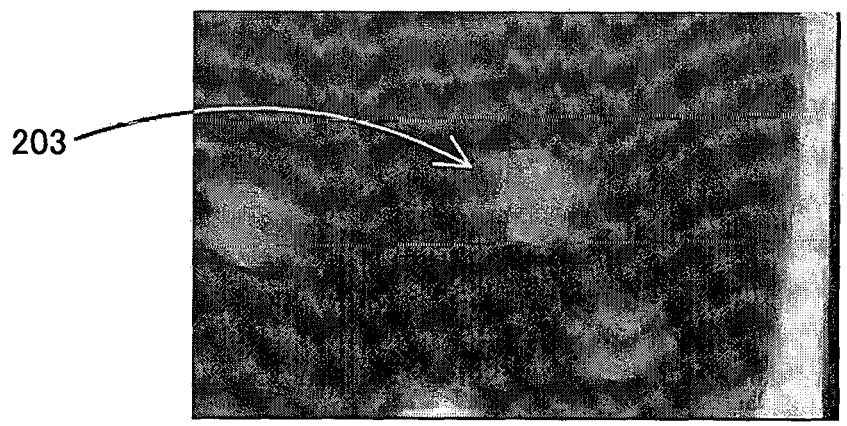
FIG. 5 is an explanatory diagram illustrating an example of infrared light image data which are captured image data for detecting raindrops in the case where the imaging lens is focused at infinity according to the present embodiment.

FIG. 5 is an explanatory diagram illustrating infrared light image data which are captured image data for detecting raindrops in the case where the imaging lens 204 is focused at infinity.

When the imaging lens 204 focuses on the raindrops 203 on the outer wall surface of the front windscreen 105, as shown in FIG. 4, even a background image 203a projected in the raindrops is captured. The background image 203a, as above, may cause an erroneous detection of the raindrops 203. Moreover, as shown in FIG. 4, brightness of only a part of the raindrop 203b having an arcuate shape may become higher. The shape of the part having higher brightness, i.e. the shape of the image of the raindrop changes depending on a direction of sunlight or a position of a street light. A processing load of the shape recognition process in processing such a shape of the image of the raindrops, which variously changes as above, becomes greater. Moreover, the recognition accuracy decreases.

On the other hand, when the imaging lens 204 is focused at infinity, as shown in FIG. 5, the image is out of focus. Then, the background image 203a projected in the raindrops 203 is not reflected in the captured image data, and occurrence of the erroneous detection for the raindrops 203 is suppressed. Moreover, according to the image being out of focus, the degree of change in shape of the image of the raindrops depending on the direction of sunlight or the position of a street light becomes smaller, and the shape of the image of the raindrop is always approximately circular. Accordingly, the processing load of the shape recognition process in processing the shape of the image of the raindrops becomes smaller, and the recognition accuracy increases.

However, in the case where the imaging lens 204 is focused at infinity, when a taillight of a preceding vehicle which travels at a great distance is recognized, a number of light receiving elements on the image sensor 206 receiving light from the taillight may become approximately one. In this case, described later in details, the light of the taillight may not be received by a light receiving element for red light, which receives red light of taillights. Then, the taillight cannot be recognized, and the preceding vehicle is not detected. In order to avoid the above-described defect, the focal point of the imaging lens 204 is preferably set less than infinity. Thus, an image of the taillight of the preceding vehicle is out of focus, and the number of light receiving elements receiving the light from the taillight can be increased. Then, the recognition accuracy for a taillight is enhanced and the detection accuracy of a preceding vehicle increases.

For the light source 202 in the imaging unit 101, a light-emitting diode (LED) or a laser diode (LD) may be used. Moreover, a wavelength of emitted light from the light source 202 may be a wavelength of visible light or infrared light. However, in the case of avoiding glare for a driver of an oncoming vehicle, a pedestrian or the like by the light from the light source 202, a wavelength which is greater than that of visible light and can be detected in light reception sensitivity of the image sensor, for example a wavelength in a range of the infrared light, greater than or equal to 800 nm and less than or equal to 1000 nm, is preferably selected. The light source 202 according to the present embodiment emits light with a wavelength in the range of the infrared light.

Here, when light with a wavelength of the infrared light emitted from the light source 202 and reflected at raindrops 203 on the front windscreen 105 is captured by the imaging apparatus 200, the image sensor 206 of the imaging apparatus 200 receives, in addition to the light with wavelength of infrared light from the light source 202, disturbance light having a large amount of light including light with wavelength of infrared light such as sunlight, for example. Accordingly, in order to distinguish the light with wavelength of infrared light from the light source 202 from such disturbance light, an amount of luminescence of the light source 202 is required to be sufficiently greater than the amount of light of the disturbance light. But, such a light source 202 with a great amount of luminescence is often difficult to be used.

Figure 6:
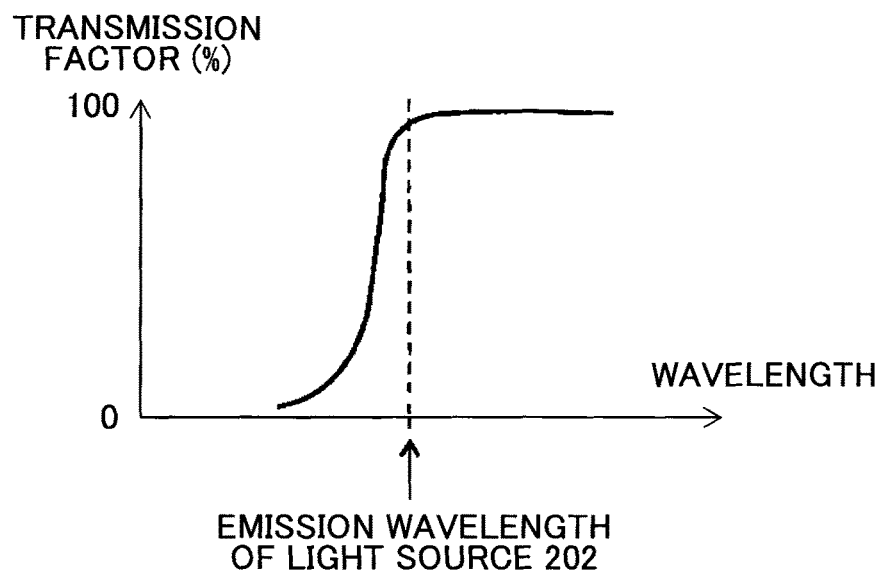
FIG. 6 is a graph illustrating an example of a filter characteristic of a cut filter which is applicable to the captured image data for detecting raindrops according to the present embodiment.
Figure 7:
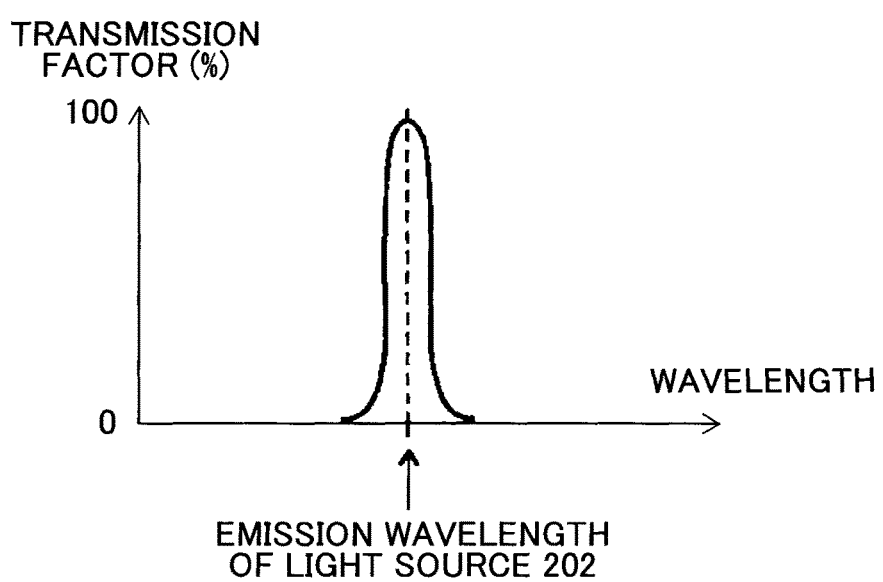
FIG. 7 is a graph illustrating an example of a filter characteristic of a bandpass filter which is applicable to the captured image data for detecting raindrops according to the present embodiment.

Then, in the present embodiment, for example, it is configured so that light from the light source 202 is received by the image sensor 206 via a cut filter that cuts light having a wavelength shorter than the light emission wavelength of the light source 202, as shown in FIG. 6, or via a bandpass filter that has a peak of a transmission factor at about the light emission wavelength of the light source 202, as shown in FIG. 7. Thus, light having a wavelength other than the light emission wavelength of the light source 202 is not received, and the light amount of the light from the light source 202 received by the image sensor 206 becomes relatively greater than that of the disturbance light. As a result, even if the amount of luminescence of the light source 202 is not great, light from the light source 202 can be distinguished from disturbance light.

However, in the present embodiment, not only the detection of the raindrops 203 on the front windscreen 105, but also the detection of a preceding vehicle, an oncoming vehicle or a white line is performed. Therefore, when a wavelength band other than the light with wavelength of infrared light emitted from the light source 202 is removed for the entire captured image, light with a wavelength band necessary for detecting a preceding vehicle, an oncoming vehicle or a white line cannot be received by the image sensor 206, and it may cause a problem in the detection of them. Accordingly, in the present embodiment, an image area of the captured image data is divided into a raindrop detection image area for detecting the raindrops 203 on the front windscreen 105, and a vehicle detection image area for detecting a preceding vehicle, an oncoming vehicle or a white line. The optical filter 205 is provided with a filter that removes the wavelength band other than the light with wavelength of infrared light emitted from the light source 202 only for a part corresponding to the raindrop detection image area.

Figure 8:
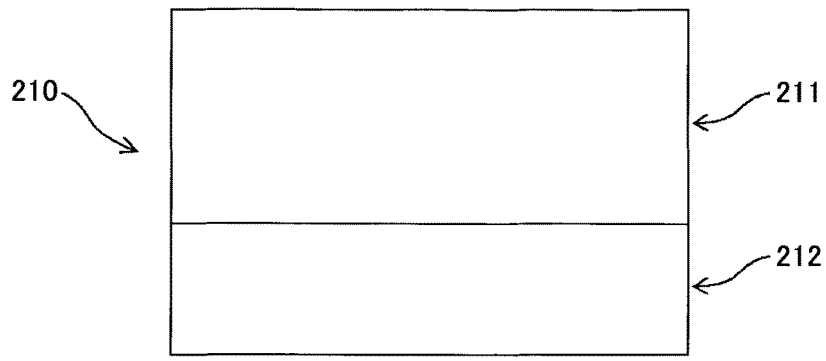
FIG. 8 is a diagram illustrating an example of a front view of a pre-stage filter provided in an optical filter of the imaging apparatus according to the present embodiment.

FIG. 8 is a diagram illustrating a front view of a pre-stage filter 210 provided in the optical filter 205.

Figure 9:
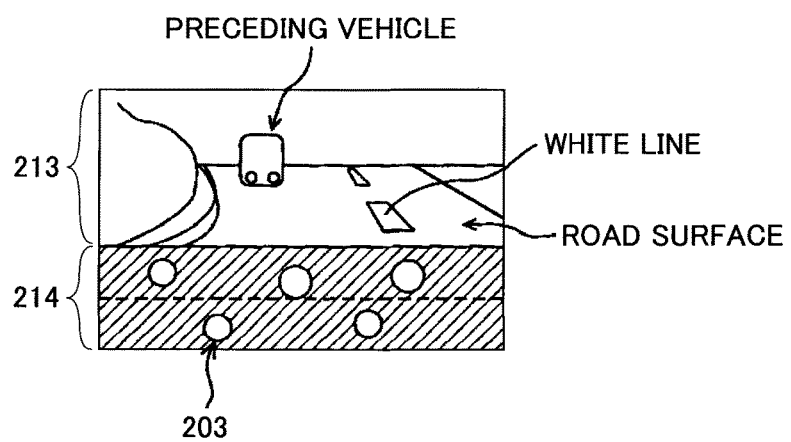
FIG. 9 is an explanatory diagram illustrating an example of an image of the image data captured by the imaging apparatus according to the present embodiment.

FIG. 9 is an explanatory diagram illustrating an example of an image of the captured image data.

The optical filter 205 according to the present embodiment, as shown in FIG. 3, has a configuration that the pre-stage filter 210 and a post-stage filter 220 are overlaid in the light transmission direction. An area of the pre-stage filter 210 is divided, as shown in FIG. 8, into an infrared light cut filter area 211 provided at a position corresponding to upper two-thirds of the captured image which is the vehicle detection image area 213 and an infrared light transmission filter area 212 provided at a position corresponding to lower one-third of the captured image which is the raindrop detection image area 214. In the infrared light transmission filter area 212, the cut filter shown in FIG. 6 or the bandpass filter shown in FIG. 7 is used.

Normally, images of a headlight of an oncoming vehicle, a taillight of a preceding vehicle and a white line often appear mainly above a central part of the captured image, and an image of the nearest road surface ahead of the own vehicle often appears in a lower part of the captured image. Accordingly, information required for recognizing a headlight of an oncoming vehicle, a taillight of a preceding vehicle and a white line is concentrated in an upper part of the captured image. In the recognition of them, information in the lower part of the captured image is not important. Then, in the case of performing both the detection of an oncoming vehicle, a preceding vehicle and a white line and the detection of raindrops simultaneously from a single captured image data element, the lower part of the captured image is preferably allocated to the raindrop detection image area 214 and the remaining part is preferably allocated to the vehicle detection image area 213, as shown in FIG. 9. The area of the pre-stage filter 210 is divided corresponding to the above allocation.

Meanwhile, in the present embodiment, an example where the raindrop detection image area 214 is provided below the vehicle detection image area 213 in the captured image is illustrated. However, the raindrop detection image area 214 may be provided above the vehicle detection image area 213, or the raindrop detection image areas 214 may be provided above and below the vehicle detection image area 213.

When the imaging direction of the imaging apparatus 200 is declined, an image of a hood of the own vehicle may enter into the lower part in the capturing area. In this case, sunlight or light from a preceding vehicle reflected on the hood of the own vehicle may become disturbance light. The disturbance light included in the captured image data may cause false recognition of a headlight of an oncoming vehicle, a taillight of a preceding vehicle and a white line. Even in the above case, in the present embodiment, since the cut filter shown in FIG. 6 or the bandpass filter shown in FIG. 7 is arranged at the position corresponding to the lower part of the captured image, the disturbance light such as sunlight or light from a taillight of a preceding vehicle reflected on the hood is removed. Therefore, the recognition accuracy for a headlight of an oncoming vehicle, a taillight of a preceding vehicle and a white line increases.

Meanwhile, in the present embodiment, due to a characteristic of the imaging lens 204, an image within the capturing area is displayed on the image sensor 206 in a vertically inverted state. Therefore, in the case of allocating the lower part of the captured image to the raindrop detection image area 214, the cut filter shown in FIG. 6 or the bandpass filter shown in FIG. 7 is provided in the upper part of the pre-stage filter 210 of the optical filter 205.

In the detection of a preceding vehicle, a taillight in the captured image is recognized, thereby the preceding vehicle is detected. However, since an amount of light of the taillight is smaller than that of a headlight of an oncoming vehicle, and due to disturbance light such as street light, the detection of the taillight with high accuracy only from the brightness data is difficult. Therefore it is required that spectral information is used for the detection of the taillight, and based on an amount of light of the received red light the taillight is recognized. Then, in the present embodiment, as described later, a red light filter corresponding to the color of the taillight or a cyan filter, which transmits only a wavelength band of color of the taillight, is arranged in the post-stage filter 220 of the optical filter 205, thereby an amount of light of the received red light can be detected.

However, since each of the light receiving elements included in the image sensor 206 according to the present embodiment has sensitivity also for light of wavelength band of infrared light, when the image sensor 206 receives light including wavelength band of infrared light, the obtained captured image presents a red tone as a whole. As a result, the recognition of a red image part corresponding to the taillight may become difficult. Then, in the present embodiment, a part in the pre-stage filter 210 of the optical filter 205 corresponding to the vehicle detection image area 213 is assigned to the infrared light cut filter area 211. Therefore, the wavelength band of infrared light is removed from the part of the captured image data used for recognizing the taillight, and the recognition accuracy for the taillight increases.

Figure 10:
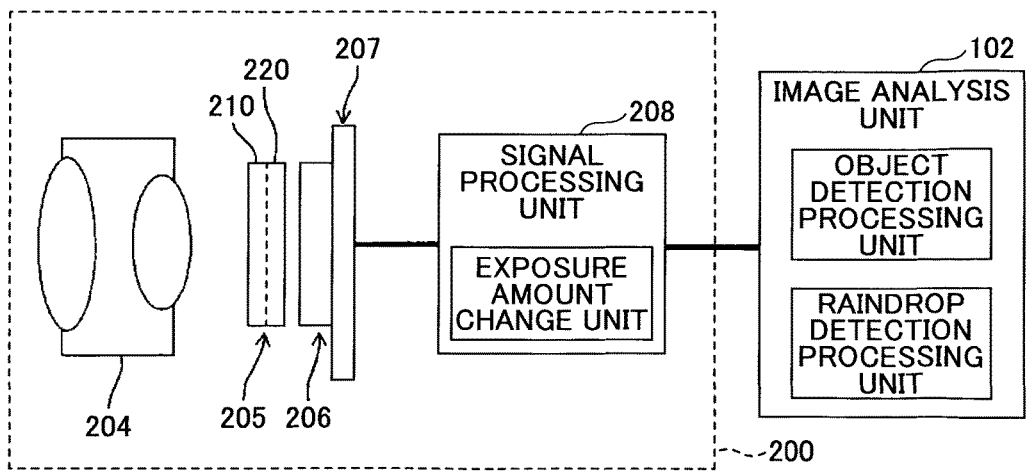
FIG. 10 is an explanatory diagram illustrating in detail an example of an object detection apparatus according to the present embodiment.

FIG. 10 is an explanatory diagram illustrating in detail the object detection apparatus according to the present embodiment.

The imaging apparatus 200, which configures the object detection apparatus according to the present embodiment, mainly includes an imaging lens 204, an optical filter 205, a sensor substrate 207 including an image sensor 206 having a pixel array, which is arranged two dimensionally, and a signal processing unit 208 for generating captured image data, in which analogue electric signals output (amount of light of the light received by each of the light receiving elements on the image sensor 206) from the sensor substrate 207, are converted into digital electric signals, and outputting the captured image data. Light from the capturing area including an object (detection object) passes through the imaging lens 204, transmits through the optical filter 205, and is converted into an electric signal according to its optical intensity at the image sensor 206. When the electric signal (analog signal) output from the image sensor 206 is input, in the signal processing unit 208, from the electric signal, a digital signal indicating brightness at each of the pixels on the image sensor 206, as captured image data, is output along with vertical and horizontal synchronization signals to a unit of the latter stage. Moreover, since the signal processing unit 208 also functions as an exposure amount changing means for performing exposure control for the image sensor 206 or an exposure condition changing means, the signal processing unit is provided with an exposure amount change unit. Moreover, the object detection apparatus according to the present embodiment illustrates an example where the image analysis unit 102 is provided with an object detection processing unit and a raindrop detection processing unit, and functions of an object detection processing means and of an adhering matter detection means in the object detection apparatus are provided in the image analysis unit 102. However, at least a part of these functions may be provided in the imaging apparatus 200.

Figure 11:
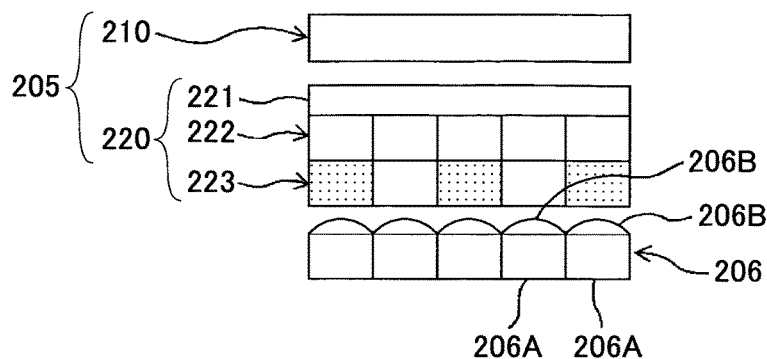
FIG. 11 is an enlarged schematic diagram illustrating an example of the optical filter and an image sensor of the imaging apparatus according to the present embodiment viewed from a direction orthogonal to a light transmission direction.

FIG. 11 is an enlarged schematic diagram illustrating the optical filter 205 and the image sensor 206 viewed from a direction orthogonal to a light transmission direction.

The image sensor 206 is an image sensor using a CCD (Charge Coupled Device) which reads signals of the respective imaging pixels by performing the simultaneous exposure (global shutter) for all the imaging pixels, a CMOS (Complementary Metal Oxide Semiconductor) which reads signals of the respective imaging pixels exposed by the line exposure (rolling shutter) or the like. For the light receiving element, photodiodes 206A are used. The photodiodes 206A are arranged in an array two dimensionally one for each pixel, and a microlens 206B is provided on an incident side of each photodiode 206A so as to enhance collection efficiency. The image sensor 206 is connected to a PWB (Printed Wiring Board) by a wire binding method or the like, thereby the sensor substrate 207 is formed.

The optical filter 208 is arranged in proximity to a surface of the image sensor 206 on the side of the microlens 206B. The post-stage filter 220 of the optical filter 205 includes a laminate structure where a polarization filter layer 222 and a spectral filter layer 223 are sequentially formed on a transparent filter substrate 221, as shown in FIG. 11. Both the polarization filter layer 222 and the spectral filter layer 223 are divided into areas so that each of the areas corresponds to one photodiode 206A on the image sensor 206.

The optical filter 205 and the image sensor 206 may be configured so that there is a gap between them. However, when the optical filter 205 adheres tightly to the image sensor 206, it becomes easier to make boundaries of the respective areas on the polarization filter layer 222 and the spectral filter layer 223 of the optical filter 205 coincide with boundaries among the photodiodes 206A on the image sensor 206. The optical filter 205 and the image sensor 206 may be connected with a UV adhesive agent, or four side regions outside effective pixels used for imaging may be connected with the UV adhesive agent or by thermocompression bonding while being supported by spacers outside the effective pixels.

Figure 12:
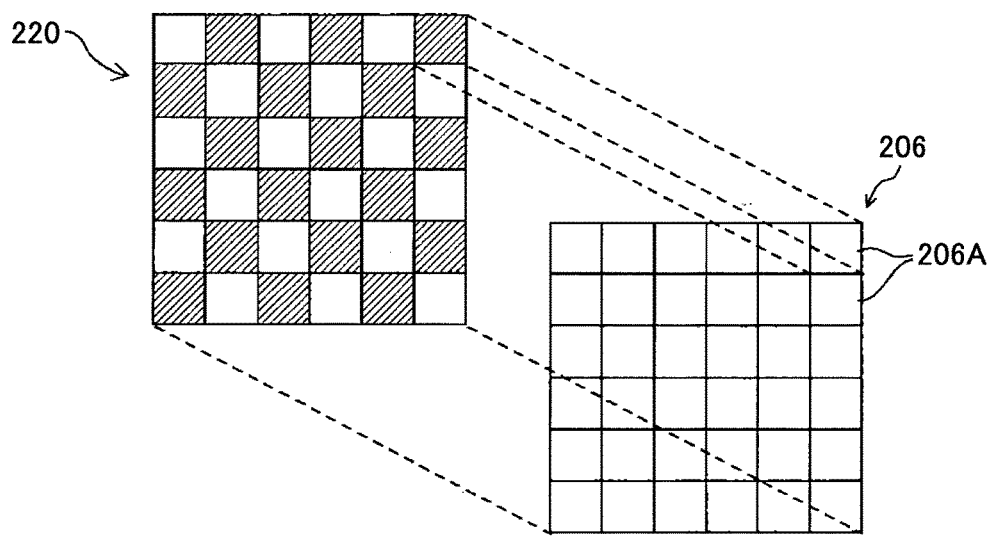
FIG. 12 is an explanatory diagram illustrating an example of a region division pattern of a polarization filter layer and a spectral filter layer of the optical filter according to the present embodiment.

FIG. 12 is an explanatory diagram illustrating an area division pattern on the polarization filter layer 222 and the spectral filter layer 223 of the optical filter 205 according to the present embodiment.

Two kinds of areas, a first area and a second area, are arranged on the polarization filter layer 222 and the spectral filter layer 223, respectively, so that each of the first area and the second area corresponds to one photodiode 206A on the image sensor 206. Thus, an amount of light received by each of the photodiodes 206A on the image sensor 206 can be acquired as polarization information or spectral information according to the kind of the area on the polarization filter layer 222 or the spectral filter layer 223 through which the received light is transmitted.

Meanwhile, in the present embodiment, the image sensor 206 will be explained on the assumption of the imaging elements for monochrome image. However, the image sensor 206 may include imaging elements for color image. In the case of configuring the image sensor 206 with the imaging elements for color image, a light transmission characteristic of each of the regions on the polarization filter layer 222 and the spectral filter layer 223 may be controlled according to the characteristic of a color filter attached to each of imaging pixels of imaging element for color image.

[First Configuration Example of Optical Filter]

Here, an example of a configuration of the optical filter 205 according to the present embodiment (hereinafter referred to as "first configuration example) will be explained.

Figure 13:
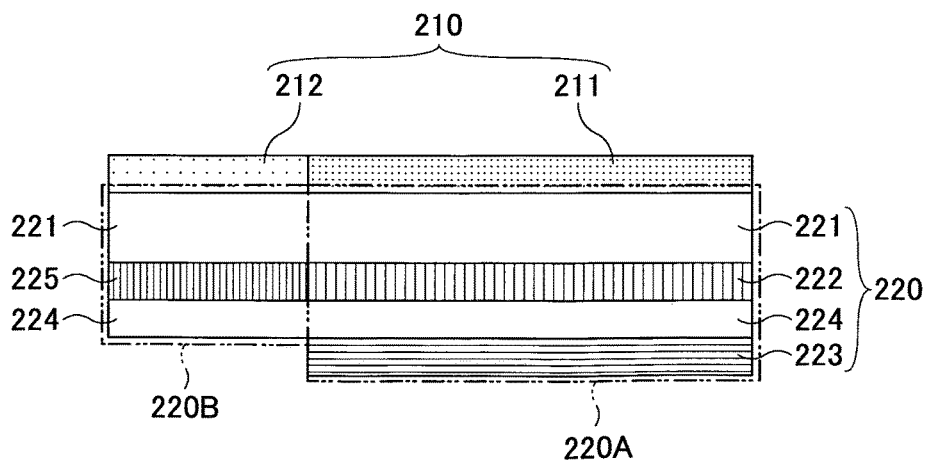
FIG. 13 is a cross-sectional diagram schematically illustrating an example of a configuration of layers of the optical filter according to a first configuration example.

FIG. 13 is a cross-sectional diagram schematically illustrating an example of a configuration of layers of the optical filter 205 according to a first configuration example.

In the post-stage filter 220 of the optical filter 205 according to the first configuration example, a configuration of layers of a vehicle detection filter part 220A corresponding to the vehicle detection image area 213 is different from a configuration of layers of a raindrop detection filter part 220B corresponding to the raindrop detection image area 214. Specifically, the vehicle detection filter part 220A includes the spectral filter layer 223, whereas the raindrop detection filter part 220B does not include the spectral filter layer 223. Moreover, a configuration of the polarization filter layer 222 in the vehicle detection filter part 220A is different from a configuration of the polarization filter layer 225 in the raindrop detection filter part 220B.

Figure 14:
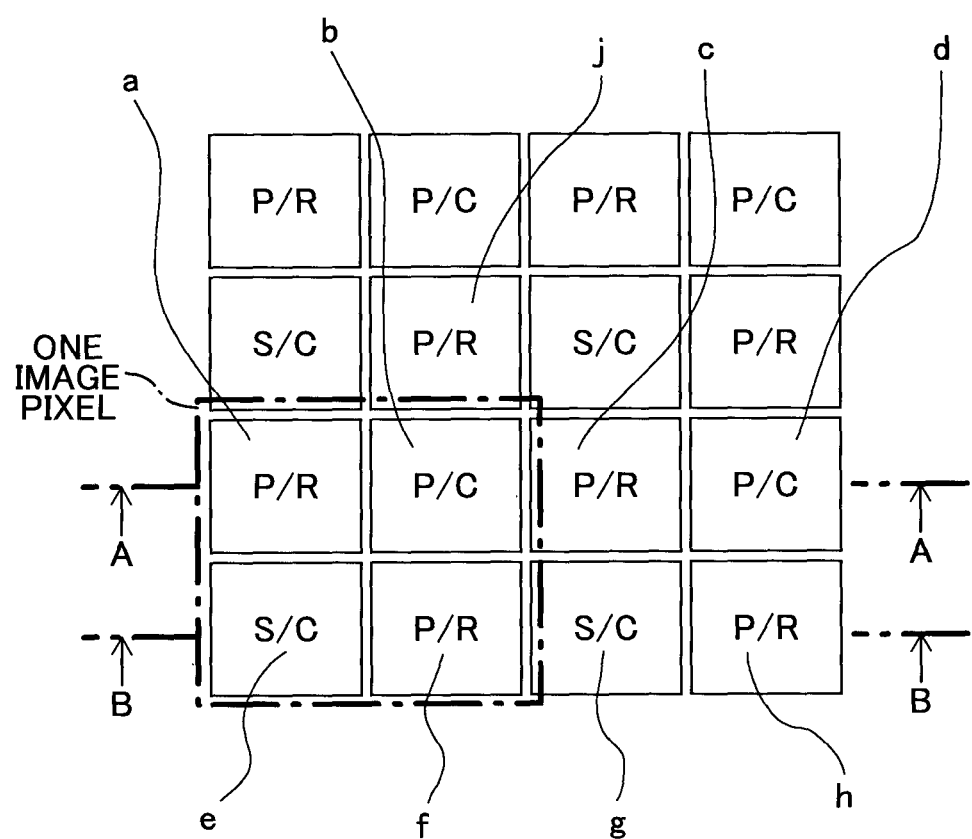
FIG. 14 is an explanatory diagram illustrating content of information corresponding to an amount of light transmitted through a filter unit for detecting a vehicle in the optical filter according to the present embodiment and received by each photodiode on the image sensor (information of each imaging pixel)

FIG. 14 is an explanatory diagram illustrating content of information corresponding to an amount of light transmitted through the vehicle detection filter part 220A in the optical filter 205 according to the first configuration example and received by each photodiode 206A on the image sensor 206 (information of each imaging pixel).

Figure 15A:
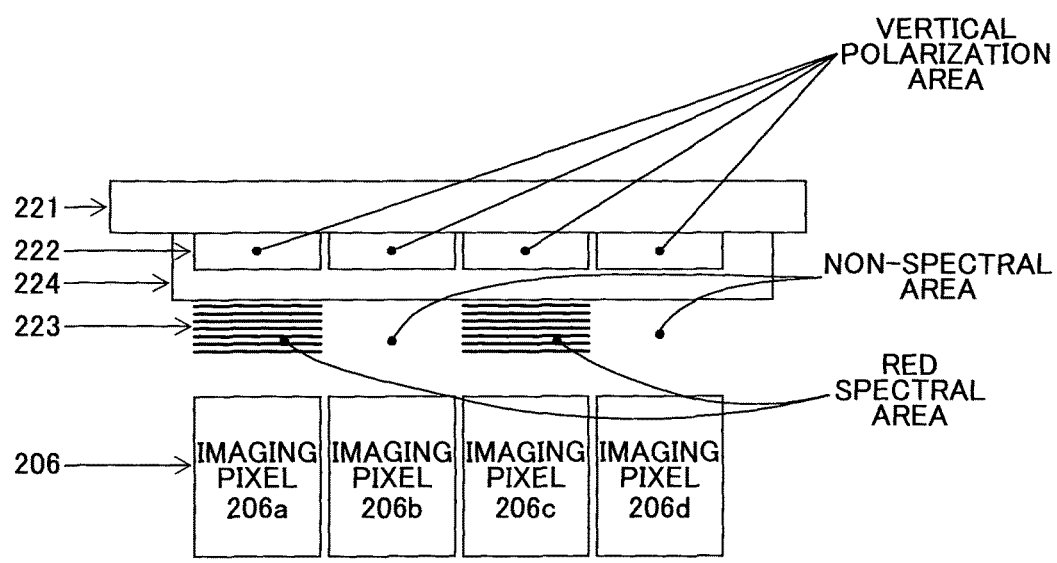
FIG. 15A is a cross-sectional diagram schematically illustrating an example of the filter unit for detecting a vehicle and the image sensor of the optical filter according to the present embodiment cut along reference line A-A shown in FIG. 14.

FIG. 15A is a cross-sectional diagram schematically illustrating the vehicle detection filter part 220A of the optical filter 205 cut along reference line A-A shown in FIG. 14 and the image sensor 206.

Figure 15B:
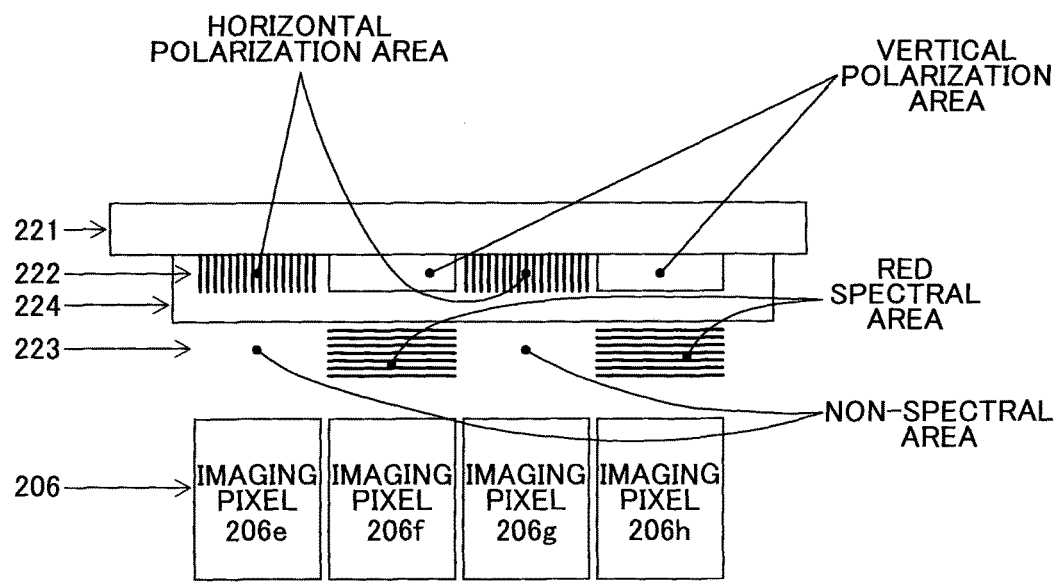
FIG. 15B is a cross-sectional diagram schematically illustrating an example of the filter unit for detecting a vehicle and the image sensor of the optical filter according to the present embodiment cut along reference line B-B shown in FIG. 14.

FIG. 15B is a cross-sectional diagram schematically illustrating the vehicle detection filter part 220A of the optical filter 205 cut along reference line B-B shown in FIG. 14 and the image sensor 206.

The vehicle detection filter part 220A of the optical filter 205 according to the first configuration example has a laminate configuration, as shown in FIGS. 15A and 15B, in which after the polarization filter layer 222 is formed on the transparent filter substrate 221 the spectral filter layer 223 is formed thereon. Then, the polarization filter layer 222 has a wire grid structure and an upper surface in the lamination direction (lower side surface in FIGS. 15A and 15B) is a corrugated surface. When the spectral filter layer 223 is formed directly on such a corrugated surface, the spectral filter layer is formed along the corrugated surface, an unevenness of a layer thickness of the spectral filter layer 223 arises, and an original spectral performance may not be obtained. Therefore, in the optical filter 205 according to the present embodiment, after filler is filled in on the upper side surface in the lamination direction in the polarization filter layer 222 to planarize the surface, the spectral filter layer 223 is formed thereon.

Since a material of the filler has, only not to prevent the function of the polarization filter layer 222, a corrugated surface of which is planarized by the filler, in the present embodiment, a material which does not have a polarization function is used. Moreover, for the planarization process by the filler, for example, a method of applying the filler by using a spin-on-glass method may be preferably employed. But, it is not limited to this.

In the first configuration example, a first area of the polarization filter layer 222 is a vertical polarization area that selects only a vertical polarization component, which oscillates in a direction parallel to the column (vertical direction) of the imaging pixels of the image sensor 206, and transmits the vertical polarization component. A second area of the polarization filter layer 222 is a horizontal polarization area that selects only a horizontal polarization component, which oscillates in a direction parallel to the row (horizontal direction) of the imaging pixels of the image sensor 206, and transmits the horizontal polarization component.

Moreover, a first area of the spectral filter layer 223 is a red spectral area that selects only light of a red wavelength band (specific wavelength band) included in a use wavelength band that can be transmitted through the polarization filter layer 222, and transmits the selected light. A second area of the spectral filter layer 223 is a non-spectral area that does not perform a wavelength selection and transmits light. Then, in the first configuration example, as shown by a dashed-dotted rectangle in FIG. 14, one image pixel of captured image data includes four adjacent imaging pixels (two columns and two rows), with reference Signs a, b, e and f.

At the imaging pixel "a", shown in FIG. 14, light transmitted through the vertical polarization area (first area) in the polarization filter layer 222 of the optical filter 205 and through the red spectral area (first area) in the spectral filter layer 223 is received. Accordingly, the imaging pixel "a" receives light P/R of the red wavelength band (shown by reference sign "R" in FIG. 14) of the vertical polarization component (shown by reference sign "P" in FIG. 14).

Moreover, at the imaging pixel "b", shown in FIG. 14, light transmitted through the vertical polarization area (first area) in the polarization filter layer 222 of the optical filter 205 and through the non-spectral area (second area) in the spectral filter layer 223 is received. Accordingly, the imaging pixel "b" receives non-spectral (shown by reference sign "C" in FIG. 14) light P/C of the vertical polarization component P.

Moreover, at the imaging pixel "e", shown in FIG. 14, light transmitted through the horizontal polarization area (second area) in the polarization filter layer 222 of the optical filter 205 and through the non-spectral area (second area) in the spectral filter layer 223 is received. Accordingly, the imaging pixel "e" receives non-spectral C light S/C of the horizontal polarization component (shown by reference sign "S" in FIG. 14).

At the imaging pixel "f", shown in FIG. 14, light transmitted through the vertical polarization area (first area) in the polarization filter layer 222 of the optical filter 205 and through the red spectral area (first area) in the spectral filter layer 223 is received. Accordingly, the imaging pixel "f" receives light P/R of the red wavelength band R of the vertical polarization component P, in the same way as in the imaging pixel "a".

According to the above configuration, in the first configuration example, one image pixel for an image of a vertical polarization component of red light can be obtained from output signals of the imaging pixel "a" and the imaging pixel "f". One image pixel for an image of a vertical polarization component of non-spectral light can be obtained from an output signal of the imaging pixel "b". One image pixel for an image of a horizontal polarization component of non-spectral light can be obtained from an output signal of the imaging pixel "e". Accordingly, in the first configuration example, by a single operation for imaging, three kinds of captured image data, including an image of a vertical polarization component of red light, an image of a vertical polarization component of non-spectral light and an image of a horizontal polarization component of non-spectral light, are obtained.

Meanwhile, though in the above-described captured image data, a number of image pixels may become less than the number of imaging pixels, in order to obtain an image with higher resolution, a publicly-known image interpolating technique may be used. For example, in the case of obtaining an image of the vertical polarization component of red light having higher resolution, for image pixels corresponding to the imaging pixels "a" and "f", information on the vertical polarization component P of the red light received at these imaging pixels "a" and "f" is directly used. For an image pixel corresponding to the imaging pixel "b", for example, an average of imaging pixels "a", "c", "f" and "j" surrounding it is used as information on a vertical polarization component of red light at the image pixel.

Moreover, in the case of obtaining an image of the horizontal polarization component of non-spectral light having higher resolution, for image pixel corresponding to the imaging pixel "e", information on the horizontal polarization component S of the non-spectral light received at the imaging pixel "e" is directly used. For image pixels corresponding to the imaging pixels "a", "b", "f", an average of imaging pixels "e", "g" and the like that receive horizontal polarization components of non-spectral light around it or the same value of the imaging pixel "e" may be used.

The image of the vertical polarization component of the red light obtained as above may be used for identifying a taillight, for example. Since in the image of the vertical polarization component of the red light a horizontal polarization component S is cut, a red image, in which a disturbance factor due to red light having great horizontal polarization component S, such as a red light reflected on a road surface or a red light from a dashboard in a room of the own vehicle 100 (reflection light) is prevented, can be obtained. Accordingly, by using the image of vertical polarization component of red light for identifying a taillight, a recognition rate for a taillight is enhanced.

Moreover, the image of the vertical polarization component of non-spectral light is used, for example, for identifying a white line or a headlight of an incoming vehicle. Since the in the image of the horizontal polarization component of the non-spectral light a horizontal polarization component S is cut, a non-spectral image, in which a disturbance factor due to white light having great horizontal polarization component S, such as a white light, e.g. a headlight, a street light or the like, reflected on a road surface or a white light from the dashboard in the room of the own vehicle 100 (reflection light) is prevented, can be obtained. Accordingly, by using the image of vertical polarization component of non-spectral light for identifying a white line or a headlight of an incoming vehicle, a recognition rate thereof is enhanced. Especially, on a road in the rain it is generally known that a reflected light from a water surface covering the road surface has much horizontal polarization component S. Accordingly, by using the image of vertical polarization component of non-spectral light for identifying a white line, it becomes possible to adequately identify a white line under a water surface on a road in the rain, and the recognition rate is enhanced.

Moreover, by using a comparative image in which a pixel value represents an index value comparing respective pixel values between the image of vertical polarization component of non-spectral light and the image of horizontal polarization component of non-spectral light, as described later, it becomes possible to accurately identify a metal body within the image area, a dry and wet state of the road surface, a solid body in the image area, a white line on a road in the rain, or the like. As the comparative image used here, for example, a difference image in which pixel values represent difference values between pixel values of the image of vertical polarization component of non-spectral light and of the image of horizontal polarization component of non-spectral light, a ratio image in which pixel values represent ratios of pixel values between these images, a differential polarization degree image in which pixel values represent ratio of the difference between the pixel values of these images to the sum of the pixel values of these images, or the like may be used.

Figure 16:
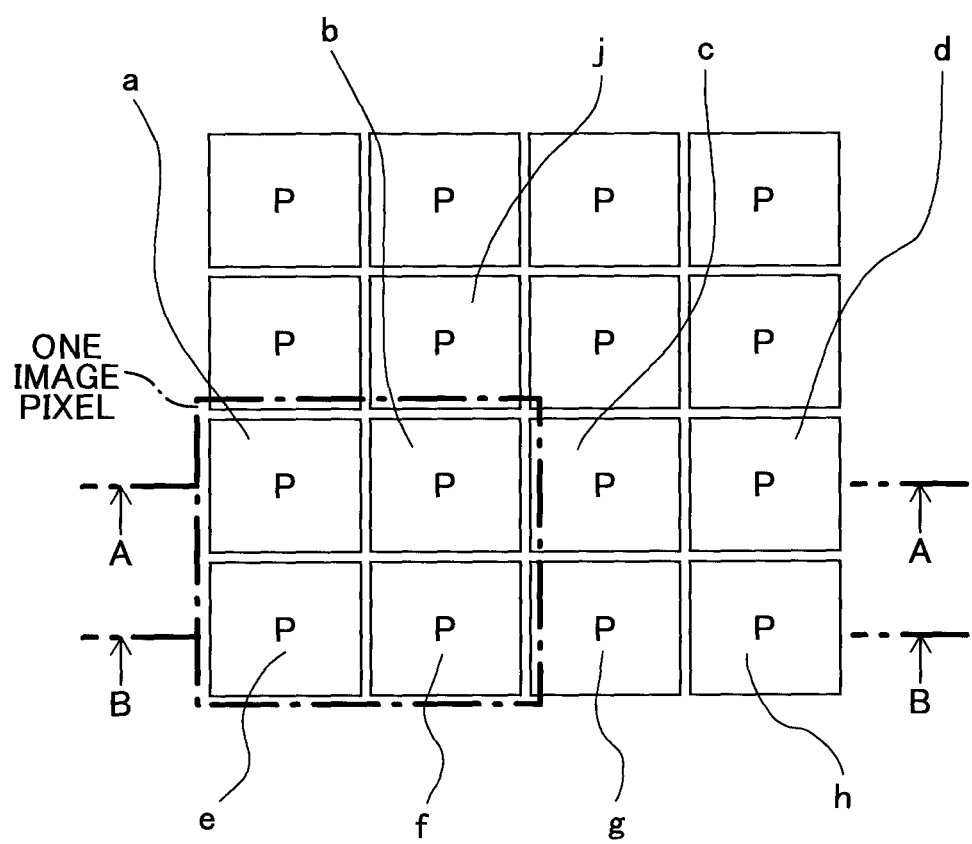
FIG. 16 is an explanatory diagram illustrating content of information corresponding to an amount of light transmitted through a filter unit for detecting raindrops in the optical filter according to the present embodiment and received by each photodiode on the image sensor (information of each imaging pixel)

FIG. 16 is an explanatory diagram illustrating content of information corresponding to an amount of light transmitted through the raindrop detection filter part 220B in the optical filter 205 according to the first configuration example and received by each photodiode 206A on the image sensor 206 (information of each imaging pixel).

Figure 17A:
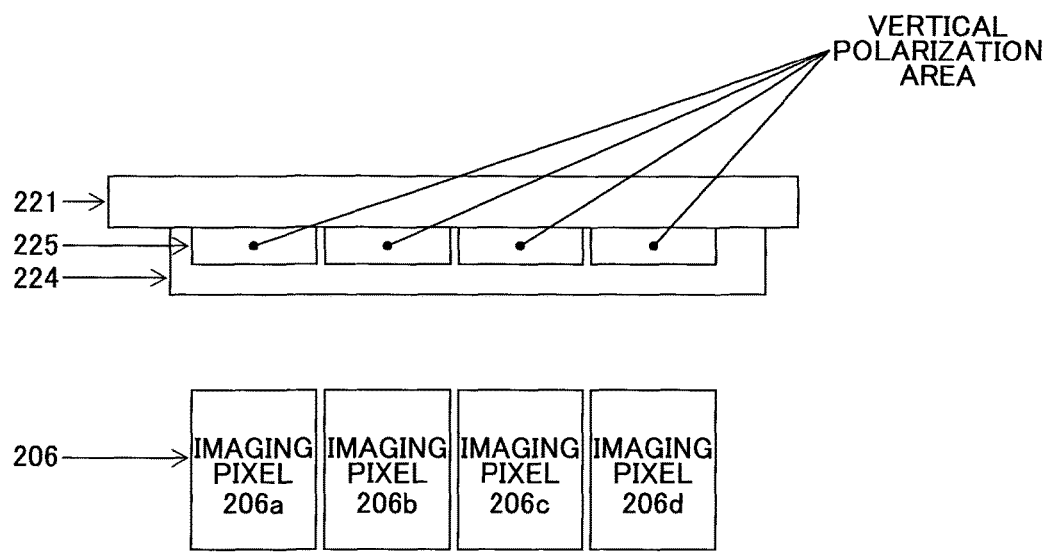
FIG. 17A is a cross-sectional diagram schematically illustrating an example of the filter unit for detecting raindrops and the image sensor of the optical filter according to the present embodiment cut along reference line A-A shown in FIG. 16.

FIG. 17A is a cross-sectional diagram schematically illustrating the raindrop detection filter part 220B of the optical filter 205 cut along reference line A-A shown in FIG. 16 and the image sensor 206.

Figure 17B:
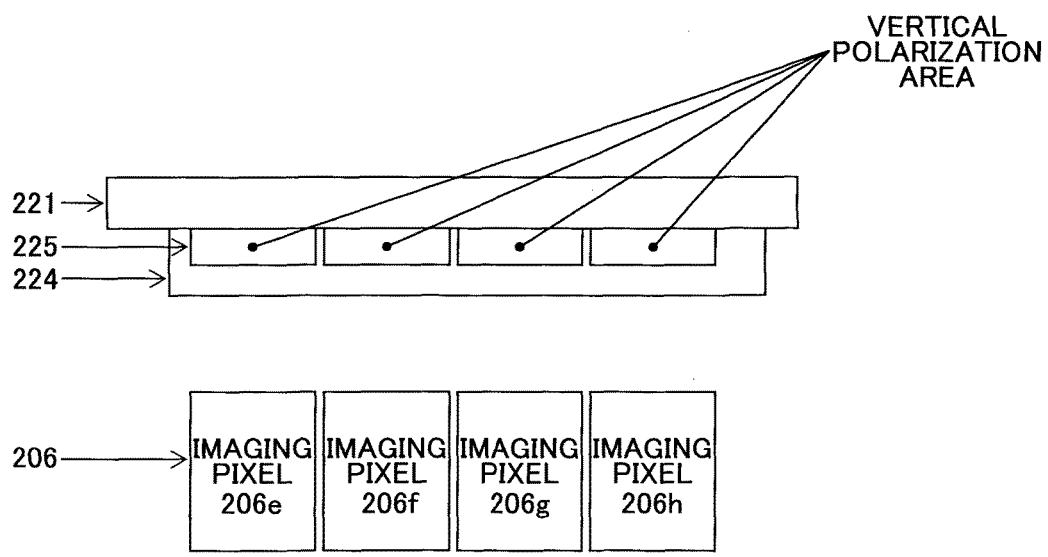
FIG. 17B is a cross-sectional diagram schematically illustrating an example of the filter unit for detecting raindrops and the image sensor of the optical filter according to the present embodiment cut along reference line B-B shown in FIG. 16.

FIG. 17B is a cross-sectional diagram schematically illustrating the raindrop detection filter part 220B of the optical filter 205 cut along reference line B-B shown in FIG. 16 and the image sensor 206.

In the raindrop detection filter part 220B of the optical filter 205 according to the first configuration example, as shown in FIGS. 17A and 17B, a polarization filter layer 225 having a wire grid structure is formed on the filter substrate which is shared with the vehicle detection filter part 220A. An upper side surface of the polarization filter layer 225 in the lamination direction is filled with filler to be planarized along with the polarization filter layer 222 of the vehicle detection filter part 220A. However, in the raindrop detection filter part 220B a spectral filter layer 223 is not laminated, different from the vehicle detection filter part 220A.

In the present embodiment, a view inside the own vehicle 100 may be reflected on an inner wall surface of the front windscreen 105. This reflection is by light reflected regularly on the inner wall of the front windscreen 105. This reflection is disturbance light with a relatively large light strength since it is a regular reflection light. Accordingly, when the reflection is projected onto the raindrop detection image area 214 with raindrops, the detection accuracy for raindrops decreases. Moreover, when a regular reflection light, which is a light emitted from the light source 202 and reflected regularly on the inner wall surface of the front windscreen 105, is projected onto the raindrop detection image area 214 along with the raindrops, the regular refection light also becomes disturbance light and lowers the detection accuracy for raindrops.

Since the above-described disturbance light that lowers the detection accuracy for raindrops is a regular reflection light reflected regularly on the inner wall surface of the front windscreen 105, most of polarization components thereof are polarization components, polarization directions of which are orthogonal to the light source incidence plane, i.e. horizontal polarization components S which oscillate parallel to the row of the imaging pixels (horizontal direction) of the image sensor 206. Therefore, in the polarization filter layer 225 in the raindrop detection filter part 220B of the optical filter 205 according to the first configuration example, a transmission axis is set so as to transmit only a polarization component having a polarization direction parallel to a virtual plane including a light axis of a light from the light source 202 to the front windscreen 105 and a light axis of the imaging lens 204 (light source incidence plane), i.e. a vertical polarization component P that oscillates parallel to the column of the imaging pixels (vertical direction) of the image sensor 206.

According to the above, light transmitted through the polarization filter layer 225 of the raindrop detection filter part 220B has only vertical polarization component P, and horizontal polarization component S, which occupies most of disturbance light such as reflection light on the inner wall surface of the front windscreen 105 or regularly reflected light from the light source 202 reflected regularly on the inner wall surface of the front windscreen 105, can be cut. As a result, the raindrop detection image area 214 becomes a vertical polarization image by the vertical polarization component P which is less affected by disturbance light, and the detection accuracy of raindrops based on captured image data in the raindrop detection image area 214 is enhanced.

In the first configuration example, the infrared light cut filter area 211 and the infrared light transmission filter area 212 included in the pre-stage filter 210 are formed respectively by multi-layer films, layer structures of which are different from each other. Such a pre-stage filter 210 is manufactured according a production method in which, for example, a part of the infrared light transmission filter area 212 is formed by a vacuum deposition or the like while masking a part of the infrared light cut filter area 211, and the part of the infrared light cut filter area 211 is formed by the vacuum deposition or the like while masking the part of the infrared light transmission filter area 212.

Moreover, in the first configuration example, both the polarization filter layer 222 of the vehicle detection filter part 220A and the polarization filter layer 225 of the raindrop detection filter part 220B have the wire grid structure for dividing into areas in two dimensional directions. The polarization filter layer 222 includes two kinds of areas divided in units of imaging pixels, transmission axes of which are orthogonal to each other (vertical polarization area and horizontal polarization area). The polarization filter layer 225 includes one kind of area divided in units of imaging pixels, having a transmission axis that transmits only the vertical polarization component P. In the case of forming the polarization filter layers 222 and 225 having different configurations on the same transparent filter substrate 221, for example, by adjusting a groove direction of a template (corresponding to a mold) for performing patterning for metal wires having the wire grid structure, it is easy to adjust the metal wire for each area in the longitudinal direction.

Meanwhile, in the first configuration example, the infrared light cut filter area 211 may not be provided in the optical filter 205 and, for example, the infrared light cut filter area 211 may be provided in the imaging lens 204. In this case, the manufacturing of the optical filter 205 becomes simple.

Moreover, instead of the infrared light cut filter area 211, a spectral filter layer that transmits only vertical polarization component P may be formed on the raindrop detection filter part 220B in the post-stage filter 220. In this case, it is not necessary to form the infrared light cut filter area 211 in the pre-stage filter 210.

Moreover, the polarization filter layer does not always have to be provided.

Figure 18:
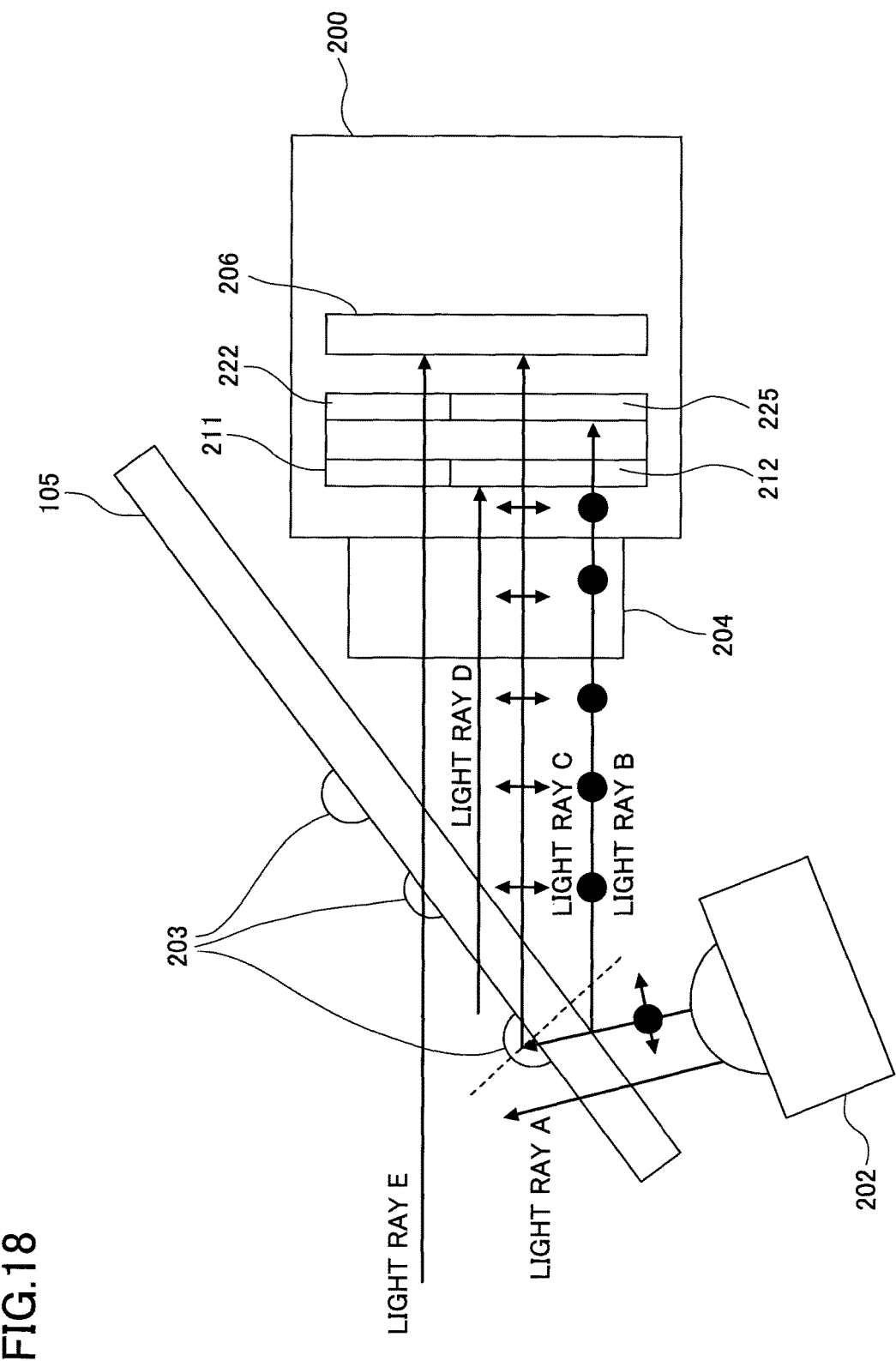
FIG. 18 is an explanatory diagram illustrating an example of various lights related to the raindrop detection according to the present embodiment.

FIG. 18 is an explanatory diagram illustrating various light related to the raindrop detection.

The light source 202 is arranged so that regularly reflected light on the outer wall surface of the front windscreen 105 approximately coincides with the light axis of the imaging lens 204.

In FIG. 18, a light ray A is a light ray emitted from the light source 202 and passing through the front windscreen 105. In the case where a raindrop 203 does not adhere to the outer wall surface of the front windscreen 105, light emitted from the light source 202 to the front windscreen 105, as shown by the light ray A, passes through the front windscreen 105 and leaks directly to the outside of the own vehicle 100. Accordingly, for the light source 202, taking account that light may enter a human eye, a light source having a wavelength and a light amount of the eye-safe band is preferably selected. Moreover, as shown in FIG. 18, it is preferable to configure so that light emitted from the light source 202 to the front windscreen 105 goes upward vertically, since the light does not enter a human eye.

A light ray B in FIG. 18 is a light ray emitted from the light source 202, reflected regularly on the inner wall surface of the front windscreen 105 and entering the imaging apparatus 200. A part of the light emitted from the light source 202 to the front windscreen 105 is reflected regularly on the inner wall surface of the front windscreen 105. It is generally known that for a polarization component of this regularly reflected light (light ray B) an S polarization component (horizontal polarization component S) oscillating in the direction orthogonal to the entrance plane (direction perpendicular to the plane of paper of FIG. 18) is dominant. The regularly reflected light (light ray B), which is emitted from the light source 202 and reflected regularly on the inner wall surface of the front windscreen 105, does not fluctuate by a presence or an absence of a raindrop 203 adhering to the outer wall surface of the front windscreen 105. Therefore, the light ray B is not only an unnecessary light for detecting raindrops, but also a disturbance light that decreases the detection accuracy for detecting raindrops. In the first configuration example, the light ray B (horizontal polarization component S) is cut by the polarization filter layer 225 of the raindrop detection filter part 220B, and the decrease in the raindrop detection accuracy due to the light ray B can be suppressed.

A light ray C in FIG. 18 is a light ray emitted from the light source 202, passing through the inner wall surface of the front windscreen 105, then reflected by a raindrop adhering to the outer wall surface of the front windscreen 105 and entering the imaging apparatus 200. A part of the light emitted from the light source 202 to the front windscreen 105 passes through the inner wall surface of the front windscreen 105. In the light passing through the inner wall surface, a vertical polarization component P is more dominant than a horizontal polarization component S. In the case where raindrops adhere to the outer wall surface of the front windscreen 105, the light passing through the inner wall surface of the front windscreen 105 does not leak to the outside as the light ray A, but is reflected to multiply inside the raindrop, passes through the front windscreen 105 again toward the side of the imaging apparatus 200, and enters the imaging apparatus 200. Then, since the infrared light transmission filter area 212 of the pre-stage filter 210 in the optical filter 205 of the imaging apparatus 200 is configured so as to transmit an emission wavelength (infrared light) of the light source 202, the light ray C passes through the infrared light transmission filter area 212. Moreover, since in the polarization filter layer 225 of the raindrop detection filter part 220B in the subsequent post-stage filter 220, the longitudinal direction of the metal wires having the wire grid structure is formed so as to transmit a vertical polarization component P, the light ray C passes through also the polarization filter layer 225. Accordingly, the light ray C reaches the image sensor 206, and the detection of raindrops is performed according to the received amount of light.

A light ray D in FIG. 18 is a light ray passing through the front windscreen 105 from the outside of the front windscreen 105 and entering toward the raindrop detection filter part 220B of the imaging apparatus 200. This light ray D also can be a disturbance light upon detecting raindrops, but most of the light ray D is cut by the infrared light transmission filter area 212 of the pre-stage filter 210 in the optical filter 205. Accordingly, the decrease in the raindrop detection accuracy due to the light ray D can be suppressed.

A light ray E in FIG. 18 is a light ray passing through the front windscreen 105 from the outside of the front windscreen 105 and entering toward the vehicle detection filter part 220A of the imaging apparatus 200. An infrared band of the light ray E is cut by the infrared light cut filter area 211 of the pre-stage filter 210 in the optical filter 205, and only a light of visible light band is captured. The captured image is used for detecting a headlight of an oncoming vehicle, a taillight of a preceding vehicle and a white line.

Meanwhile, in the first configuration example, the case where the number of the light source 202 is one is explained, but plural light sources 202 may be arranged. In this case, the polarization filter layer 225 of the raindrop detection filter part 220B is divided into areas so that plural polarization filter areas, transmission axis directions of which are different from each other, are repeated in the two dimensional array direction of the imaging pixels in units of imaging pixels. Then, in each polarization filter area, the transmission axis is set so as to transmit only a polarization component, a polarization direction of which is parallel to a virtual plane including a light axis of light from a light source and the light axis of the imaging lens 204, wherein an incident light quantity of the light from the light source into the polarization filter area is the greatest among the ones from plural light sources 202.

Moreover, in either case where the number of light source 202 is one and the number of light sources 202 is more than one, the transmission axis direction of the polarization filter layer 225, which can appropriately remove the disturbance light reflected regularly on the inner wall surface of the front windscreen 105, varies according to a position on the inner wall surface of the front windscreen 105 at which the disturbance light entering each location of the polarization filter layer 225 is reflected. This is because the front windscreen 105 of a vehicle not only slopes downward toward the front, but also is curved backward greatly from a center to both ends in the horizontal direction so as to enhance the aerodynamic characteristic. In this case, in the raindrop detection image area 214 of the captured image, although in the central portion of the image a disturbance light can be appropriately cut, in the edge portion of the image the disturbance light may not be cut appropriately.

Figure 19:
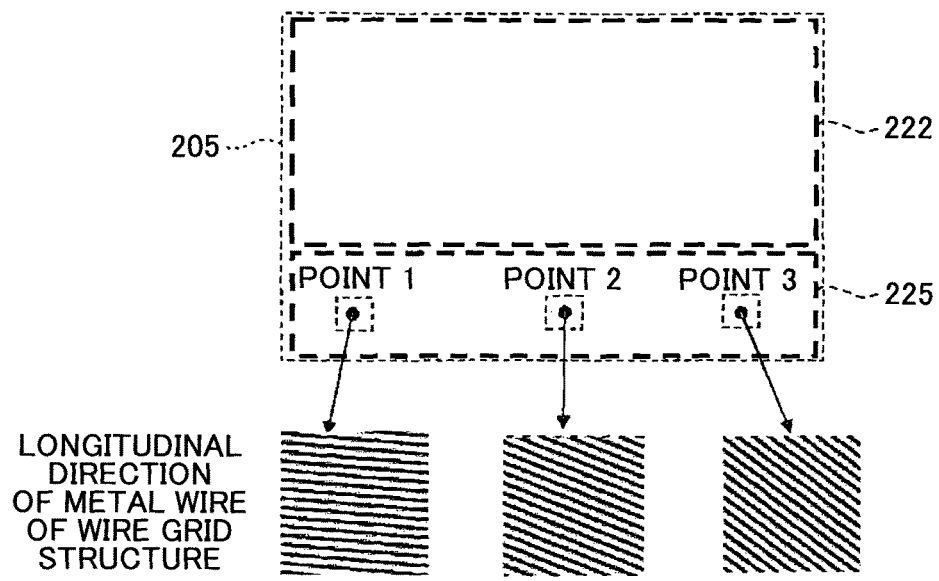
FIG. 19 is an explanatory diagram illustrating an example of the filter unit for detecting raindrops of the optical filter according to the present embodiment where longitudinal directions of metal wires of a wire grid structure are different from each other at respective points on the polarization filter layer.

FIG. 19 is an explanatory diagram illustrating an example that longitudinal directions of the metal wires of the wire grid structure are different from each other at respective points (points 1 to 3) on the polarization filter layer 225.

According to the above configuration, it becomes possible to cut the disturbance light appropriately in the entire area of the raindrop detection image area 214 of the captured image.

Meanwhile, in the optical filter 205 according to the present embodiment, the post-stage filter 220 having the polarization filter layer 222 divided into areas, as shown in FIG. 14, and the spectral filter layer 223 is provided nearer the side of the image sensor 206 than the pre-stage filter 210. However, the pre-stage filter 210 may be provided nearer the side of the image sensor 206 than the post-stage filter 220.

[Second Configuration Example of Optical Filter]

Next, another configuration example (hereinafter, referred to as "second configuration example") of the optical filter 205 according to the present embodiment will be explained. Meanwhile, in a following explanation of the optical filter 205, since configurations of the pre-stage filter 210 and the raindrop detection filter part 220B of the post-stage filter 220 are the same as in the first configuration example, explanations of them will be omitted and only the vehicle detection filter part 220A of the post-stage filter 220 will be explained.

Figure 20:
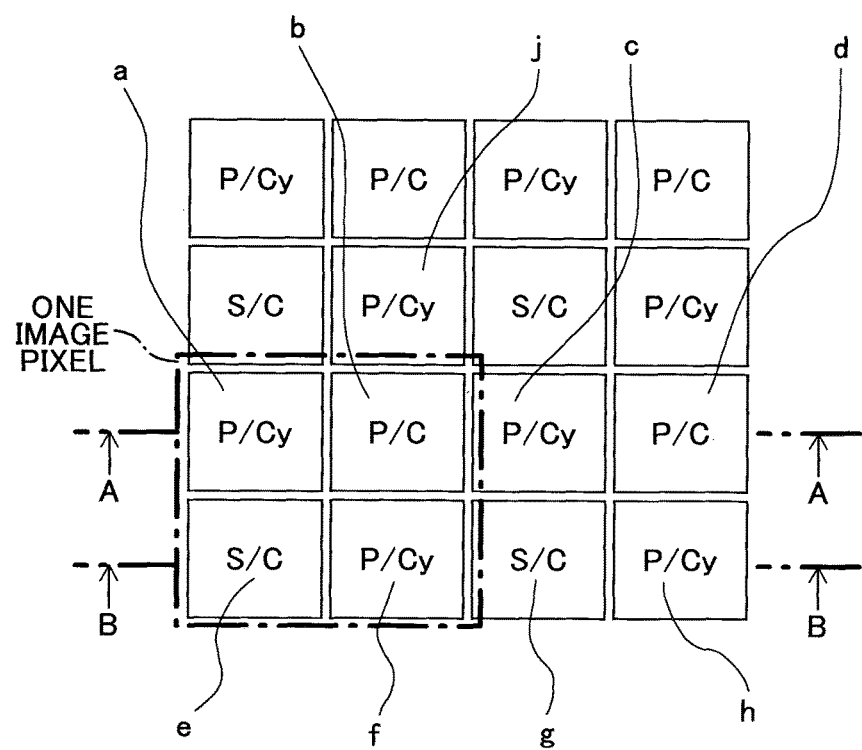
FIG. 20 is an explanatory diagram illustrating an example of content of information corresponding to an amount of light transmitted through an optical filter according to a second configuration example and received by each photodiode on the image sensor (information of each imaging pixel)

FIG. 20 is an explanatory diagram illustrating content of information corresponding to an amount of light transmitted through the optical filter 205 according to the second configuration example and received by each photodiode 206A on the image sensor 206 (information of each imaging pixel).

Figure 21A:
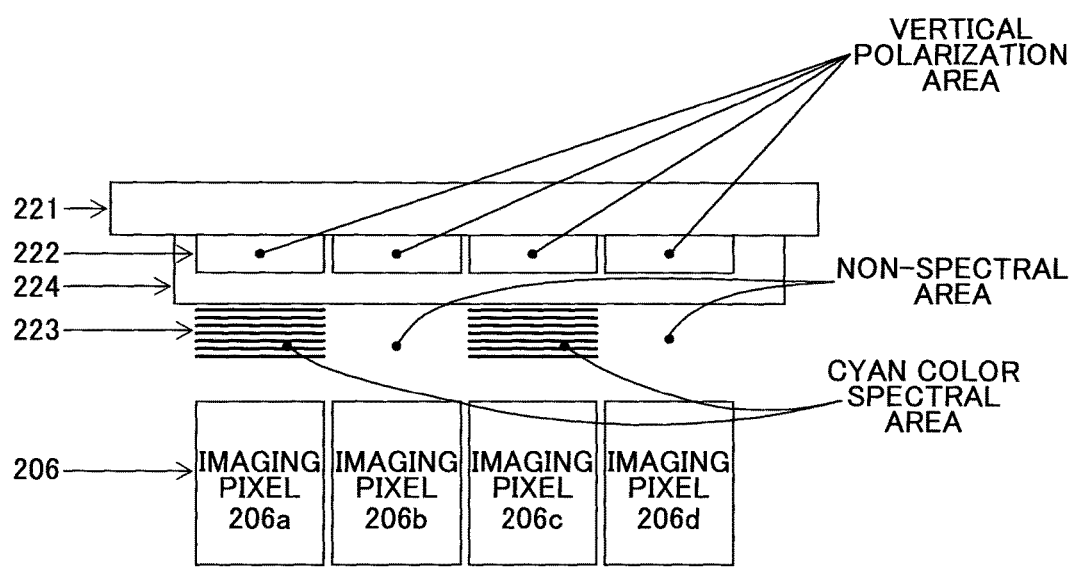
FIG. 21A is a cross-sectional diagram schematically illustrating an example of the optical filter and the image sensor according to the present embodiment cut along reference line A-A shown in FIG. 20.

FIG. 21A is a cross-sectional diagram schematically illustrating the optical filter 205 cut along reference line A-A shown in FIG. 20 and the image sensor 206.

Figure 21B:
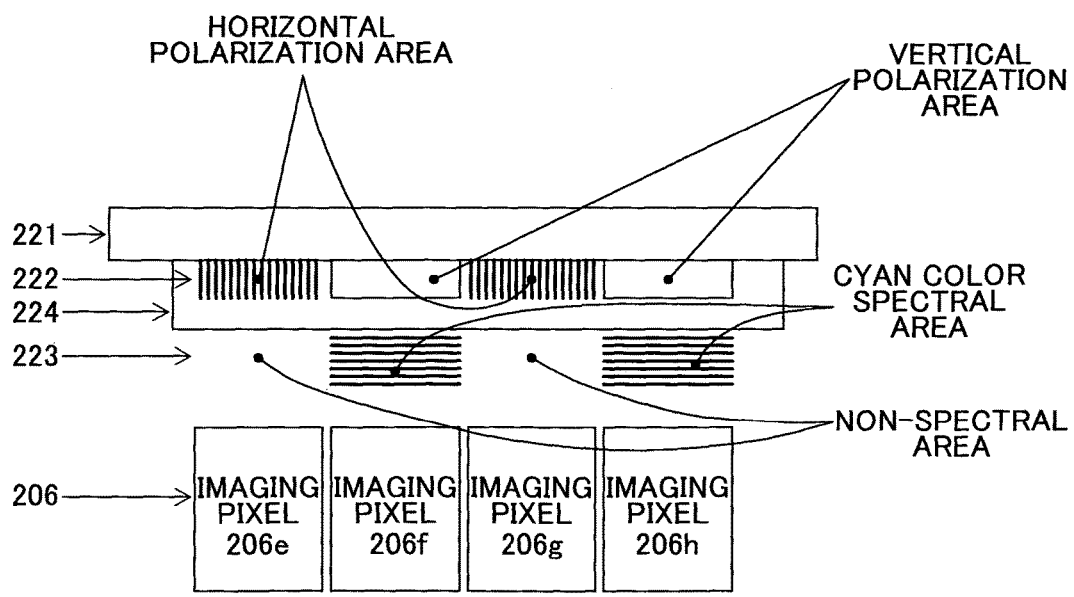
FIG. 21B is a cross-sectional diagram schematically illustrating an example of the optical filter and the image sensor according to the present embodiment cut along reference line B-B shown in FIG. 20.

FIG. 21B is a cross-sectional diagram schematically illustrating the optical filter 205 cut along reference line B-B shown in FIG. 20 and the image sensor 206.

In the first configuration example, the first area in the spectral filter layer 223 is a red spectral area that selects only light of the red wavelength band and transmits it. On the other hand, in the second configuration example, the first area is a cyan spectral area that selects only light of a cyan color wavelength band (shown by Cy in FIG. 20) which is included in the use wavelength band that can be transmitted through the polarization filter layer 222, and transmits the selected light. The other configurations are the same as in the first configuration example.

According to the second configuration example, one image pixel for an image of a vertical polarization component of cyan light can be obtained from output signals of the imaging pixel "a" and the imaging pixel "f". One image pixel for an image of a vertical polarization component of non-spectral light can be obtained from an output signal of the imaging pixel "b". One image pixel for an image of a horizontal polarization component of non-spectral light can be obtained from an output signal of the imaging pixel "e". Therefore, according to the second configuration example, by a single operation for imaging, three kinds of captured image data, including an image of a vertical polarization component of cyan light, an image of a vertical polarization component of non-spectral light and an image of a horizontal polarization component of non-spectral light, are obtained.

In the second configuration example, by using the three kinds of captured image data obtained as above, in the same way as in the first configuration example, a recognition rate for the respective identification objects (taillight, headlight, a white line or the like) is enhanced.

Furthermore, according to the second configuration example, a comparative image between the image of vertical polarization component of cyan light and the image of vertical polarization component of non-spectral light can be used. By using the comparative image as above, an identification of a taillight with high accuracy becomes possible. That is, a received amount of light from a taillight at an imaging pixel transmitted through the cyan spectral area is small, but a received amount of light at an imaging pixel transmitted through the non-spectral area is great. Therefore, by generating the comparative image between the image of the vertical polarization component of cyan light and the image of vertical polarization component of non-spectral light so that the above difference is reflected, a contrast between the taillight and a background part around it can be made great; thereby the recognition rate of the taillight is enhanced.

Moreover, in the second configuration example, since the cyan spectral area using a cyan filter that transmits only a light of cyan color is used instead of the red spectral area using the red filter in the first configuration example, an ability for discriminating a taillight of a preceding vehicle which is close to the own vehicle from a headlight of an oncoming vehicle is higher than that in the first configuration example. In the case of using the red spectral area as in the first configuration example, a received amount of light from the taillight of the preceding vehicle which is close to the own vehicle through the red spectral area may be too great to lose light reception sensitivity, and the received amount of light is saturated. Therefore, the recognition rate of the taillight of the preceding vehicle which is close to the own vehicle may decrease. On the other hand, in the case of using the cyan spectral area, as in the second configuration example; the received amount of light from the taillight of the preceding vehicle which is close to the own vehicle through the cyan spectral area is not saturated, and the decrease in the recognition rate of the taillight of the preceding vehicle which is close to the own vehicle can be prevented.

[Third Configuration Example of Optical Filter]

Next, yet another configuration example (hereinafter, referred to as "third configuration example") of the optical filter 205 according to the present embodiment will be explained.

Figure 22:
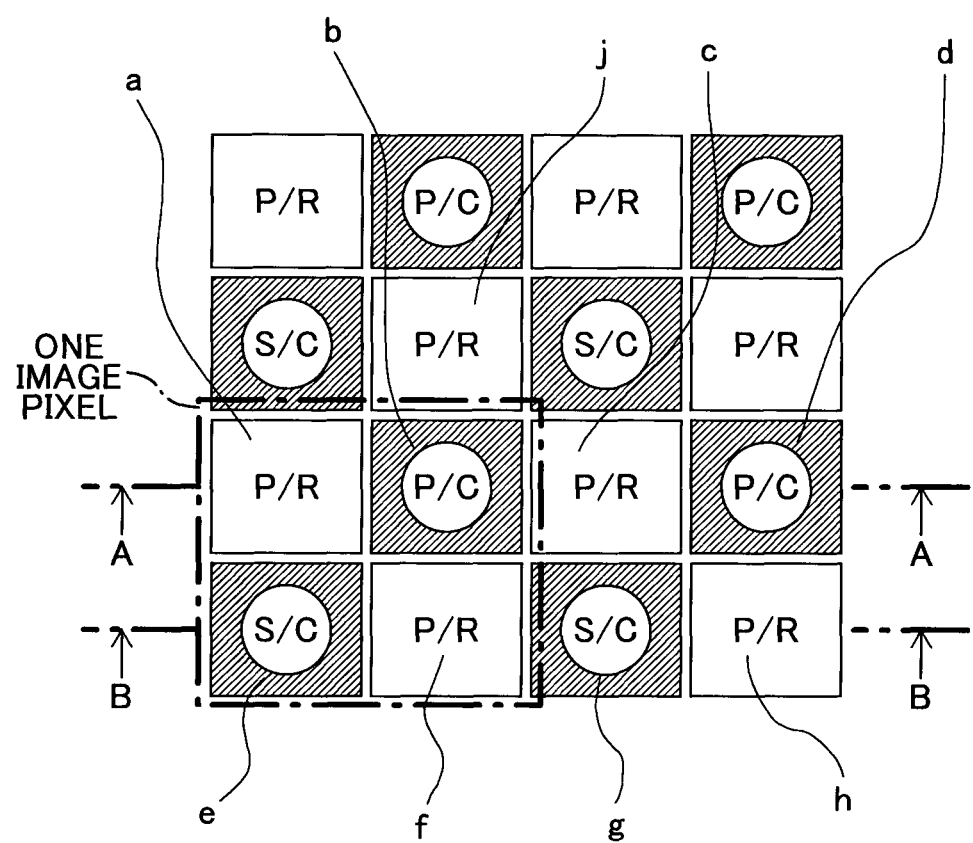
FIG. 22 is an explanatory diagram illustrating an example of content of information corresponding to an amount of light transmitted through an optical filter according to a third configuration example and received by each photodiode on the image sensor (information of each imaging pixel)

FIG. 22 is an explanatory diagram illustrating content of information corresponding to an amount of light transmitted through the optical filter 205 according to the third configuration example and received by each photodiode 206A on the image sensor 206 (information of each imaging pixel).

Figure 23A:
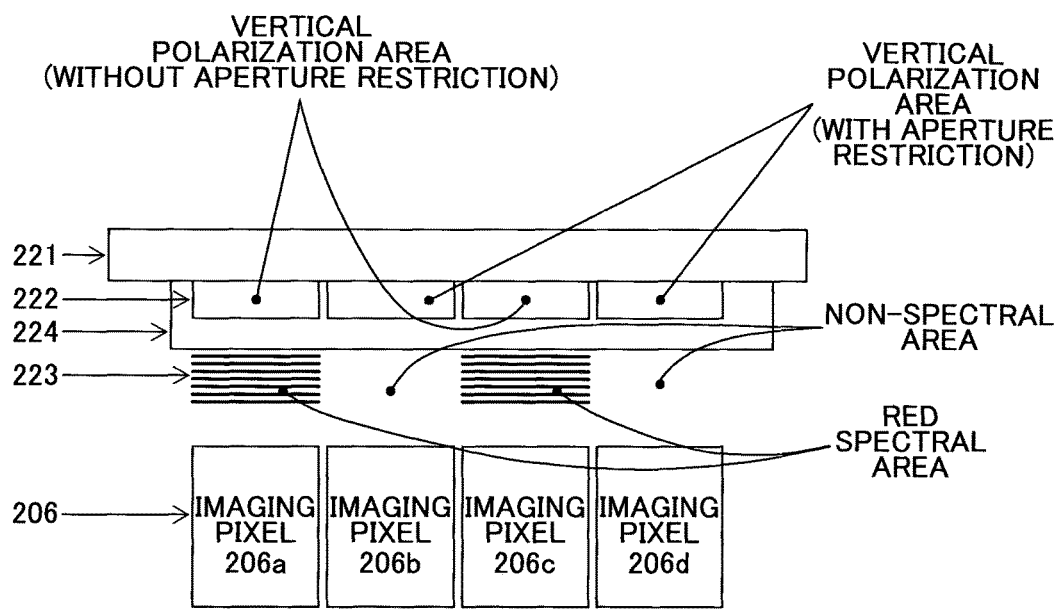
FIG. 23A is a cross-sectional diagram schematically illustrating an example of the optical filter and the image sensor according to the present embodiment cut along reference line A-A shown in FIG. 22.

FIG. 23A is a cross-sectional diagram schematically illustrating the optical filter 205 cut along reference line A-A shown in FIG. 22 and the image sensor 206.

Figure 23B:
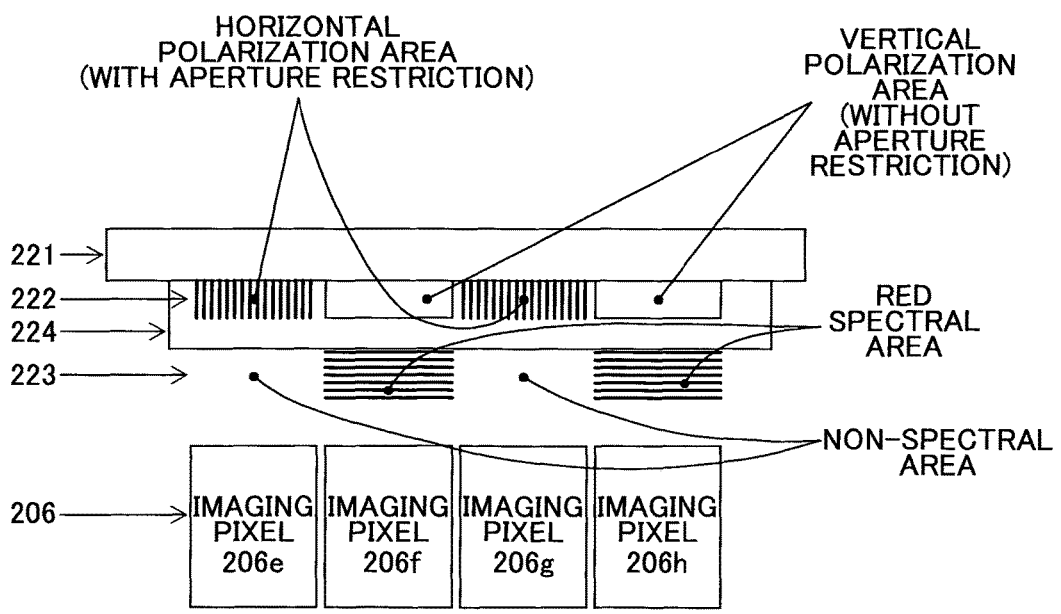
FIG. 23B is a cross-sectional diagram schematically illustrating an example of the optical filter and the image sensor according to the present embodiment cut along reference line B-B shown in FIG. 22.

FIG. 23B is a cross-sectional diagram schematically illustrating the optical filter 205 cut along reference line B-B shown in FIG. 22 and the image sensor 206.

Configurations of divided areas of the polarization filter layer 222 and the spectral filter layer 223 according to the third configuration example are the same as in the first configuration example. However, in the third configuration example, an aperture restriction part for restricting a received amount of light is provided corresponding to the non-spectral area in the spectral filter layer 223. Accordingly, in the third configuration example, as in the first configuration example, by a single operation for imaging, three kinds of captured image data, including an image of a vertical polarization component of red light, an image of a vertical polarization component of non-spectral light and an image of a horizontal polarization component of non-spectral light, are obtained. Among these captured image data, the image of vertical polarization component of non-spectral light and the image of horizontal polarization component of non-spectral light are generated by lesser amounts of received light than those in the first configuration example.

Figure 24:
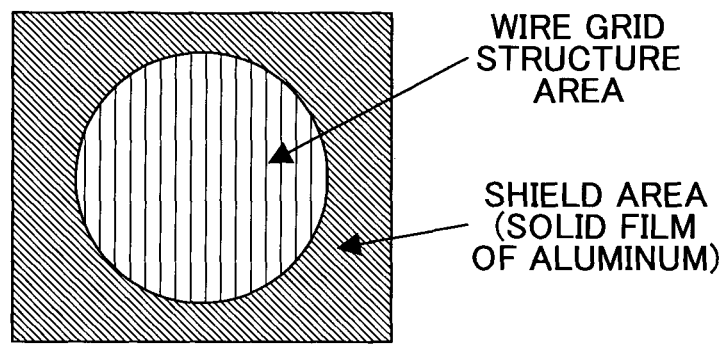
FIG. 24 is an explanatory diagram illustrating an example of a configuration for limiting an amount of light transmitted through a non-spectral area of the spectral filter layer of the optical filter according to the present embodiment.
Figure 25:
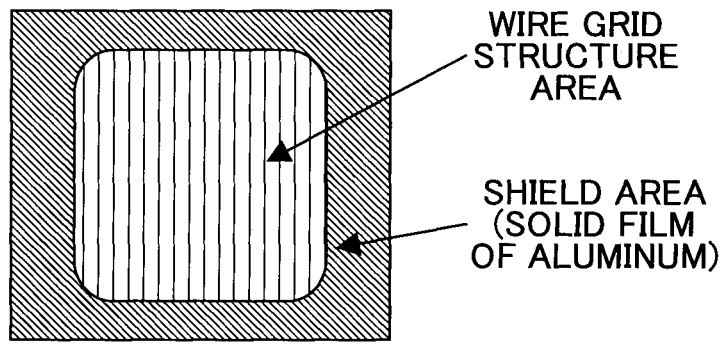
FIG. 25 is an explanatory diagram illustrating another example of a configuration for limiting an amount of light transmitted through a non-spectral area of the spectral filter layer of the optical filter according to the present embodiment.

The configuration of restricting the received amount of light transmitted through the non-spectral area in the spectral filter layer 223 includes a configuration, in which a wire grid structure having a circular shape is formed in a central portion of the imaging pixel of the polarization filter layer 222 and a solid film of aluminum is formed around it, corresponding to the non-spectral area in the spectral filter layer 223, as shown in FIG. 24. According to the above configuration, since light is shielded by the solid film of aluminum, the received amount of light transmitted through the non-spectral area in the spectral filter layer 223 can be restricted by a width of the area (aperture rate) in which the wire grid structure is formed. Meanwhile, the shape of area, in which the wire grid structure is formed, is not limited to a circle as shown in FIG. 24. For example, the shape may be an approximate rectangle, as shown in FIG. 25. In the case where the shape of area has a corner, as shown in FIG. 25, when roundness is formed at the corner, it becomes easier to obtain a shape dimension by etching or the like.

The polarization filter layer 222 having the wire grid structure is generally manufactured by a production method in which, for example, after uniformly forming an aluminum film on the transparent filter substrate 221, the aluminum film is partially removed by etching or the like, and thereby the wire grid structure is obtained. In the case of providing a light shield area of aluminum around the wire grid structure to restrict the aperture, as in the third configuration example, by leaving an aluminum film around the wire grid structure upon forming the wire grid structure, the aperture can be restricted. Accordingly, the manufacturing process can be simplified compared with the case of performing a process for the aperture restriction separately from the polarization filter layer 222.

Figure 26:
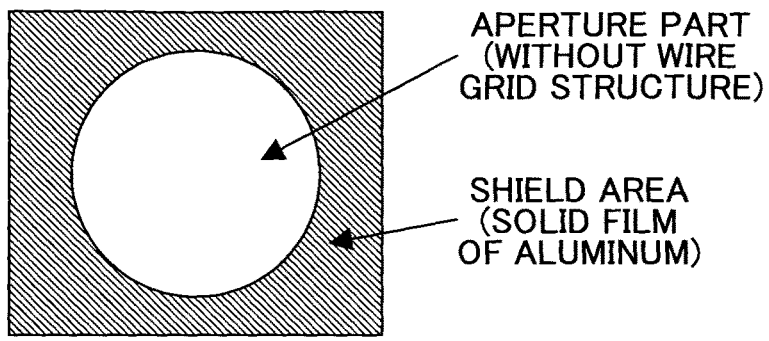
FIG. 26 is an explanatory diagram illustrating yet another example of a configuration for limiting an amount of light transmitted through a non-spectral area of the spectral filter layer of the optical filter according to the present embodiment.

It goes without saying that an aperture restriction layer, as shown in FIG. 26, may be provided separately from the polarization filter layer 222. In this case, in the central portion of the imaging pixel in the aperture restriction layer, a wire grid structure is not formed, but an aperture part for directly transmitting light is formed.

Figure 27:
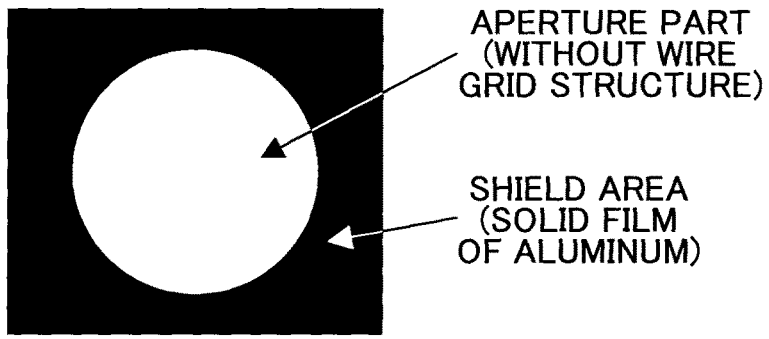
FIG. 27 is an explanatory diagram illustrating yet another example of a configuration for limiting an amount of light transmitted through a non-spectral area of the spectral filter layer of the optical filter according to the present embodiment.
Figure 28:
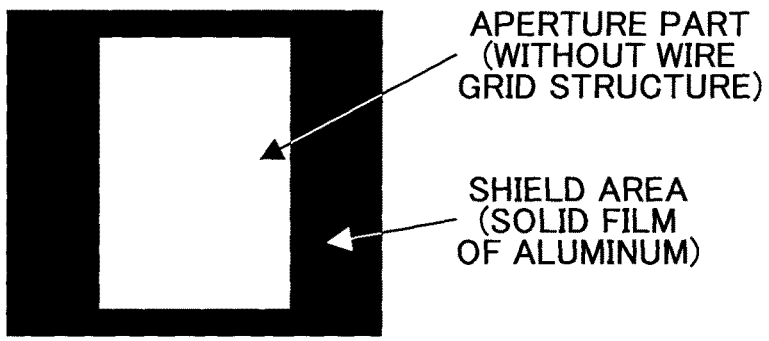
FIG. 28 is an explanatory diagram illustrating yet another example of a configuration for limiting an amount of light transmitted through a non-spectral area of the spectral filter layer of the optical filter according to the present embodiment.

Moreover, the shield area for restricting the aperture is not limited to a reflective film such as the above-described aluminum film. The shield area may be formed of, for example, a film that absorbs light. For example, as shown in FIG. 27, the shield area may be formed of a solid film of black resist. Also in this case, the shape of the aperture part is not limited to a circle as shown in FIG. 27. For example, the shape may be an approximate rectangle, as shown in FIG. 28. In the case where the shape of area has a corner, as shown in FIG. 28, when roundness is formed at the corner, it becomes easier to obtain a shape dimension by etching or the like.

Figure 29:
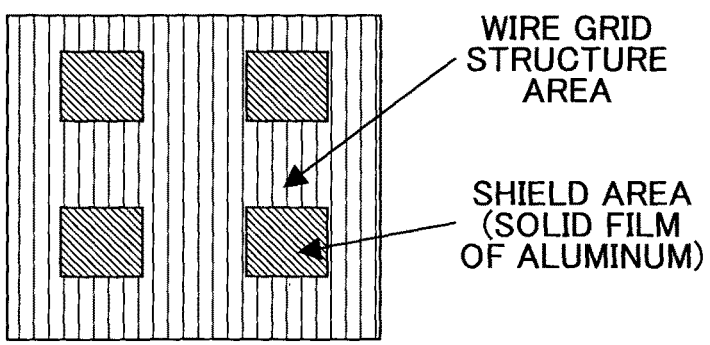
FIG. 29 is an explanatory diagram illustrating yet another example of a configuration for limiting an amount of light transmitted through a non-spectral area of the spectral filter layer of the optical filter according to the present embodiment.

Moreover, the number of the aperture parts that transmits light for one imaging pixel is not limited to one. Plural aperture parts of wire grid structure areas may be formed for one imaging pixel. Moreover, the number of the shield areas for one imaging pixel is not limited to one. Plural shield areas may be formed for one imaging pixel. Especially, the shield area is not necessarily provided in the edge portion of the imaging pixel. For example, as shown in FIG. 29, the imaging pixel may have a configuration in which solid films of aluminum are arranged in the wire grid structure.

In the third configuration example, three kinds of captured image data including an image of vertical polarization component of red light which is the same as in the first configuration example, and an image of a vertical polarization component of non-spectral light and an image of a horizontal polarization component of non-spectral light, received amounts of light of which are restricted compared with the first configuration example, are obtained. In the third configuration example, with a detection of a preceding vehicle from a result of an identification of a taillight using the image of vertical polarization component of red light, an oncoming vehicle is detected from a result of an identification of a headlight using the image of vertical polarization component of non-spectral light or the image of horizontal polarization component of non-spectral light. Generally, taillights or headlights are paired with each other which are separated in the horizontal direction from each other by a predetermined distance. Therefore, upon detecting a preceding vehicle or an oncoming vehicle, using this property, when two image parts of taillights or headlights are separated from each other by a predetermined distance, a pair of taillights or a pair of headlights is recognized as that of a preceding vehicle or of an oncoming vehicle. At this time, since a light amount of the headlight is greater than that of the taillight, when the light reception sensitivity is set so as to receive light from the taillight properly, the received amount of light from the headlight is saturated, and an image area which is recognized as a headlight expands. Then, the image areas which are originally recognized as two separated headlights becomes one image area, and the image area of the headlights cannot be recognized properly. The recognition rate of the oncoming vehicle thus decreases. In an opposite manner, when the light reception sensitivity is set so as to receive light from the headlight properly, the received amount of light from the taillight is insufficient, and the image area of the taillight cannot be recognized properly. Then, the recognition rate of the preceding vehicle decreases.

According to the third configuration example, in the image of vertical polarization component of non-spectral light and the image of horizontal polarization component of non-spectral light used for identifying a headlight, received amounts of light are restricted by the above-described aperture restriction. Therefore, even if the reception sensitivity is set to fit a taillight identified by using the image of vertical polarization component of red light, a received amount of which is not restricted, the saturation of the received amount of light of the headlight is prevented. The respective image areas of headlights can be identified individually, and the decrease in the recognition rate of an oncoming vehicle is suppressed.

Meanwhile, for example, it is possible to balance the identification of a headlight with the identification of a taillight by identifying the headlight and the taillight from images captured separately by switching the reception sensitivity, respectively. However, in this case, a control mechanism for switching the reception sensitivity is necessary, and there is a disadvantage that a frame rate of captured image data decreases to one-half. On the other hand, according to the third configuration example, the identification of a headlight can be balanced with the identification of a taillight without the above-described disadvantage.

[Fourth Configuration Example of Optical Filter]

Next, yet another configuration example (hereinafter, referred to as "fourth configuration example") of the optical filter 205 according to the present embodiment will be explained.

The polarization filter layer 222 provided in the post-stage filter 220 of the optical filter 205 is, as described above, divided into vertical polarization areas (first areas), each of which selects only a vertical polarization component P and transmits it; and horizontal polarization areas (second areas), each of which selects only a horizontal polarization component S and transmits it, in units of imaging pixels. According to the above, an image of the vertical polarization component, in which a horizontal polarization component S is cut, can be obtained based on image data of the imaging pixels that receive light transmitted through the vertical polarization area. Moreover, an image of the horizontal polarization component, in which a vertical polarization component P is cut, can be obtained from image data of imaging pixels that receive light transmitted through the horizontal polarization area.

In the case where the surface of the front windscreen 105 is a flat plane, by appropriately setting the polarization direction (transmission axis) of the vertical polarization area or the horizontal polarization area with respect to the surface of the front windscreen 105, an image of vertical polarization component or an image of horizontal polarization component in which a reflection on the front windscreen 105 is appropriately cut can be obtained. However, generally the front windscreen 105 of vehicle not only slopes downward toward the front, but also is curved backward greatly from a center to both ends in the horizontal direction so as to enhance the aerodynamic characteristic. Accordingly, when the polarization direction (transmission axis) of the vertical polarization area or the horizontal polarization component in the polarization filter layer 222 of the optical filter 205 is uniform at any position of area, for example, although the reflection from the front windscreen 105 is appropriately cut in the central portion of a captured image, the reflection from the front windscreen 105 in the edge portion of the captured image may not be cut appropriately.

Figure 30:
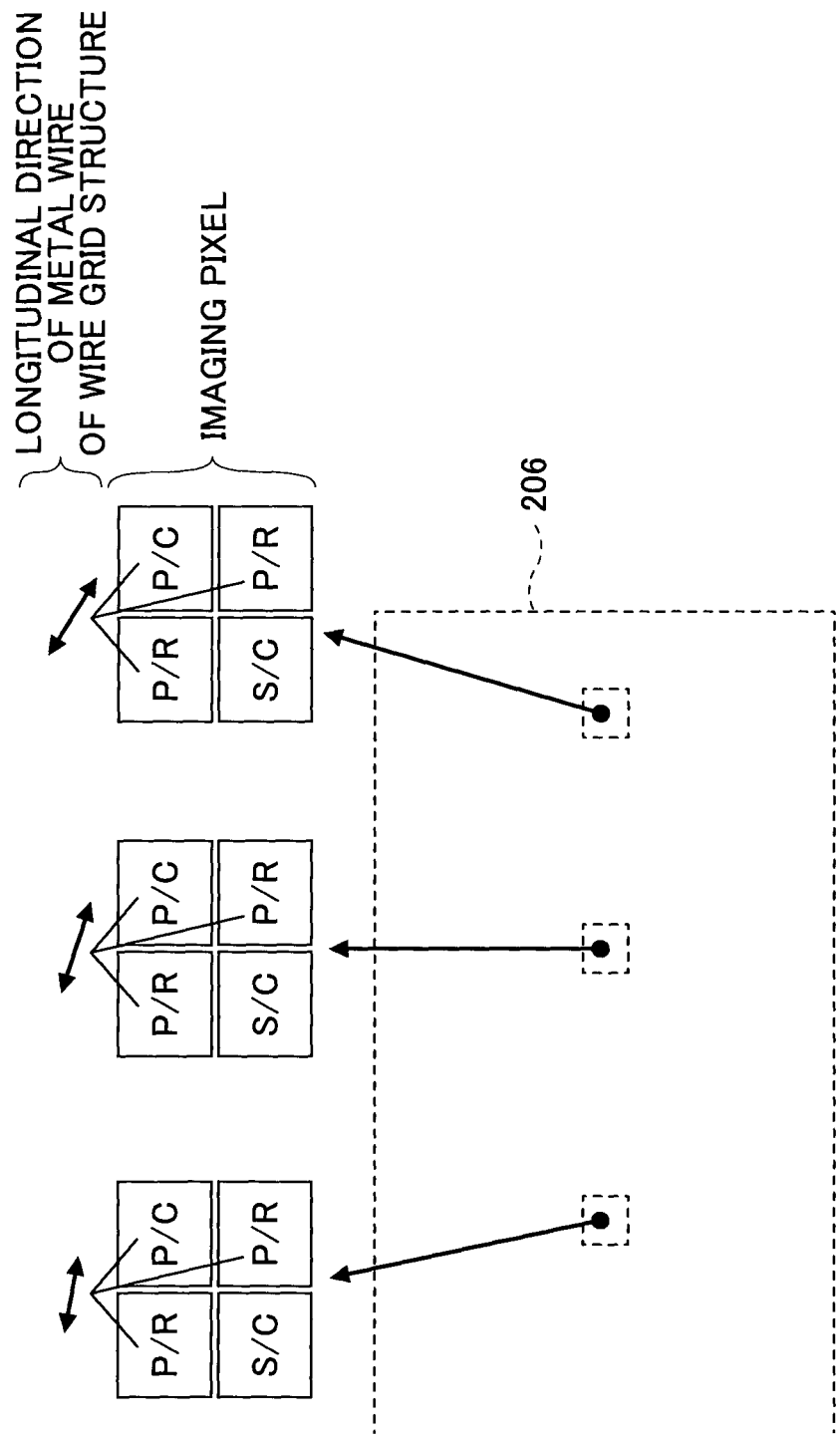
FIG. 30 is an explanatory diagram illustrating an example of a longitudinal direction of a metal wire of a wire grid structure of a polarization filter layer of an optical filter according to a fourth configuration example.

FIG. 30 is an explanatory diagram illustrating a longitudinal direction of a metal wire of a wire grid structure in the polarization filter layer 222 of the optical filter 205 according to the fourth configuration example.

Configurations of divided areas of the polarization filter layer 222 and the spectral filter layer 223 of the optical filter 205 according to the fourth configuration example are the same as in the first configuration example. However, in the fourth configuration example, the polarization direction (transmission axis) of the vertical polarization area of the polarization filter layer 222 is not uniform. Specifically, as shown in FIG. 30, the vertical polarization area of the polarization filter layer 222 is formed so that an angle between the polarization direction (transmission axis) and the vertical direction increases as the vertical polarization area is closer to the edge portion in the horizontal direction of the polarization filter layer 222, adjusting to a curve of the front windscreen 105. That is, the polarization filter layer 222 according to the fourth configuration example is formed so that an angle between the longitudinal direction of the metal wire of the wire grid structure and the horizontal direction becomes larger as the vertical polarization area is closer to the edge portion in the horizontal direction. In the present embodiment, since the vertical polarization areas are formed in the wire grid structure, it is possible to form a lot of areas in tiny units of imaging pixels, which differ in polarization directions.

[Detail of Each Part of Optical Filter]

Next, a detail of each part of the post-stage filter 220 in the optical filter 205 will be explained.

The transparent filter substrate 221 is formed of a transparent material that can transmit light of use band (in the present embodiment, visible light region and infrared region), e.g. glass, sapphire, crystal or the like. In the present embodiment, glass, especially a silica glass which is cheap and durable (refraction index is 1.46) or tempax glass (refraction index is 1.51) can be preferably used.

Figure 31:
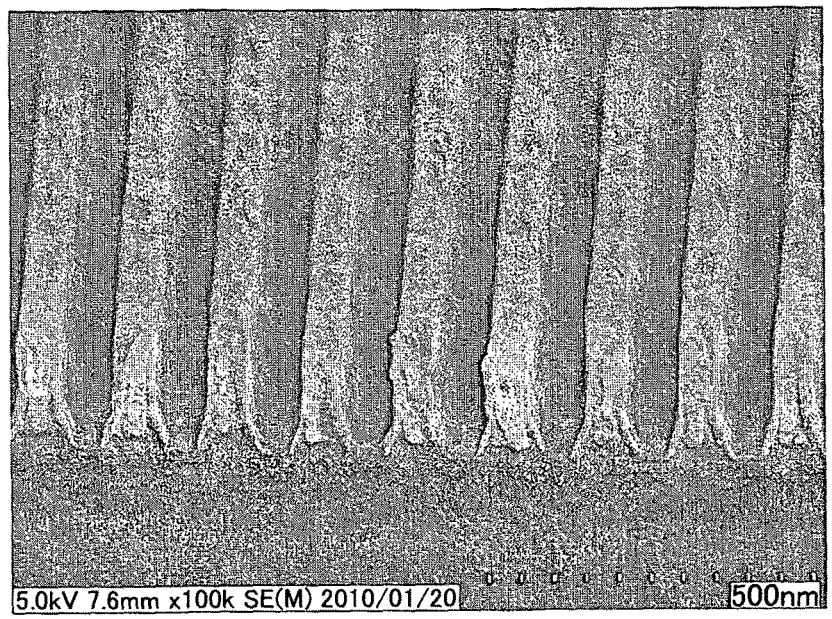
FIG. 31 is an enlarged image of an example of a wire grid structure of the polarization filter layer according to the present embodiment.

The polarization filter layer 222 formed on the transparent filter substrate 221 is configured with polarizers formed in the wire grid structure, as shown in FIG. 31. The wire grid structure is a structure in which metal wires (conductor wires) formed of metal such as aluminum extending in a specified direction are arrayed at a specified pitch. According to a sufficiently small wire pitch in the wire grid structure compared with a wavelength band of incident light (for example, smaller than one-half), most of light of an electric field vector component oscillating parallel to the longitudinal direction of the metal wire is reflected and most of light of an electric field vector component oscillating perpendicular to the longitudinal direction of the metal wire is transmitted. Therefore it can be used as a polarizer for producing a single polarization.

Generally, as a cross-sectional area of the metal wire increases, an extinction ratio of the polarizer of the wire grid structure increases, and furthermore for the metal wire which is greater than or equal to a predetermined width for a periodic width, the transmission factor decreases. Moreover, when a shape of a cross section orthogonal to the longitudinal direction of the metal wire is a taper shape, wavelength dispersibilities in the transmission factor and the polarization degree are small in a wide band and a characteristic of high extinction ratio is exhibited.

In the present embodiment, since the polarization filter layer 222 is formed in the wire grid structure, the following effects are exhibited.

The wire grid structure can be formed by using a widely known semiconductor manufacturing process. Specifically, after evaporating an aluminum thin film on the transparent filter substrate 221, patterning is performed, and a sub wavelength rugged structure of the wire grid structure is formed by using a method such as metal etching. According to the above-described manufacturing process, the longitudinal direction of the metal wire i.e. the polarization direction (polarization axis) can be adjusted with an accuracy corresponding to the size of the imaging pixel in the image sensor 206 (a few μm). Accordingly, the polarization filter layer 222, in which the longitudinal direction of the metal wire, i.e. the polarization direction (polarization axis) is adjusted in each of the imaging pixels, as in the present embodiment, can be manufactured.

Moreover, the wire grid structure has an advantage that since it is made from metallic material such as aluminum, excellent heat resistance is exhibited, and it can be preferably used even under a high temperature environment such as in a vehicle compartment which is liable to be high in temperature.

The filler 224 used for planarizing the upper side surface in the lamination direction in the polarization filter layer 222 is supplied in a concave portion between the metal wires in the polarization filter layer 222. For the filler 224, an inorganic material having a refractive index lower than or equivalent to that of the transparent filter substrate 221 can be preferably used. Meanwhile, the filler 224 according to the present embodiment is formed so as to cover also an upper side surface of the metal wire part of the polarization filter layer 222 in the lamination direction.

Specifically, for the material of the filler 224, low refraction index material, a refraction index of which is extremely close to the refraction index of air (refraction index is one) is preferably used. For example, a porous ceramic material, which is made by dispersing fine holes in ceramic, is preferable. Specifically, a porous silica ($SiO_2$), a porous magnesium fluoride (MgF), a porous aluminum or the like is included. Moreover, the degree of low refraction index is determined by a number of holes in the ceramic or a size of the holes (porosity). When a main component of the transparent filter substrate 221 is made of a crystal of silica or glass, the porous silica (n=1.22 to 1.26) is preferably used.

For the method of forming the filler 224, a method of SOG (Spin On Glass) can be Preferably used. Specifically, a solvent, in which silanol ($Si(OH)_4$) is dissolved in alcohol, is spin coated on the polarization filter layer 222 formed on the transparent filter substrate 221. Then, the solvent component is vaporized by a heat treatment, and the silanol itself is dehydrated and polymerized.

The polarization filter layer 222 has a wire grid structure of the sub wavelength size. Mechanical strength is low, and the metal wire may be damaged by a small external force. Since the optical filter 205 according to the present embodiment is desired to be arranged so as to be in close contact with the image sensor 206, there is a possibility that the optical filter 205 contacts the image sensor 206 in the manufacturing stage. In the present embodiment, the upper side surface in the lamination direction of the polarization filter layer 222, i.e. a surface on the side of the image sensor 206, is covered with the filler 224. Therefore, the damage in the wire grid structure upon contacting the image sensor 206 is suppressed.

Moreover, by supplying the filler 224 to fill in the concave portion between the metal wires in the wire grid structure of the polarization filter layer 222, as in the present embodiment, an entry of foreign matter into the concave portion can be prevented.

Meanwhile, in the present embodiment, for the spectral filter layer 223 laminated on the filler 224, a protection layer such as the filler 224 is not provided. This is because, according to an experiment by the inventors, even when the spectral filter layer 223 contacts the image sensor 206, damage to influence the captured image does not occur, and the protection layer is omitted with priority for low cost. Moreover, a height of the metal wire (convex portion) of the polarization filter layer 222 is low, i.e. less than a half of the use wavelength, whereas a height of the filter layer part forming the red spectral area or the cyan spectral area in the spectral filter layer 223 is the same as or several times the use wavelength. When the thickness of the filler 224 increases, it becomes more difficult to ensure flatness of the upper surface, and the characteristic of the optical filter 205 is influenced. Therefore, the thickness of the filler 224 has an upper limit. In the present embodiment, the spectral filter layer 223 is not covered with filler.

Figure 32:
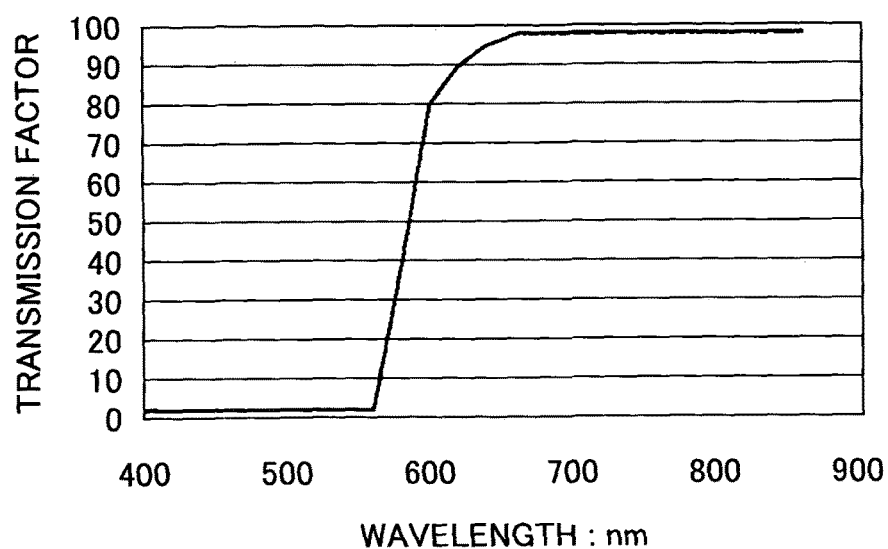
FIG. 32 is a diagram illustrating an example of a filter characteristic of a cut filter applicable to the spectral filter layer according to the present embodiment.

The filter layer part forming the red spectral area or the cyan spectral area in the spectral filter layer 223 according to the present embodiment has a multi-layer film structure in which thin films having high refractive, index and thin films having low refractive index are alternately laminated. According to the above-described multi-layer film structure, a degree of freedom in setting the spectral transmission factor can be made higher by using interference of light, and by laminating thin films it is possible to realize a reflection rate close to 100% for a specific wavelength (for example, a wavelength band other than red). In the present embodiment, since a range of the used wavelength for captured image data is approximately the visible light wavelength region (wavelength region of visible light wavelength region and infrared light wavelength region), an image sensor 206 having a sensitivity in the range of the used wavelength is selected and a range of a transmission wavelength of the multi-layer film part is set to be, for example, greater than or equal to 600 nm, and a cut filter for reflecting other wavelength region, as shown in FIG. 32, is formed.

Such a cut filter can be obtained by manufacturing a multi-layer film having a configuration such as "substrate/ (0.125L 0.25H 0.125L)p/medium A" from the lower side sequentially in the laminating direction of the optical filter 205. Here, "substrate" means the above-described filler 224. Moreover, "0.125L" represents the low refraction index material (for example, $SiO_2$) where nd/λ is 1L in the film thickness marking method. Accordingly, the film of "0.125L" means a film of low refraction index material having a film thickness which is an optical path length of ⅛ wavelength. Meanwhile, "n" is the refraction index, "d" is a thickness and "λ," is a cut-off wavelength. Similarly, "0.25H" represents the high refraction index material (for example, $TiO_2$) where nd/λ is 1H in the film thickness marking method. Accordingly, the film of "0.25H" means a film of high refraction index material having a film thickness which is an optical path length of ¼ wavelength. Moreover, "p" indicates a number of times repeating (laminating) the combination of films indicated in the parentheses. When "p" is large, an influence such as rippling can be suppressed. Moreover, medium A is air or resin or adhesive agent for close connection with the image sensor 206.

Figure 33:
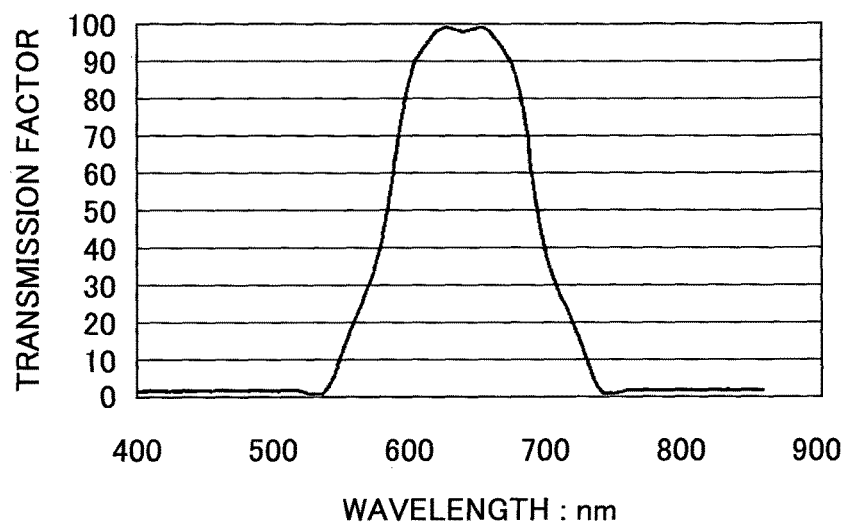
FIG. 33 is a diagram illustrating an example of a filter characteristic of a band pass filter applicable to the spectral filter layer according to the present embodiment.

Moreover, the filter layer part forming the red spectral area or the cyan spectral area in the spectral filter layer 223 may be a band pass filter having a filter characteristic, as shown in FIG. 33, where the range of transmission wavelength is a range of 600 nm to 700 nm. When the filter layer part is the above-described band pass filter, discrimination between a near-infrared region on the side of longer wavelength than red and the red region is possible. The above-described band pass filter can be obtained by manufacturing the multi-layer film having a configuration such as, for example, "substrate/(0.125L 0.5M 0.125L)p(0.125L 0.5H 0.125L)q(0.125L 0.5M 0.125L)r/medium A". Meanwhile, as described above, by using titanium dioxide ($TiO_2$) for the high refraction index material and silica dioxide ($SiO_2$) for the low refraction index material, the spectral filter layer 223 with excellent weatherability can be realized.

An example of manufacturing method for the spectral filter layer 223 according to the present embodiment will be explained. First, the above-described multi-layer film is formed on the layer of the filler 224 which is formed on the transparent filter substrate 221 and the polarization filter layer 222. For the method of forming the multi-layer film, a well-known method such as evaporation may be used. Next, the multi-layer film is removed at a position corresponding to the non-spectral area. For the method of removing, a commonly-used method such as a lift-off processing method may be used. In the lift-off processing method, a reverse pattern to a target pattern is formed beforehand on the layer of the filler 224 with metal, photo resist or the like. After forming a multi-layer film on it, the multi-layer film at the position corresponding to the non-spectral area is removed along with the metal or the photo resist.

In the present embodiment, since the multi-layer film structure is employed for the spectral filter layer 223, there is an advantage in that the degree of freedom in setting the spectral characteristic is high. In general, a color filter used in a color sensor or the like is formed of a resist agent. However, with such a resist agent it is difficult to control the spectral characteristic, compared with the multi-layer film structure. In the present embodiment, since the multi-layer film structure is employed for the spectral filter layer 223, the spectral filter layer 223 optimized for the wavelength of a taillight can be formed.

[Light Distribution Control of Headlight]

In the following, light distribution control of headlights according to the present embodiment will be explained.

In the light distribution control of headlights according to the present embodiment, captured image data imaged by the imaging apparatus 200 are analyzed and a taillight and a headlight of a vehicle are identified, a preceding vehicle is detected from the identified taillight and an oncoming vehicle is detected from the identified headlight. Then, switching between a high beam and a low beam of a headlight 104 is controlled or a partial shading of the headlight 104 is controlled so that prevention of glare for a driver of another vehicle is performed by avoiding high-intensity light from a headlight of the own vehicle 100 entering an eye of a driver of the preceding vehicle or the oncoming vehicle, and ensuring a visual field of the driver of the own vehicle 100 can be realized.

Meanwhile, in the following it is explained in the case where the post-stage filter 220 of the optical filter 205 according to the first configuration example is used.

In the light distribution control of the headlight according to the present embodiment, among information that can be acquired from the imaging unit 101, intensity of light emitted from each location (light source body) in the capturing area (luminance information), a distance between the light source body (other vehicle) such as a headlight or a taillight and the own vehicle (distance information), spectral information according to comparison of a red color component of light emitted from each light source body with a white component (non-spectral) thereof, polarization information according to comparison of a horizontal polarization component of the white component with a vertical polarization component thereof, and vertical polarization component information of the red color component in which a horizontal polarization component is cut, are used.

The luminance information will be explained. In the case where a preceding vehicle and an oncoming vehicle exist at the same distance from the own vehicle during night time, when the imaging apparatus 200 images the preceding vehicle and the oncoming vehicle, in captured image data a headlight of the oncoming vehicle, which is one of the detection objects, is displayed more brightly and a taillight of the preceding vehicle, which is one of the detection objects, is displayed more darkly than it. Moreover, in the case where a reflector is displayed on the captured image data, since the reflector is not a light source for emitting light by itself but is merely displayed brightly by reflecting a headlight of the own vehicle, the reflector is further darker. On the other hand, compared to light from the headlight of the oncoming vehicle, the taillight and the reflector of the preceding vehicle are observed more and more darkly on the image sensor 206 receiving the light, as the distance increases. Accordingly, by using the luminance (brightness information) obtained from the captured image data, a primary identification of two kinds of detection objects (headlight and taillight) and the reflector is possible.

Moreover, the distance information will be explained. Since most of the headlights and taillights have configurations of a lamp-pair, i.e. a left and right pair of lamps, the distance between the headlights or the taillights (i.e. other vehicle) and the own vehicle can be obtained by using a feature of the above configuration. The left and right lamps are displayed close to each other at the same position in a height direction on the captured image data imaged by the imaging apparatus 200. Light image areas which display the lamps respectively have almost the same size and almost the same shape. Accordingly, when the above features are made a condition, lamp image areas that satisfy the condition can be identified as a lamp-pair. Meanwhile, when the distance increases, the left and right lamps of a lamp-pair cannot be recognized as separated lamps, but are recognized as a single lamp.

In the case where the lamp-pair is identified according to the above-described method, a distance to a light source in a headlight or a taillight of the lamp-pair can be calculated. That is, a distance between the left and right headlights of the vehicle and a distance between the left and right taillights of the vehicle can be approximated to be a constant value w0 (for example, 1.5 m). On the other hand, since a focal length f of the imaging lens 204 is known, by calculating a distance w1 between two lamp image areas corresponding to the left and right lamps, respectively, on the image sensor 206 of the imaging apparatus 200 from the captured image data, a distance x between a light source of the headlight or the taillight of the lamp-pair and the own vehicle can be obtained according to a simple proportional calculation (x=f×w0/w1). Moreover, when the distance x calculated as above falls within a proper range, the two lamp image areas used for the calculation can be identified as headlights and taillights of the other vehicle. Accordingly, by using the distance information, accuracy in the identification of the headlights and the taillights which are detection objects is enhanced.

Moreover, the spectral information will be explained. In the present embodiment, as described above, a red color image, in which only red color components in the capturing area are displayed, can be generated by extracting pixel data corresponding to the imaging pixels "a", "c", "f", "h" or the like on the image sensor 206, which receives red light (vertical polarization component) P/R, from the captured image data imaged by the imaging apparatus 200. Accordingly, in the case where there is an image area having a brightness greater than or equal to a predetermined brightness in the red color image, the image area can be identified as a taillight image area which displays a taillight.

Moreover, a monochrome brightness image (vertical polarization component) in the capturing area can be generated by extracting only pixel data corresponding to the imaging pixels "b", "d" or the like on the image sensor 206, which receives the vertical polarization component of white light (non-spectral) P/C, from the captured image data imaged by the imaging apparatus 200. Accordingly, a brightness ratio (red color brightness ratio) between the image area on the red color image and the image area on the monochrome brightness image corresponding to the image area on the red color image can be also calculated. By using the red color brightness ratio, a relative ratio of the red color component included in light from a body (light source body) existing in the capturing area can be grasped. Since a red color brightness ratio of a taillight is a sufficiently higher value than a headlight or most of other light sources, by using the red color brightness ratio, accuracy in the identification of the taillight is enhanced.

Moreover, the polarization information will be explained. In the present embodiment, as described above, by extracting pixel data corresponding to the imaging pixels "b", "d" or the like on the image sensor 206, which receives the vertical polarization component of white light (non-spectral) P/C, and pixel data corresponding to the imaging pixels "e", "g" or the like on the image sensor 206, which receives the horizontal polarization component of white light (non-spectral) S/C, from the captured image data imaged by the imaging apparatus 200, a comparative image, in which pixel values (brightness) are compared between these image data for each image pixel, can be obtained. Specifically, for example, a difference image in which a pixel value represents a difference value between the vertical polarization component P of white light (non-spectral) and the horizontal polarization component S of white light (non-spectral) can be obtained as the comparative image. According to the above-described comparative image, a contrast between an image area (headlight image area) of direct light, which directly enters the imaging apparatus 200 from a headlight, and an image area of indirect light, which enters the imaging apparatus after reflecting on a water surface of road in the rain from the headlight, can be made higher, and accuracy in the identification of the headlight is enhanced.

Especially, for the comparative image, a ratio image, in which a pixel value represents a ratio (S/P) between the vertical polarization component P of white light (non-spectral) and the horizontal polarization component S of white light (non-spectral), a differential polarization degree image in which a pixel value represents a differential polarization degree $((S-P)/(S+P))$ or the like is preferably used. In general, it is known that in light, reflected on a horizontal mirror surface such as a water surface, horizontal polarization component is dominant. Especially, it is known that each of the ratio (S/P) between the horizontal polarization component S and the vertical polarization component P and the differential polarization degree $((S-P)/(S+P))$ becomes maximum at the specific angle (Brewster's angle). On the road in the rain, an asphalt surface which is a scattering plane is covered with water, and the surface of the road is in a condition close to a mirror surface. Then, in the reflected light of headlight from the road surface horizontal polarization component is dominant. Therefore, an image area of the reflected light of a headlight from the road surface has a great pixel value (brightness) in the ratio image or in the differential polarization degree image. On the other hand, since the direct light from the headlight is basically unpolarized, the pixel value (brightness) thereof is small in the ratio image or in the differential polarization degree image. According to difference between them, the reflected light of a headlight from the road surface in the rain which has the same light amount as the direct light from the headlight can be appropriately removed, and the direct light from the headlight can be identified as distinguished from such reflected light of the headlight.

Figure 34:
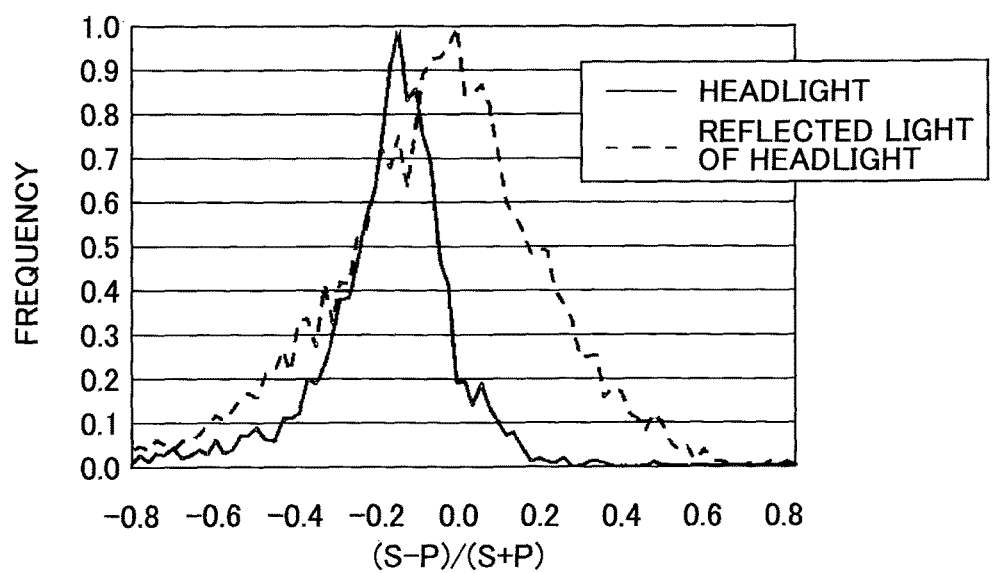
FIG. 34 is a diagram illustrating an example of a histogram of differential polarization degrees calculated for direct light from a headlight in a rainy day and for reflected light reflected on a rainy road surface from the headlight imaged using the imaging apparatus according to the present embodiment.

FIG. 34 is a diagram illustrating a histogram of differential polarization degrees calculated for direct light from a headlight in a rainy day and for reflected light reflected on a rainy road surface from the headlight imaged using the imaging apparatus 200. The axis of ordinates indicates a frequency, which is normalized to one. The axis of abscissas indicates the differential polarization degree $((S-P)/(S+P))$. As can be seen from FIG. 34, the reflected light of a headlight from the road surface in the rain, compared with the direct light from the headlight, has a distribution which is shifted to the direction where the horizontal polarization component S is relatively large (rightward in the drawing).

Figure 35:
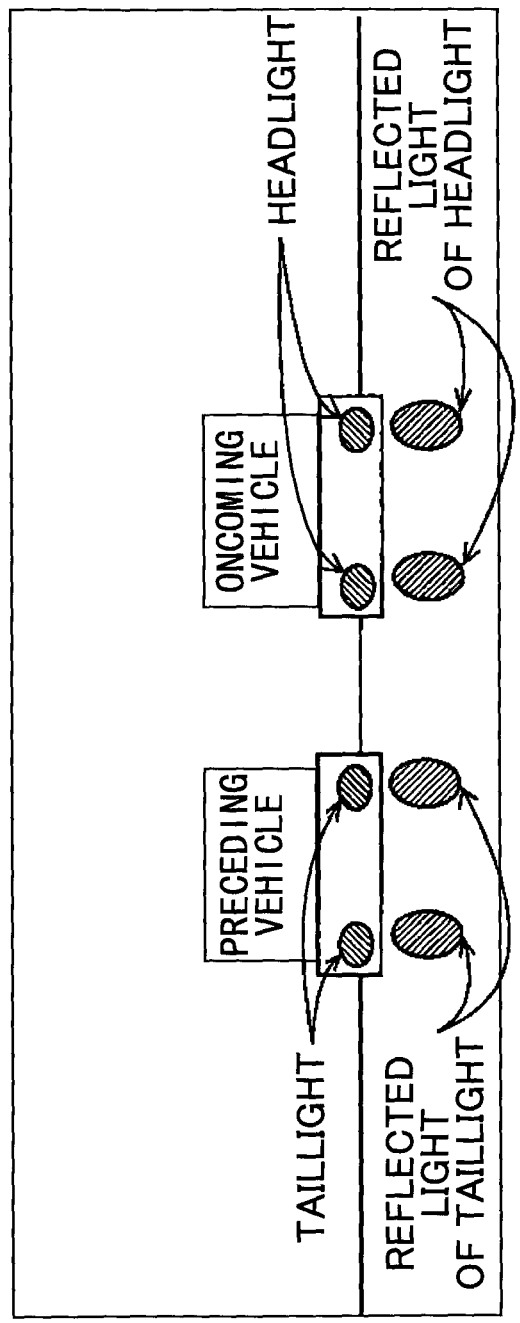
FIG. 35 is a schematic diagram illustrating an example of a state, imaged by the imaging apparatus according to the present embodiment, where both a preceding vehicle and an oncoming vehicle are present ahead in the travelling direction at almost the same distance when the own vehicle travels on a rainy road surface.

FIG. 35 is a schematic diagram illustrating an example of a state, imaged by the imaging apparatus 200, where both a preceding vehicle and an oncoming vehicle are present ahead in the travelling direction at almost the same distances when the own vehicle travels on a rainy road surface.

In such a state, only from luminance information and distance information, it is difficult to detect by distinguishing from one another a taillight of the preceding vehicle, reflected light of the taillight from the rainy road surface, a headlight of the oncoming vehicle and reflected light of the headlight from the rainy road surface.

According to the present embodiment, even in the above state, first, distinction between the taillight of the preceding vehicle and the reflected light of the taillight from the rainy road surface and distinction between the headlight of the oncoming vehicle and the reflected light of the headlight from the rainy road surface can be made with high accuracy using the above-described spectral information. Specifically, in a lamp image area narrowed by using the luminance information and the distance information, an image area having the pixel value (brightness value) of a red color image or the red color brightness ratio, described as above, greater than a predetermined threshold is identified as a taillight image area that displays the taillight of the preceding vehicle or the reflected light of the taillight from the rainy road surface. An image area with the pixel value or the red color brightness ratio less than or equal to the threshold is identified as a headlight image area that displays the headlight of the preceding vehicle or the reflected light of the headlight from the rainy road surface.

Moreover, according to the present embodiment, by using the above-described polarization information for each of the lamp image areas identified by the spectral information as above, direct light from the taillight or the headlight and its reflected light can be distinguished with high accuracy. Specifically, for example, for the taillight, based on the pixel value (brightness value) of the red color image of horizontal polarization component S, as described above, and its differential polarization degree or the like, by using a difference in a frequency or intensity of the horizontal polarization component, the direct light from the taillight of the preceding vehicle and the reflected light of taillight from the rainy road surface are distinguished. Moreover, for example, for the headlight, based on the pixel value (brightness value) of white image of horizontal polarization component, as described above, and its differential polarization degree or the like, by using a difference in a frequency or intensity of the horizontal polarization component, the direct light from the headlight of the preceding vehicle and the reflected light of headlight from the rainy road surface are distinguished.

Next, a flow of processing of detecting a preceding vehicle and an oncoming vehicle according to the present embodiment will be explained.

FIG. 36 is a flowchart illustrating a flow of vehicle detection processing according to the present embodiment.

In the vehicle detection processing according to the present embodiment, image processing is performed for image data captured by the imaging apparatus 200, and an image area considered to be a detection object is extracted. Then, the preceding vehicle or the oncoming vehicle is detected by determining which one of the two kinds of detection objects is the kind of the light source displayed on the image area.

First, image data ahead of the own vehicle, captured by the image sensor 206 of the imaging apparatus 200, are acquired and stored in a memory (step S1). The image data include, as described above, a signal indicating brightness at each of the imaging pixels of the image sensor 206. Next, information related to a behavior of the own vehicle is acquired from a vehicle behavior sensor (not shown) (step S2).

Then, an image area with high brightness (high brightness image area), which is considered to be the detection object (a taillight of a preceding vehicle or a headlight of an oncoming vehicle), is extracted from the image data stored in the memory (step S3). The high brightness image area is a bright area having brightness greater than predetermined threshold brightness in the image data. The image data often include plural high brightness image areas. In the present embodiment, all the high brightness image areas are extracted. Accordingly, at this stage an image area displaying reflected light from the rainy road surface is also extracted as a high brightness image area.

In the high brightness image area extraction processing, first, binarization processing is performed by comparing a brightness value at each of the imaging pixels on the image sensor 206 with predetermined threshold brightness (step S31). Specifically, a binarized image is generated by allocating "1" to pixels having brightness greater than or equal to the predetermined threshold brightness, and allocating "0" to the other pixels. Next, labelling processing for recognizing pixels, which are allocated "1" and are close to each other, as one high brightness image area in the binarized image is performed (step S32). According to the above, a set of plural pixels with high brightness which are close to each other is extracted as one high brightness image area.

After the above-described high brightness image area extraction processing, a distance between a body in a capturing area corresponding to the extracted high brightness image areas and the own vehicle is calculated (step S4). In this distance calculation processing, pair lamp distance calculation processing for detecting the distance using the property that vehicle lamps form a lamp-pair, i.e. a pair of left and right lamps, and single lamp distance calculation processing in the case where at long distances the left and right lamps of the lamp-pair cannot be distinguished in recognition and the lamp-pair is recognized as a single lamp, are executed.

First, for the pair lamp distance calculation processing, pair lamp creation processing for creating a pair of lamps is performed (step S41). Left and right lamps forming a pair satisfy conditions that they exist close to each other and at positions of almost the same height in the image data captured by the imaging apparatus 200, sizes of the high brightness image areas are almost the same and shapes of the high brightness image areas are the same. Therefore, high brightness image areas that satisfy the above conditions are regarded as a lamp-pair. A high brightness image area that cannot be paired is regarded as a single lamp. In the case where a lamp-pair is created, a distance to the lamp-pair is calculated by the pair lamp distance calculation processing (step S42). A distance between a left headlight and a right headlight and a distance between a left taillight and a right taillight are approximated to be a constant value w0 (for example, 1.5 m). On the other hand, since a focal length f of the imaging apparatus 200 is known, by calculating a distance w1 between two lamp image areas corresponding to the left and right lamps, respectively, on the image sensor 206 of the imaging apparatus 200, an actual distance x to the lamp-pair can be obtained according to a simple proportional calculation (x=f×w0/w1). Meanwhile, for the detection of the distance to the preceding vehicle or the oncoming vehicle, a dedicated distance sensor such as a laser radar or a millimeter-wave radar may be employed. According to the above-described method, a distance to the single lamp can be measured (step S43).

Next, a ratio between a red color image of vertical polarization component P and a white image of vertical polarization component P (red light brightness ratio) is used as spectral information, and lamp type identification processing for identifying whether two high brightness image areas, which are regarded as a lamp-pair, are caused by light from headlights or by light from taillights, based on the spectral information, is performed (step S5). In the lamp type identification processing, first, for the high brightness image areas, which are regarded as a lamp-pair, a red color ratio image, in which a pixel value represents a ratio between pixel data corresponding to the imaging pixels "a" and "f" on the image sensor 206 and pixel data corresponding to the imaging pixel "b" on the image sensor 206, is created (step S51). Then, lamp classification processing for comparing the pixel value in the red color ratio image with a predetermined threshold; determining a high brightness image area, in which the pixel value is greater than or equal to the predetermined threshold, to be a taillight image area by light from the taillight; and determining high brightness image data, in which the pixel value is less than the predetermined threshold, to be a headlight image area by light from the headlight, are performed (step S52).

Next, for each of the image area identified to be a taillight image area and the image area identified to be a headlight image area, a differential polarization degree ((S−P)/(S+P)) is used as the polarization information, and reflection identification processing for identifying whether it is a direct light from the taillight or the headlight or it is reflected light reflected on a mirror surface of a rainy road surface or the like and received, is performed (step S6). In the reflection identification processing, first, a differential polarization degree ((S−P)/(S+P)) is calculated for the taillight image area and a differential polarization degree image in which a pixel value is the differential polarization degree is created (step S61). Moreover, in the same way as above, for the headlight image area a differential polarization degree ((S−P)/(S+P)) is calculated and a differential polarization degree image in which a pixel value is the differential polarization degree is created. Then, the pixel value in each of the differential polarization degree images is compared with a predetermined threshold, the taillight image or the headlight image, in which the pixel value is greater than or equal to the predetermined threshold, is determined to be created by the reflected light and is removed, since these image areas are not considered to display the taillight of the preceding vehicle or the headlight of the oncoming vehicle (step S62). The remaining taillight image area and the remaining headlight image area after the above removal processing are identified to be an image area that displays the taillight of the preceding vehicle or the headlight of the oncoming vehicle.

Meanwhile, a rain sensor or the like may be installed in the vehicle, and only when it is confirmed to be rainy by the rain sensor, the above-described reflection identification processing (step S6) may be executed. Moreover, only when an operator (driver) operates a windscreen wiper, the above-described described reflection identification processing (step S6) may be executed. In a word, the above-described reflection identification processing (step S6) may be executed only when it is rainy in which a reflection from a rainy road surface is assumed.

In the present embodiment, a result of detection of a preceding vehicle or an oncoming vehicle according to the above-described vehicle, detection processing is used for light distribution control for the headlight which is in vehicle equipment of the own vehicle. Specifically, when a taillight is detected according to the vehicle detection processing and the own vehicle gets close to a preceding vehicle within a distance range where light emitted from the headlight of the own vehicle enters a rearview mirror of the preceding vehicle, the headlight of the own vehicle is controlled by shielding partially or by shifting the light emission direction of the headlight of the own vehicle vertically or horizontally, so that the light emitted from the headlight does not enter the rearview mirror of the preceding vehicle.

[White Line Detection Processing]

In the following, the white line detection processing according to the present embodiment will be explained.

In the present embodiment, for the purpose of preventing the own vehicle from deviating from a travelable area, processing for detecting a white line (lane division line) as a detection object is performed. The white line, mentioned here, includes any white lines for dividing a road, such as a solid line, a dashed line, a dotted line, a double line or the like. Meanwhile, lane division lines of color other than white, such as a yellow line or the like, can be detected in the same way as above.

In the white line detection processing according to the present embodiment, among information items that can be acquired from the imaging unit 101, polarization information of a vertical polarization component P of white component (non-spectral) is used. Meanwhile, the vertical polarization component of white component may include a vertical polarization component of cyan color light. In general, it is known that a white line or an asphalt surface has a flat spectral brightness characteristic in the visible light wavelength region. On the other hand, since the cyan color light includes a wide band within the visible light wavelength region, it is preferable for imaging asphalt or a white line. Accordingly, by using the optical filter 205 according to the second configuration example, and by incorporating the vertical polarization component of cyan color light into the vertical polarization component of white light, a number of imaging pixels that are used can be increased. As a result, resolution becomes higher and detecting a distant white line becomes possible.

In the white line detection processing according to the present embodiment, in most cases white lines are formed on road surfaces of a color which is almost black. In an image of the vertical polarization component P of white component (non-spectral), brightness of the white line is sufficiently greater than that of any other part on the road surface. Therefore, a white line can be detected by determining a part, brightness of which is greater than or equal to a predetermined value, among parts of the road surface, to be a white line. Especially, in the present embodiment, since a horizontal polarization component S is cut in the image of the vertical polarization component P of white component (non-spectral) used in the above processing, it is possible to obtain an image in which a reflected light from a rainy road surface is suppressed. Accordingly, the white line detection can be performed without erroneously recognizing a disturbance light such as a reflected light of a headlight from a rainy road surface as a white line in the night.

Moreover, in the white line detection processing according to the present embodiment, among information items that can be acquired from the imaging unit 101, polarization information according to a comparison between horizontal polarization component S and vertical polarization component P of white component (non-spectral), e.g. a differential polarization degree of the horizontal polarization component S and the vertical polarization component P of white component (non-spectral) ((S−P)/(S+P)), may be used. Usually, since in reflected light from a white line a diffuse reflection component is dominant, the vertical polarization component P and the horizontal polarization component S of the reflected light are almost equivalent, and the differential polarization degree shows a value of almost zero. On the other hand, a part of the asphalt surface, on which a white line is not formed, shows a characteristic where the diffuse reflection component is dominant in the case of a dry state and the differential polarization degree indicates a positive value. Moreover, the part of the asphalt surface, on which a white line is not formed, shows a characteristic where a mirror surface reflection component is dominant in the case of a wet state and the differential polarization degree indicates further greater value. Accordingly, a part of the road surface with a polarization difference value obtained as above, which is less than a predetermined threshold, can be determined to be a white line.

Figure 37A:
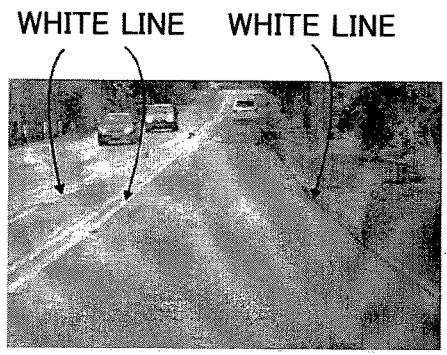
FIG. 37A is an image illustrating an example of a monochrome brightness image (non-spectral and non-polarized) imaged for a capturing area including a white line in the rain and an image of non-spectral differential polarization degree.
Figure 37B:
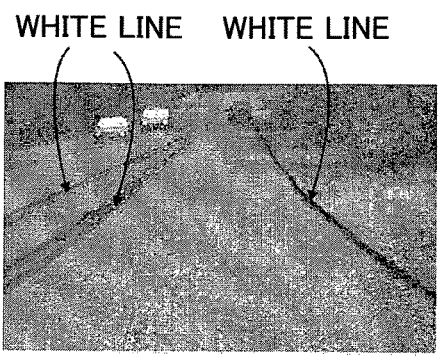
FIG. 37B is an image illustrating an example of an image of non-spectral differential polarization degree imaged for the same capturing area in the rain.

FIGS. 37A and 37B are images illustrating an example of a monochrome brightness image (non-spectral and non-polarized) and a non-spectral differential polarization degree image, which are imaged for the same capturing area in the rain.

Since these image examples are captured in the rain, the capturing area is relatively dark, and the road surface is in a wet state. Therefore, in the monochrome brightness image as shown in FIG. 37A, a contrast between the white line and the road surface is low. On the other hand, in the differential polarization degree image as shown in FIG. 37B, the contrast between the white line and the road surface is sufficiently great. Therefore, even under the condition where a white line is difficult to be identified in the monochrome brightness image, if the differential polarization degree image is used, the white line can be identified with high accuracy.

Moreover, since a white line in a right part of the image example overlaps a shadow, in the monochrome brightness image shown in FIG. 37A the contrast between the white line on the right side and the road surface is quite low. On the other hand, in the differential polarization degree image shown in FIG. 37B the contrast between the white line on the right side and the road surface is also sufficiently great. Accordingly, a white line, which is difficult to be identified in a monochrome brightness image, can be identified with high accuracy by using a differential polarization degree image.

[Detection Processing for Raindrops on Front Windscreen]

In the following, detection processing for raindrops according to the present embodiment will be explained.

In the present embodiment, the detection processing for raindrops as adhering matter is performed for the purpose of drive control for a windscreen wiper or discharge control for washer fluid. Meanwhile, here, it is explained for the case where adhering matter adhered to the front windscreen is a raindrop, as an example. But, for adhering matter such as a bird dropping or water from a road surface splashed by an adjacent vehicle, the explanation will be the same.

In the detection processing for raindrops according to the present embodiment, among information items that can be acquired from the imaging unit 101, polarization information of vertical polarization component P of the raindrop detection image area 214 that receives light transmitted through the infrared light transmission filter area 212 of the pre-stage filter 210 and through the polarization filter layer 225 in the raindrop detection filter part 220B of the post-stage filter 220 is used.

Figure 38:
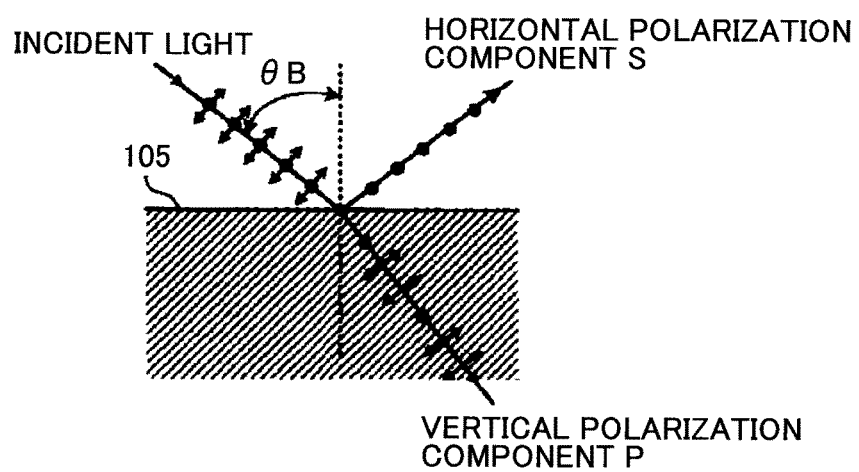
FIG. 38 is an explanatory diagram illustrating a polarization state of reflected light at the Brewster's angle.

FIG. 38 is an explanatory diagram illustrating a polarization state of reflected light at the Brewster's angle.

In general, when light enters a flat surface of glass or the like, a reflection rate of horizontal polarization component S monotonically increases with respect to an incident angle. On the other hand, a reflection rate of vertical polarization component P becomes zero at a specific angle (Brewster's angle θB) and the vertical polarization component P is not reflected and is only a transmission light, as shown in FIG. 38. Therefore, by configuring so that the light source 202 emits only light of vertical polarization component P to the front windscreen 105 from the inside of the vehicle with the Brewster's angle θB, reflected light does not occur on the inner wall surface of the front windscreen 105 (surface on the indoor side), and light of vertical polarization component P is transmitted to the outer wall surface of the front windscreen 105 (surface on the outdoor side). When the reflected light on the inner wall surface of the front windscreen 105 exists, the reflected light becomes a disturbance light to the imaging apparatus 200 and becomes a factor of lowering a detection rate of raindrops.

In the case of using, for example, a light-emitting diode (LED) for the light source 202, in order to cause the light incident on the front windscreen 105 from the light source 202 to be only vertical polarization component P, a polarizer that transmits only vertical polarization component P is preferably arranged between the light source 202 and the front windscreen 105. Moreover, in the case of using a laser diode (LD) for the light source 202, since the LD can be made to emit light of a specific polarization component, an axis of the LD may be adjusted so that only vertical polarization component P is incident on the front windscreen 105.

Figure 39A:
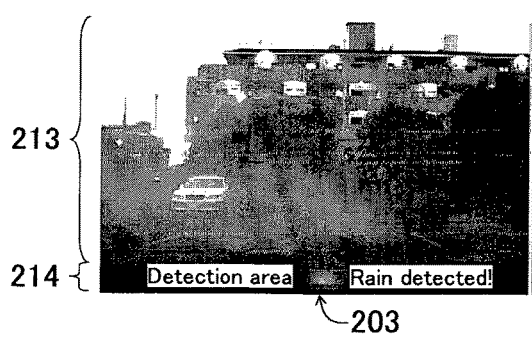
FIG. 39A is an explanatory diagram illustrating an example of a captured image where raindrops adhere to an outer wall surface of a front windscreen of a vehicle.

FIG. 39A is an explanatory diagram illustrating a captured image where raindrops adhere to the outer wall surface of the front windscreen 105.

Figure 39B:
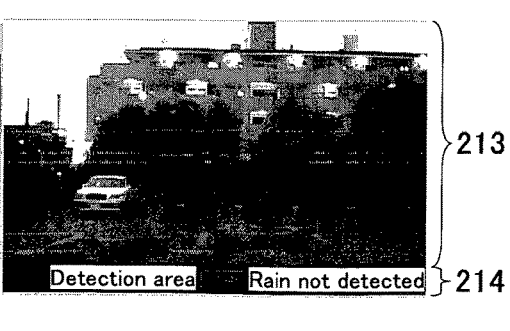
FIG. 39B is an explanatory diagram illustrating an example of a captured image where raindrops do not adhere to the outer wall surface of the front windscreen of the vehicle.

FIG. 39B is an explanatory diagram illustrating a captured image where raindrops do not adhere to the outer wall surface of the front windscreen 105.

In each of FIGS. 39A and 39B, a lower area denoted "detection area" is the raindrop detection image area 214 and a remaining area is the vehicle detection image area 213. On the raindrop detection image area 214, when raindrops adhere to the outer surface, light from the light source 202 is projected as shown in FIG. 39A. When raindrops do not adhere to the outer surface, light from the light source 202 is not projected as shown in FIG. 39B. Accordingly, processing of recognizing an image of raindrops on the raindrop detection image area 214 can be easily performed by adjusting a threshold for received amount of light from the light source 202. Meanwhile, the threshold is not necessarily a fixed value, and may be appropriately changed according to a change in a condition surrounding the own vehicle on which the imaging apparatus 200 is installed or the like.

In the present embodiment, based on a result of detection of raindrops, the wiper control unit 106 performs drive control for a windscreen wiper or discharge control for washer fluid.

Next, control of a variety of on-vehicle devices performed in the present embodiment will be explained in more detail.

In the present embodiment, the headlight control unit 103 performs light distribution control of headlight using a detection result of a taillight or a headlight (other vehicle in the night) detected based on captured image data of the vehicle detection image area imaged by the imaging apparatus 200.

Moreover, the vehicle travelling control unit 108 performs lane keeping control by giving alarm to a driver of the own vehicle 100 or by performing drive assist control such as control of a steering wheel or a brake, using a detection result of a white line detected based on captured image data of the vehicle detection image area imaged by the imaging apparatus 200.

Moreover, the vehicle travelling control unit 108 performs collision avoidance control by giving alarm to the driver of the own vehicle 100 or by performing drive assist control such as control of the steering wheel or the brake, when it is detected that a distance to a preceding vehicle decreases, using a detection result of the preceding vehicle (other vehicle in the daytime or in the night) detected based on captured image data of the vehicle detection image area imaged by the imaging apparatus 200.

An optimum exposure condition for each of the detection objects used for the above control varies according to the detection thereof. For example, the captured image data used for the distribution control of headlight are used for detecting another vehicle in the night by identifying a high-intensity taillight or a headlight. Therefore, the captured image data are preferably imaged in exposure condition with a small exposure amount. Moreover, since the imaging environment is night-time, even if the exposure condition is fixed, high detection accuracy can be obtained stably.

Moreover, for example, the captured image data used for the lane keeping control are used for detecting a white line having a brightness which is lower than that of a taillight or a headlight. Therefore, the captured image data are preferably captured in an exposure condition with a great exposure amount. Moreover, since the optimum exposure condition varies according to difference in the imaging environment such as difference between the night-time and the daytime, the exposure condition is preferably adjusted in response to the imaging environment as necessary.

Moreover, for example, the captured image data used for the collision avoidance control are used for detecting a high-intensity taillight in the night-time and for detecting a low-intensity vehicle body. Therefore, since the optimum exposure condition changes significantly in response to the imaging environment, the exposure condition is preferably adjusted in response to the imaging environment.

In this way, since the optimum exposure condition for the captured image data used for each of the controls varies, when all the controls are performed by using the captured image data captured in the same exposure condition, it is difficult to obtain detection results of a detection object used for all of the controls with high accuracy. Therefore, appropriate control in all the controls cannot be realized.

Accordingly, in the present embodiment, in order to realize appropriate control in all the controls, captured image data captured in the exposure conditions suitable for the controls, respectively, are used. Specifically, the exposure condition by the imaging apparatus 200 changes in a unit of an imaging frame, and each of the controls is performed by using captured image data captured in the exposure condition corresponding to the control.

[First Example of Imaging Operation]

FIG. 40 is a timing chart simply illustrating an example of an imaging operation of the imaging apparatus 200 that can be applied in the present embodiment (hereinafter, referred to as "first example of imaging operation"). Since this timing chart is for grasping an outline of the imaging operation and does not indicate accurate control timings, a length of the arrow, for example, does not accurately indicate a length of time.

In the imaging apparatus 200 according to the first example of imaging operation, a CCD image sensor is used for the image sensor 206, and a global shutter system for exposing all the imaging pixels of the image sensor simultaneously to generate an imaging frame is employed. Accordingly, in the first example of imaging operation, as shown in FIG. 40, signals of the respective imaging pixels of the image sensor 206, for which the simultaneous exposure of all imaging pixels is performed in the previous frame period $T_{n-1}$, are read out in the next frame period $T_n$.

In the first example of imaging operation, an imaging operation for imaging the following three kinds of imaging frames serially is repeated.

An imaging frame of the first frame is used for the lane keeping control (Lane Departure Warning, hereinafter referred to as LDW). During the imaging operation for this imaging frame, an exposure time $FE_{LDW}$ as the exposure condition is automatically controlled within a range of, for example, 20 μs to 33 ms. Therefore, for example, in the daytime the exposure time $F_{LDW}$ close to 20 μs is set, and in the night-time the exposure time $FE_{LDW}$ close to 33 ms is set.

An imaging frame of the second frame is used for the light distribution control (Auto High Beam, hereinafter referred to as AHB). During the imaging operation for this imaging frame, an exposure time $FE_{AHB}$ as the exposure condition is fixed, and is set to 40 μs irrespective of daytime and night-time.

An imaging frame of the third frame is used for the collision avoidance control (Front Collision Warning, hereinafter referred to as FCW). During the imaging operation for this imaging frame, an exposure time $FE_{FCW}$ as the exposure condition is automatically controlled within a range of, for example, 20 μs to 33 ms. Therefore, for example, in the daytime the exposure time $FE_{FCW}$ close to 20 μs is set, and in the night-time the exposure time $FE_{FCW}$ close to 33 ms is set.

Here, in the present embodiment, as described above, raindrop detection processing for detecting raindrops (adhering matter) adhered to the front windscreen, and the wiper drive control or the like is performed using the detection result for raindrops. The exposure condition suitable for the captured image data used in this raindrop detection processing is preferably, in order to reduce an influence from flaring or ghosting by a lens or from disturbance light other than the emitted light from the light source 202, to set the exposure amount as small as possible, i.e. to set the exposure time short. The method of obtaining captured image data suitable for the raindrop detection processing, as described above, includes a method of appending or inserting a new kind of raindrop detection dedicated imaging frame captured in an exposure condition suitable for the raindrop detection processing. However, in this method, by appending or inserting a raindrop detection dedicated imaging frame, a frame rate of the three kinds of imaging frames, as described above, is lowered and accuracies in the respective controls, which use these three kinds of imaging frames, may be lowered.

Therefore, in the first example of imaging operations, a raindrop detection dedicated imaging frame is neither appended nor inserted, but among the three kinds of imaging frames as described above, an imaging frame captured in an exposure condition close to the exposure condition suitable for the raindrop detection processing is used for the raindrop detection processing. Specifically, among the three kinds of imaging frames as described above, the imaging frame used for the light distribution control AHB is used for the raindrop detection processing.

Especially, in the present embodiment, at the raindrop detection filter part 220B corresponding to the raindrop detection image area 214, which is a captured image data area used for the raindrop detection processing, the optical filter 205 as a wavelength restriction means, such as the infrared light transmission filter area 212 or the like for restricting light to only infrared light in an infrared wavelength band emitted from the light source 202 and transmitting it, is provided. Since in such an optical filter 205 a light transmission loss exists functionally, compared with the case where the optical filter is not provided, a receiving amount of light emitted from the light source 202 and received on the image sensor 206 decreases. Therefore, by providing the optical filter 205, compared with the case where the optical filter is not provided, the exposure time suitable for the captured image data used for the raindrop detection processing can be extended. For example, when the exposure time suitable for the captured image data used for the raindrop detection processing is 4 μs for the case where the optical filter 205 is not provided, the exposure time can be made 40 μs by providing the optical filter 205. As a result, without lowering the detection accuracy in the raindrop detection processing, the imaging frame for the light distribution control of headlight AHB, for which the exposure time is 40 μs, can be used for the raindrop detection processing.

Furthermore, in the first example of imaging operation, the imaging frame used for the light distribution control of headlight AHB to be used for the raindrop detection processing is imaged with a fixed exposure time. Since the raindrop detection processing detects raindrops by receiving light reflected at the raindrops out of light emitted from the light source 202 with an almost constant amount of light, the receiving amount of light is almost constant. Therefore, if the exposure time is fixed, it is not necessary to change the threshold value in response to the exposure time, and the raindrop detection processing can be made simpler. Accordingly, the raindrop detection processing can be made faster.

Needless to say, the kind of the imaging frame used for the raindrop detection processing is not limited to the imaging frame with the fixed exposure time. Moreover, it is not limited to the imaging frame to be used for the light distribution control of headlight AHB. However, the imaging frame used for the raindrop detection is preferably an imaging frame selected from the imaging frames from which the imaging frame with the greatest exposure amount is eliminated, and the imaging frame with the least exposure amount is especially preferable.

Meanwhile, in order to further enhance the detection accuracy in the raindrop detection processing, the raindrop detection processing may be performed based on difference information between captured image data at illumination which are captured while light is being emitted from the light source 202 and captured image data at non-illumination which are captured while light is not being emitted from the light source 202.

For example, in a repetition period of three kinds of imaging frames, as described above, when an imaging frame of the light distribution control of headlight AHB in some repetition period is exposed, the light source 202 is turned ON and captured image data at illumination are captured. When an imaging frame of the light distribution control of headlight AHB in the next repetition period is exposed, the light source 202 is turned OFF and captured image data at non-illumination are captured. The above two operations are alternately repeated.

Or, an imaging frame of the light distribution control of headlight AHB captured with the light source 202 being turned OFF may be added to the repetition period of the three kinds of imaging frames, as described above. For example, the first frame is an imaging frame for the lane keeping control LDW, the second frame is an imaging frame for the light distribution control of headlight AHB with the light source 202 being turned ON, the third frame is an imaging frame for the Collision avoidance control FCW, and the fourth frame is an imaging frame for the light distribution control of headlight AHB with the light source 202 being turned OFF.

The difference information of the raindrop detection image area 214 between the captured image data at illumination and the captured image data at non-illumination, obtained as above, is information obtained by subtracting the captured image data at non-illumination which include only disturbance light from the captured image data at illumination which include light emitted from the light source 202 and the disturbance light. Accordingly, by the difference information, the captured image data of the raindrop detection image area 214 including only light emitted from the light source 202, wherein the disturbance light is removed, is obtained. Therefore, in the raindrop detection processing, an influence from the disturbance light is suppressed and, more accurate raindrop detection is realized.

Moreover, in the first example of imaging operations, as shown in FIG. 40, during a period other than the exposure period for the imaging frame used for the raindrop detection processing, the light source 202 is turned OFF. Therefore, the power consumption is reduced compared with the case where the light source 202 is always turned ON. Moreover, a part of the light emitted from the light source 202 may be projected also on the vehicle detection image area 213, and is likely to be disturbance light in the vehicle detection image area 213. Therefore, for the imaging frame for the lane keeping control LDW or the imaging frame for the collision avoidance control FCW the light source 202 is turned OFF, thereby disturbance light by light emitted from the light source 202 is suppressed and accuracies in the above controls can be enhanced.

[Second Example of Imaging Operation]

FIG. 41 is a timing chart simply illustrating an example of an imaging operation of the imaging apparatus 200 that can be applied in the present embodiment (hereinafter, referred to as "second example of an imaging operation"). Since this timing chart is for grasping an outline of the imaging operation and does not indicate accurate control timings, a length of the arrow, for example, does not accurately indicate a length of time.

In the imaging apparatus 200 according to the second example of imaging operations, a CMOS image sensor is used for the image sensor 206, and a rolling shutter system for exposing the imaging pixels of the image sensor serially to generate an imaging frame is employed. In the second example of imaging operations, imaging pixels arranged on the image sensor 206 are exposed one line at a time, and signals of the imaging pixels in the respective lines 1 to X are read out serially.

Also in the second example of imaging operations, in the same way as in the above-described first example of imaging operations, an imaging operation for capturing the following three kinds of imaging frames serially is repeated. Moreover, also in the second example of imaging operations, a raindrop detection dedicated imaging frame is neither appended nor inserted, but among the three kinds of imaging frames as described above, the imaging frame used for the light distribution control AHB is used for the raindrop detection processing.

By the way, in the first example of imaging operations described as above, when the imaging frame for the light distribution control of headlight AHB to be used for the raindrop detection processing is captured, the light source 202 is turned ON. Therefore, a part of light emitted from the light source 202 may be projected also on the vehicle detection image area 213 in the imaging frame for the light distribution control of headlight AHB, and is likely to be disturbance light in the vehicle detection image area 213. In this case, due to the disturbance light, accuracies in the detection for taillight or headlight in the light distribution control of headlight AHB may be lowered, and the accuracy of the light distribution control of headlight AHB may be lowered.

Therefore, in the second example of imaging operations, as shown in FIG. 41, the light source 202 is controlled. That is, during the exposure period for the imaging frame for the light distribution control of headlight AHB, when a line corresponding to the vehicle detection image area 213 is exposed, the light source 202 is turned OFF, and when a line corresponding to the raindrop detection image area 214 is exposed, the light source 202 is turned ON. According to the above, for the vehicle detection image area 213 in the imaging frame for light distribution control of headlight AHB, influence from disturbance light due to light emitted from the light source 202 is suppressed, whereas for the raindrop detection image area 214 in the imaging frame raindrops can be detected by light from the light source 202. Furthermore, the power consumption is reduced compared with the case where the light source 202 is always turned ON during the exposure period for the imaging frame for the light distribution control of headlight AHB.

Moreover, also in the second example of imaging operations, in the same way as in the first example of imaging operations, in order to further enhance the detection accuracy in the raindrop detection processing, the raindrop detection processing may be performed based on difference information between captured image data at illumination which are captured while the light source 202 is turned ON and captured image data at non-illumination which are captured while the light source 202 is turned OFF.

Especially, in the case of the rolling shutter system as in the second example of imaging operations, for example, upon exposing the line corresponding to the raindrop detection image area 214 in the imaging frame for the light distribution control of headlight AHB, the light source control can be performed so as to repeat ON/OFF of the light source 202 in units of one line or two or more lines. According to the light source control as above, difference information between the captured image data at illumination and the captured image data at non-illumination for the raindrop detection image area 214 in a single image frame can be obtained. Since this difference information is free from time shift, more accurate raindrop detection is realized. Moreover, since it is not necessary to add a new imaging frame for obtaining difference information, the frame rate is not lowered.

In the present embodiment, light from the light source reflected by a raindrop is detected. However, other aspect may be employed. For example, the aspect disclosed in Japanese Published Patent Application No. 2014-32174 may be used. In this aspect, a prism is arranged so as to contact a front windscreen of a vehicle, and a condition of total reflection for light from the light source on the front windscreen is configured. According to this aspect, a configuration that total reflection light from the light source is received by an imaging element for a part on the front windscreen to which a raindrop is not adhered, and reflection light from the light source is not received by the imaging element or a reception amount of light at the imaging element is reduced for a part on the front windscreen to which a raindrop is adhered is realized. According to this aspect, the utilization efficiency of light can be more enhanced.

The explanation described above is an example, and the present invention achieves particular effects for the following aspects, respectively.

(Aspect A)

In an object detection apparatus including a light illumination unit, such as a light source 202, that emits illumination light for illuminating an adhering matter observation part in a light transmissive member, such as a front windscreen 105; an imaging unit, such as a imaging apparatus 200, that generates an imaging frame including a capturing area image and an adhering matter observation image by receiving transmission light using an image sensor, on which light receiving elements, such as photodiodes 206A, are arranged two-dimensionally, wherein the transmission light enters an outer wall surface of the light transmissive member from a capturing area and is transmitted through the light transmissive member, in a first light reception area (a sensor part corresponding to a vehicle detection image area 213) on the image sensor and imaging the capturing area image, such as a vehicle detection image area 213, and by receiving the illumination light, emitted from the light illumination unit and passing through the adhering matter observation part on the light transmissive member, in a second light reception area (a sensor part corresponding to a raindrop detection image area 214) on the image sensor and imaging the adhering matter observation image; an object detection processing unit, such as an image analysis unit 102, that performs detection processing for a detection object, such as a taillight, a headlight, a white line or another vehicle (body) in the capturing area, based on the capturing area image in the imaging frame generated by the imaging unit; and an adhering matter detection processing unit, such as the image analysis unit 102, that performs detection processing for adhering matter, such as a raindrop adhered to the adhering matter observation part on the light transmissive member, based on the adhering matter observation image in the imaging frame generated by the imaging unit, it is characterized in that the object detection apparatus further includes an exposure amount change unit, such as a signal processing unit 208, that changes an exposure amount of the imaging unit in a unit of an imaging frame, the object detection processing unit performs the detection processing for a detection object using capturing area images in two or more imaging frames, which are different in the exposure amount, such as an imaging frame for a lane keeping control LDW, an imaging frame for a light distribution control of headlight AHB or an imaging frame for a collision avoidance control FCW, and the adhering matter detection processing unit performs the detection processing for adhering matter using an adhering matter observation image in an imaging frame of the two or more imaging frames (the imaging frame for the light distribution control of headlight AHB or the like) other than an imaging frame, an exposure amount of which is the greatest among those of the two or more imaging frames.

In the Aspect A, two or more imaging frames, exposure amounts of which are different from each other, are generated by the imaging unit, while the exposure amount of the imaging unit is changed in a unit of an imaging frame by the exposure amount change unit. The change in the exposure amount as above includes, for example, automatically adjusting an exposure amount in response to an imaging environment, serially generating imaging frames while switching exposure amount suitable for each of plural kinds of detection objects or the like. In the Aspect A, in the detection processing for the detection object existing in the capturing area, the detection processing for the detection object is performed based on the capturing area images in two or more imaging frames the exposure amounts of which are different from each other. Therefore, the detection object can be detected with high accuracy compared with the case where a detection object is detected only by an imaging frame of a single exposure amount.

Moreover, according to the Aspect A, the detection processing for the adhering matter is performed using the adhering matter observation image in the imaging frame other than the imaging frame, an exposure amount of which is the greatest among those of the two or more imaging frames which are used for the detection processing for the detection object as above. For this reason, for the detection processing for the adhering matter, the imaging frame, the exposure amount of which is relatively small among those of the two or more imaging frames which are used for the detection processing for the detection object, is used. Accordingly, the detection processing for the adhering matter can be performed in a state where an influence from disturbance light on the illumination light from the light illumination unit is suppressed, and high detection accuracy can be obtained also in the detection processing for adhering matter.

Moreover, according to the Aspect A, since the detection processing with high accuracy for adhering matter can be performed without inserting separately a dedicated image frame for detecting the adhering matter, high detection accuracy for a detection object can be ensured without lowering a frame rate of an imaging frame for the detection object.

(Aspect B)

In the Aspect A, it is characterized in that the adhering matter detection processing unit performs the detection processing for adhering matter using an adhering matter observation image in an imaging frame of the two or more imaging frames, an exposure amount of which is the least among those of the two or more imaging frames.

According to the Aspect B, more accurate detection processing for adhering matter can be achieved.

(Aspect C)

In an object detection apparatus including a light illumination unit, such as a light source 202, that emits illumination light for illuminating an adhering matter observation part in a light transmissive member, such as a front windscreen 105; an imaging unit, such as a imaging apparatus 200, that generates an imaging frame including a capturing area image and an adhering matter observation image by receiving transmission light using an image sensor, on which light receiving elements, such as photodiodes 206A, are arranged two-dimensionally, wherein the transmission light enters an outer wall surface of the light transmissive member from a capturing area and is transmitted through the light transmissive member, on a first light reception area (a sensor part corresponding to a vehicle detection image area 213) on the image sensor and imaging the capturing area image, such as a vehicle detection image area 213, and by receiving the illumination light, emitted from the light illumination unit and passing through the adhering matter observation part on the light transmissive member, on a second light reception area (a sensor part corresponding to a raindrop detection image area 214) on the image sensor and imaging the adhering matter observation image; an object detection processing unit, such as an image analysis unit 102, that performs detection processing for a detection object, such as a taillight, a headlight, a white line or another vehicle (body) in the capturing area, based on the capturing area image in the imaging frame generated by the imaging unit; and an adhering matter detection processing unit, such as the image analysis unit 102, that performs detection processing for adhering matter, such as a raindrop adhered to the adhering matter observation part on the light transmissive member, based on the adhering matter observation image in the imaging frame generated by the imaging unit, it is characterized in that the object detection apparatus further includes an exposure condition change unit, such as a signal processing unit 208, that changes an exposure condition of the imaging unit in a unit of an imaging frame, the object detection processing unit, based on capturing area images of imaging frame groups, captured in exposure conditions (automatic exposure adjustment or fixed exposure, or difference in exposure period in the case of the fixed exposure) corresponding respectively to plural kinds of detection objects, such as a taillight, a headlight, a white line or other vehicle (body), such as an imaging frame group for a lane keeping control LDW, an imaging frame group for a light distribution control of headlight AHB or an imaging frame group for a collision avoidance control FCW, performs the detection processing for detection objects of the kinds corresponding respectively to the imaging frame groups, and the adhering matter detection processing unit performs the detection processing for adhering matter using an adhering matter observation image of an imaging frame group (the imaging frame group for the light distribution control of headlight AHB or the like) other than an imaging frame group corresponding to an exposure condition, an exposure amount of which is the greatest among those of the imaging frame groups.

In the Aspect C, two or more imaging frame groups, exposure conditions of which are different from each other, are generated by the imaging unit, while the exposure condition of the imaging unit is changed in a unit of an imaging frame by the exposure condition change unit. In the detection processing for the detection object existing in the capturing area, based on the capturing area images in two or more imaging frame groups the exposure conditions of which are different from each other, the detection processing for the respectively corresponding detection objects is performed. In this way, the detection processing can be performed for the respective detection objects, using the imaging frame groups imaged in the exposure conditions suitable for the respective detection objects. Accordingly, each of the detection objects can be detected with high accuracy compared with the case where the detection objects are detected from imaging frames imaged in the same exposure condition.

Moreover, according to the Aspect C, the detection processing for the adhering matter is performed using the adhering matter observation image in the imaging frame group other than the imaging frame group, corresponding to the exposure condition, an exposure amount of which is the greatest among those of the two or more imaging frame groups which are used for the detection processing for the detection object as above. For this reason, for the detection processing for the adhering matter, the imaging frame group of the exposure condition, the exposure amount of which is relatively small among those of the two or more imaging frames which are used for the detection processing for the detection object, is used. Accordingly, the detection processing for the adhering matter can be performed in a state where an influence from disturbance light on the illumination light from the light illumination unit is suppressed. Therefore, high detection accuracy can be obtained also in the detection processing for adhering matter.

Moreover, according to the Aspect C, since the detection processing with high accuracy for adhering matter can be performed without inserting separately a dedicated image frame for detecting the adhering matter, high detection accuracy for a detection object can be ensured without lowering a frame rate of an imaging frame for the detection object.

(Aspect D)

In the Aspect C, it is characterized in that the adhering matter detection processing unit performs the detection processing for adhering matter using an adhering matter observation image of an imaging frame group corresponding to an exposure condition, an exposure amount of which is the least among those of the imaging frame groups.

According to the Aspect D, more accurate detection processing for adhering matter can be achieved.

(Aspect E)

In any one of the Aspects A to C, it is characterized in that the imaging frame of the adhering matter observation image used by the adhering matter detection processing unit is captured with a fixed exposure amount.

Since the detection processing for the adhering matter detects adhering matter from a captured image of the adhering matter projected by illumination light emitted from the light illumination unit that can emit illumination light with almost constant light amount, even if the exposure amount is fixed regardless of the imaging environment, sufficient detection accuracy can be obtained. In the case of changing the exposure amount in response to the imaging environment, since processing corresponding to a change in the exposure amount (processing of changing threshold value or the like) would rather be required, problems that the detection processing for adhering matter becomes complicated and fast processing of detecting adhering matter becomes difficult would occur. According to the Aspect E, since the imaging frame used for the detection processing for adhering matter is captured with a fixed exposure amount, fast detection processing can be achieved while ensuring the detection accuracy for adhering matter.

(Aspect F)

In any one of the Aspects A to E, it is characterized in that the object detection apparatus further includes a wavelength restriction unit, such as an optical filter 205, that transmits light received in the second light reception area and restricts it into a predetermined wavelength band.

In such a wavelength restriction unit, usually a loss in a light amount is generated when light is transmitted. For this reason, a receiving amount of illumination light from the light illumination unit received by the image sensor is lowered, compared with the case where the wavelength restriction unit is not provided. Accordingly, by providing the wavelength restriction unit, the exposure amount suitable for the imaging frame used for the adhering matter detection processing can be increased, compared with the case where the wavelength restriction unit is not provided. As a result, even if the imaging frame used for the detection processing for a detection object, an exposure amount of which is relatively great, is used for the detection processing for adhering matter, the detection accuracy in the detection processing for adhering matter can be ensured.

(Aspect G)

In any one of the Aspects A to F, it is characterized in that the imaging unit, such as a rolling shutter, serially exposes partially the image sensor to generate an imaging frame. An illumination light control unit (control unit existing inside the light source 202), which controls the light illumination unit so that when an imaging frame of an adhering matter observation image used by the adhering matter detection processing unit is imaged, during a period where the first light reception area on the image sensor is exposed, illumination light is not emitted, and during a period where the second light reception area on the image sensor is exposed, illumination light is emitted, is provided.

According to the Aspect G, since an influence from disturbance light by illumination light from the light illumination unit on a capturing area image of an imaging frame used for the detection processing for adhering matter can be suppressed, detection accuracy in the detection processing for a detection object using the imaging frame will not decrease due to the disturbance by the illumination light from the light illumination unit.

(Aspect H)

In a moving body device control system, such as an on-vehicle device control system, including an object detection unit that detects adhering matter, such as raindrops, adhering to an adhering matter observation part of a light transmissive member, such as the front windscreen 105, in a moving body, such as an own vehicle 100, and a detection object existing in a capturing area surrounding the moving body, such as a white line, a taillight, a headlight or another body (body); and a moving body device control unit, such as a wiper control unit 106, a headlight control unit 103 or a vehicle travelling control unit 108, that controls a predetermined device installed on the moving body, such as a wiper, a headlight, a steering wheel or a brake, based on a result of detection of the adhering matter and a result of detection of the detection object by the object detection unit, it is characterized in that the object detection apparatus according to any one of the Aspects A to G is used for the object detection unit.

According to the Aspect H, any control of the device control using the result of detection for the adhering matter and the device control using the result of detection for the detection object can be performed with high accuracy.

(Aspect I)

An object detection program to be executed in a computer of an object detection apparatus that includes a light illumination unit that emits illumination light for illuminating an adhering matter observation part in a light transmissive member; an imaging unit that generates an imaging frame including a capturing area image and an adhering matter observation image by receiving transmission light using an image sensor, on which light receiving elements are arranged two-dimensionally, wherein the transmission light enters an outer wall surface of the light transmissive member from a capturing area and is transmitted through the light transmissive member, on a first light reception area on the image sensor and imaging the capturing area image, and by receiving the illumination light, emitted from the light illumination unit and passing through the adhering matter observation part on the light transmissive member, on a second light reception area on the image sensor and capturing the adhering matter observation image; an object detection processing unit that performs detection processing for a detection object in the capturing area, based on the capturing area image in the imaging frame generated by the imaging unit; and an adhering matter detection processing unit that performs detection processing for adhering matter adhered to the adhering matter observation part on the light transmissive member, based on the adhering matter observation image in the imaging frame generated by the imaging unit, causes the computer to function as the object detection processing unit, the adhering matter detection processing unit and an exposure amount change unit that changes an exposure amount of the imaging unit in a unit of an imaging frame, and is characterized in that the object detection processing unit performs the detection processing for the detection object using capturing area images in two or more imaging frames, which are different in the exposure amount, and the adhering matter detection processing unit performs the detection processing for the adhering matter using the adhering matter observation image in the imaging frame other than the imaging frame, an exposure amount of which is the greatest among those of the two or more imaging frames.

According to the Aspect I, high detection accuracy can be achieved in both the detection processing for the detection object and the detection processing for the adhering matter without inserting separately a dedicated image frame for detecting the adhering matter.

(Aspect J)

An object detection program to be executed in a computer of an object detection apparatus that includes a light illumination unit that emits illumination light for illuminating an adhering matter observation part in a light transmissive member; an imaging unit that generates an imaging frame including a capturing area image and an adhering matter observation image by receiving transmission light using an image sensor, on which light receiving elements are arranged two-dimensionally, wherein the transmission light enters an outer wall surface of the light transmissive member from a capturing area and is transmitted through the light transmissive member, on a first light reception area on the image sensor and imaging the capturing area image, and by receiving the illumination light, emitted from the light illumination unit and passing through the adhering matter observation part on the light transmissive member, on a second light reception area on the image sensor and capturing the adhering matter observation image; an object detection processing unit that performs detection processing for a detection object in the capturing area, based on the capturing area image in the imaging frame generated by the imaging unit; and an adhering matter detection processing unit that performs detection processing for adhering matter adhered to the adhering matter observation part on the light transmissive member, based on the adhering matter observation image in the imaging frame generated by the imaging unit, causes the computer to function as the object detection processing unit, the adhering matter detection processing unit and an exposure condition change unit that changes an exposure condition of the imaging unit in a unit of an imaging frame, and is characterized in that the object detection processing unit, based on capturing area images of imaging frame groups, imaged in exposure conditions corresponding respectively to the plural kinds of detection objects, performs the detection processing for the detection object of the kind corresponding respectively to the imaging frame group, and the adhering matter detection processing unit performs the detection processing for the adhering matter using the adhering matter observation image in the imaging frame group other than the imaging frame group corresponding to the exposure condition, an exposure amount of which is the greatest among those of the imaging frame groups.

According to the Aspect J, high detection accuracy can be achieved in both the detection processing for the detection object and the detection processing for the adhering matter without inserting separately a dedicated image frame for detecting the adhering matter.

Meanwhile, the above-described program may be distributed or obtained in a state recorded in a recording medium such as a CD-ROM. Moreover, the program also can be distributed or obtained by distributing or receiving signals carrying the program which is sent from a predetermined transmission apparatus via a transmission medium such as a public telephone line, a dedicated line, another communication network or the like. Upon the above-described distribution, at least a part of the computer program may be transmitted in the transmission medium. That is, all data configuring the computer program are not necessary to exist on the transmission medium simultaneously. The signals carrying the program are computer data signals embodied in predetermined carrier waves including the computer program. Moreover, the transmission method of transmitting the computer program from the predetermined transmission apparatus includes a continuous transmission of data configuring the program or an intermittent transmission of the data.

Although the present invention has been described with reference to embodiments, the present invention is not limited to these embodiments, but various variations and modifications may be made without departing from the scope of the invention as set forth in the accompanying claims.

The present application is based on and claims the benefit of priority of Japanese priority Applications No. 2013-262885 filed on Dec. 19, 2013 and No. 2014-209786 filed on Oct. 14, 2014, the entire contents of which are hereby incorporated by reference.

DESCRIPTION OF THE REFERENCE NUMERALS 100 own vehicle
101 imaging unit
102 image analysis unit
103 headlight control unit
104 headlight
105 front windscreen
106 wiper control unit
107 wiper
108 vehicle travelling control unit
200 imaging apparatus
201 imaging case
202 light source
203 raindrop
204 imaging lens
205 optical filter
206 image sensor
206A photodiode
206B microlens
207 sensor substrate
208 signal processing unit
210 pre-stage filter
211 infrared light cut filter area
212 infrared light transmission filter area
213 vehicle detection image area
214 raindrop detection image area
220 post-stage filter
220A vehicle detection filter part
220B raindrop detection filter part
221 transparent filter substrate
222 polarization filter layer
223 spectral filter layer
224 filler
225 polarization filter layer

The invention claimed is:

1. An object detection apparatus comprising:
a light illumination unit configured to emit illuminating light for illuminating a monitoring area defined on a light transmissive member;
an imaging unit including an imaging sensor, the imaging sensor having a first light receiving area and a second light receiving area, the imaging unit being configured to capture a first image of distant photographic subjects by detecting, in the first light receiving area, lights from the distant photographic subjects that pass through the light transmissive member, to capture a second image of foreign matter attached to the monitoring area on the light transmissive member by detecting, in the second light receiving area, the illuminating light being reflected from the foreign matter and passing through the light transmissive member, and to generate an image frame including the first image and the second image;
a target detection unit configured to detect a detection target among the distant photographic subjects based on the first image in the imaging frame;
a foreign matter detection unit configured to detect the foreign matter attached to the monitoring area on the light transmissive member based on the second image in the imaging frame; and
an exposure amount change unit configured to change an exposure amount of the imaging unit from imaging frame to imaging frame, wherein the target detection unit detects a detection target using the first images in two or more of the imaging frames, exposure amounts of which are different from each other, and the foreign matter detection unit detects the foreign matter using the second image in the imaging frame of the two or more imaging frames other than the imaging frame, the exposure amount of which is the greatest among those of the two or more imaging frames.

2. The object detection apparatus as claimed in claim 1, wherein the foreign matter detection unit is configured to detect the foreign matter using the second image in the imaging frame, the exposure amount of which is the least among those of the two or more imaging frames.

3. An object detection apparatus comprising:
a light illumination unit configured to emit illuminating light for illuminating a monitoring area defined on a light transmissive member;
an imaging unit including an imaging sensor, the imaging sensor having a first light receiving area and a second light receiving area, the imaging unit being configured to capture a first image of distant photographic subjects by detecting, in the first light receiving area, lights from the distant photographic subjects that pass through the light transmissive member, to capture a second image of foreign matter attached to the monitoring area on the light transmissive member by detecting, in the second light receiving area, the illuminating light being reflected from the foreign matter and passing through the light transmissive member, and to generate an image frame including the first image and the second image;
a target detection unit configured to detect a detection target among the distant photographic subjects based on the first image in the imaging frame;
a foreign matter detection unit configured to detect the foreign matter attached to the monitoring area on the light transmissive member based on the second image in the imaging frame; and
an exposure condition change unit configured to change an exposure condition of the imaging unit from imaging frame to imaging frame, wherein the target detection unit, based on the first images in imaging frame groups, which are captured in exposure conditions corresponding respectively to plural kinds of detection targets, detects the detection targets of the kinds corresponding respectively to the imaging frame groups, and the foreign matter detection unit detects the foreign matter using the second image in the imaging frame group of the imaging frame groups other than the imaging frame group corresponding to the exposure condition, an exposure amount of which is the greatest among those of the imaging frame groups.

4. The object detection apparatus as claimed in claim 3, wherein the foreign matter detection unit is configured to detect the foreign matter using the second image in the imaging frame group corresponding to the exposure condition, the exposure amount of which is the least among those of the imaging frame groups.

5. The object detection apparatus as claimed in claim 1, wherein the imaging frame of the second image used by the foreign matter detection unit is captured with a fixed exposure amount.

6. The object detection apparatus as claimed in claim 1, further comprising:
a wavelength restriction unit configured to transmit the light received in the second light receiving area and to restrict the light to be within a predetermined wavelength band.

7. The object detection apparatus as claimed in claim 1, wherein the imaging unit is configured to serially expose the image sensor partially to generate an imaging frame, and the object detection apparatus further includes an illuminating light control unit configured to control the light illumination unit so that when the imaging frame of the second image used by the foreign matter detection unit is captured, illuminating light is not emitted in a period where the first light receiving area on the image sensor is exposed, and illuminating light is emitted in a period where the second light receiving area on the image sensor is exposed.

8. A moving body device control system comprising:
an object detection unit configured to detect foreign matter attached to a monitoring area defined on a light transmissive member in a moving body and a detection target existing among distant photographic subjects around the moving body; and
a moving body device control unit configured to control a predetermined device installed on the moving body based on a result of detection of the foreign matter and a result of detection of the detection target by the object detection unit, wherein the object detection apparatus according to claim 1 is used as the object detection unit.

9. A non-transitory computer-readable storage medium storing a program for causing a computer of an object detection apparatus, which includes a light illumination unit configured to emit illuminating light for illuminating a monitoring area defined on a light transmissive member; and an imaging unit including an imaging sensor, the imaging sensor having a first light receiving area and a second light receiving area, the imaging unit being configured to capture a first image of distant photographic subjects by detecting, in the first light receiving area, lights from the distant photographic subjects that pass through the light transmissive member, to capture a second image of foreign matter attached to the monitoring area on the light transmissive member by detecting, in the second light receiving area, the illuminating light being reflected from the foreign matter and passing through the light transmissive member, and to generate an image frame including the first image and the second image, to perform an object detection process, the object detection process comprising:
a target detection step of detecting a detection target among the distant photographic subjects based on the first image in the imaging frame;
a foreign matter detection step of detecting the foreign matter attached to the monitoring area on the light transmissive member based on the second image in the imaging frame; and
an exposure amount change step of changing an exposure amount of the imaging unit from imaging frame to imaging frame, wherein in the target detection step a detection target is detected using first images in two or more imaging frames, exposure amounts of which are different from each other, and in the foreign matter detection step the foreign matter is detected using a second image in an imaging frame of the two or more imaging frames other than an imaging frame, an exposure amount of which is the greatest among those of the two or more imaging frames.

10. The object detection apparatus as claimed in claim 3, wherein the imaging frame of the second image used by the foreign matter detection unit is captured with a fixed exposure amount.

11. The object detection apparatus as claimed in claim 3, further comprising:
a wavelength restriction unit configured to transmit the light received in the second light receiving area and to restrict the light to be within a predetermined wavelength band.

12. The object detection apparatus as claimed in claim 3, wherein the imaging unit is configured to serially expose the image sensor partially to generate an imaging frame, and the object detection apparatus further includes an illuminating light control unit configured to control the light illumination unit so that when the imaging frame of the second image used by the foreign matter detection unit is captured, illuminating light is not emitted in a period where the first light receiving area on the image sensor is exposed, and illuminating light is emitted in a period where the second light receiving area on the image sensor is exposed.

13. A moving body device control system comprising:
an object detection unit configured to detect foreign matter attached to a monitoring area defined on a light transmissive member in a moving body and a detection target existing among distant photographic subjects around the moving body; and
a moving body device control unit configured to control a predetermined device installed on the moving body based on a result of detection of the foreign matter and a result of detection of the detection target by the object detection unit, wherein the object detection apparatus according to claim 3 is used as the object detection unit.

* * * * *